United States Patent
Hisasue et al.

(10) Patent No.: US 11,453,773 B2
(45) Date of Patent: Sep. 27, 2022

(54) THERMOPLASTIC ELASTOMER COMPOSITION, PLUG BODY AND CONTAINER

(71) Applicant: Asahi Kasei Kabushiki Kaisha, Tokyo (JP)

(72) Inventors: Takahiro Hisasue, Tokyo (JP); Mika Horiuchi, Tokyo (JP); Noriko Yagi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 194 days.

(21) Appl. No.: 16/480,183

(22) PCT Filed: Dec. 20, 2017

(86) PCT No.: PCT/JP2017/045747
§ 371 (c)(1),
(2) Date: Jul. 23, 2019

(87) PCT Pub. No.: WO2018/139122
PCT Pub. Date: Aug. 2, 2018

(65) Prior Publication Data
US 2019/0367724 A1    Dec. 5, 2019

(30) Foreign Application Priority Data

Jan. 24, 2017 (JP) .............................. JP2017-010648

(51) Int. Cl.
| | | |
|---|---|---|
| C08L 53/02 | (2006.01) | |
| A61J 1/10 | (2006.01) | |
| A61J 1/14 | (2006.01) | |
| B65D 39/00 | (2006.01) | |
| C08L 91/00 | (2006.01) | |

(52) U.S. Cl.
CPC .............. *C08L 53/025* (2013.01); *A61J 1/10* (2013.01); *A61J 1/1412* (2013.01); *B65D 39/0017* (2013.01); *C08L 91/00* (2013.01); *C08L 2205/025* (2013.01); *C08L 2205/035* (2013.01); *C08L 2205/06* (2013.01); *C08L 2207/322* (2013.01)

(58) Field of Classification Search
None
See application file for complete search history.

(56) References Cited

U.S. PATENT DOCUMENTS

| | | |
|---|---|---|
| 2002/0115795 A1 | 8/2002 | Shang et al. |
| 2008/0177000 A1 | 7/2008 | Ahn et al. |
| 2012/0053285 A1 | 3/2012 | Zhao |
| 2013/0116648 A1 | 5/2013 | Muto |
| 2013/0231430 A1* | 9/2013 | I .................. C08L 53/02 524/323 |
| 2013/0289158 A1 | 10/2013 | Youn et al. |
| 2017/0029614 A1 | 2/2017 | Yagi et al. |

FOREIGN PATENT DOCUMENTS

| | | |
|---|---|---|
| CN | 1535294 A | 10/2004 |
| CN | 1922253 A | 2/2007 |
| CN | 101294056 A | 10/2008 |
| CN | 102089378 A | 6/2011 |
| JP | S62-025149 A | 2/1987 |
| JP | S63-101446 A | 5/1988 |
| JP | H02-209943 A | 8/1990 |
| JP | H05-202267 A | 8/1993 |
| JP | H07-100184 A | 4/1995 |
| JP | H07-275345 A | 10/1995 |
| JP | S63-057663 A | 3/1998 |
| JP | 2002-128966 A | 5/2002 |
| JP | 2012-012030 A | 1/2012 |
| JP | 2012-025944 A | 2/2012 |
| JP | 2012-057162 A | 3/2012 |
| JP | 2017-145400 A | 8/2017 |

(Continued)

OTHER PUBLICATIONS

Harwick Standard Distribution Corporation, "CR-50 Titanium Dioxide Chemical and Physical Characteristics," http://www.harwick.com/files/tds/TIPAQUE_CR-.PDF (2020).

(Continued)

*Primary Examiner* — Robert T Butcher
(74) *Attorney, Agent, or Firm* — Morgan, Lewis & Bockius LLP

(57) ABSTRACT

A thermoplastic elastomer composition including:
  100 parts by mass of a hydrogenated block copolymer (a);
  from 10 to 50 parts by mass of a polypropylene resin (b);
  from 5 to 100 parts by mass of a polyphenylene ether resin (c); and
  from 75 to 200 parts by mass of a non-aromatic softener (d), wherein
  the hydrogenated block copolymer (a) contains a hydrogenated block copolymer (a-1) obtained by hydrogenation, the hydrogenated block copolymer (a-1) comprising at least one polymer block A1 including mainly a vinyl aromatic hydrocarbon compound monomer unit, and at least one polymer block B1 including mainly a conjugated diene compound monomer unit,
  a weight-average molecular weight of the hydrogenated block copolymer (a-1) is from 100,000 to 550,000, and
  a content of all vinyl aromatic hydrocarbon compound monomer units in the hydrogenated block copolymer (a-1) is more than 20% by mass and 50% by mass or less.

16 Claims, 2 Drawing Sheets

(56) References Cited

FOREIGN PATENT DOCUMENTS

WO   2010/003953 A1   1/2010
WO   2015/159912 A1   10/2015

OTHER PUBLICATIONS

Supplementary European Search Report issued in corresponding European Patent Application No. 17894113.4 dated Nov. 6, 2019.
International Preliminary Report on Patentability and Written Opinion issued in corresponding International Patent Application No. PCT/JP2017/045747 dated Aug. 8, 2019.
International Search Report issued in corresponding International Patent Application No. PCT/JP2017/045747 dated Mar. 27, 2018.

* cited by examiner

THERMOPLASTIC ELASTOMER COMPOSITION, PLUG BODY AND CONTAINER

TECHNICAL FIELD

The present invention relates to a thermoplastic elastomer composition, a plug body and a container.

BACKGROUND ART

In medical containers such as transfusion bags, content fluids may remain even after use of the medical containers. When an injection needle is removed from a plug body attached to the medical container in which the content fluid remains, the content fluid might leak out or fly out. Hence, the plug body for use in medical containers is required to have resealability, i.e., fluid leakage resistance, which is the capability to reclose a pinhole after removal of the needle from the plug body to thereby prevent the leakage of a content fluid.

Rubber materials such as isoprene rubber, butadiene rubber, butyl rubber, and blends thereof have heretofore been used as materials for plug bodies for medical containers in view of resealability and fluid leakage resistance.

However, in the case of using the rubber materials, it is necessary to produce the rubber materials through the step of adding at least a filler and additives such as a softener and a vulcanizing agent to a rubber component, followed by kneading the mixture to obtain a rubber mixture, and a vulcanization step of supplying the kneaded rubber mixture to a mold for plug bodies, followed by heating and pressurization. This process of producing the rubber materials is not only complicated but has problems such as high production cost because a large-scale facility is required.

The plug bodies for medical containers made of the rubber materials disadvantageously undergo deterioration caused by the oxidation of double bonds in the rubber component during the storage period of the medical containers so that the deteriorated rubber component leaks out into a drug solution.

Conventional metal needles generally used as the injection needle are replaced with plastic needles in view of handleability and safety.

Such plastic needles have lower rigidity than that of the metal needles and therefore require increasing their needle diameters for obtaining sufficient rigidity. However, the increased needle diameters disadvantageously increase resistance upon penetration of a needle through a plug body of a medical container, i.e., needlestick resistance.

In order to solve these problems, plug bodies for use in various medical containers, containing a thermoplastic elastomer have been proposed in recent years.

For example, Patent Literature 1 discloses a medical rubber plug prepared by molding a resin composition containing a hydrogenated block copolymer, a softener for hydrocarbon rubbers, and a polyolefin resin.

Also, Patent Literature 2 discloses a medical plug prepared by molding a medical resin composition consisting of a hydrogenated block copolymer, a hydrogenated petroleum resin, a polyphenylene ether resin, a peroxide degradation-type olefin resin, and a softener for non-aromatic rubbers.

CITATION LIST

Patent Literature

Patent Literature 1: Japanese Patent Laid-Open No. 2012-25944
Patent Literature 2: Japanese Patent Laid-Open No. 2012-57162

SUMMARY OF INVENTION

Technical Problem

For the medical rubber plug disclosed in Patent Literature 1, however, the test of sealability was carried out under conditions of a small amount of a fluid in a PET bottle in a sealed state, and sealability was not verified in the case of using a container having a bag shape. Furthermore, unfortunately, this medical rubber plug still has insufficient characteristics for resealability in the case of sticking a needle into the plug body for a long time under atmospheric pressure conditions involving an air hole opened in a container with the plug body in which a large amount of a fluid is contained.

The medical plug disclosed in Patent Literature 2 is also for the cases where a needle is stuck in the plug body for a short time. Unfortunately, this medical plug cannot obtain sufficient resealability when the needle remains stuck for a long time and removed from the plug body.

As mentioned above, the heretofore proposed plug bodies for medical containers containing a thermoplastic elastomer still cannot obtain sufficient resealability. For improving the resealability, it is necessary to increase the thickness of a plug body or to strengthen clamping force, i.e., swaging, by decreasing the internal volume of an outer plug part to which the plug body is fitted. In any of the cases, resistance at the time of needle removal or sticking is also increased. Therefore, there arise unfavorable defects, specifically, shaves of the plug body are produced, i.e., coring occurs, or an injection needle cannot be finely stuck.

Accordingly, in light of the problems of the conventional techniques mentioned above, an object of the present invention is to provide a thermoplastic elastomer composition, a plug body and a container excellent in coring resistance, which is a capability of efficiently preventing the occurrence of the coring, and in resealability.

Solution to Problem

The present inventors have conducted diligent studies to solve the problems of the conventional techniques mentioned above and found that a thermoplastic elastomer composition containing a hydrogenated block copolymer having a predetermined structure, a polypropylene resin, a polyphenylene ether resin, and a non-aromatic softener at a predetermined ratio can solve the problems of the conventional techniques mentioned above, consequently completing the present invention.

Specifically, the present invention is as follows:

[1]

A thermoplastic elastomer composition comprising:

100 parts by mass of a hydrogenated block copolymer (a);

from 10 to 50 parts by mass of a polypropylene resin (b);

from 5 to 100 parts by mass of a polyphenylene ether resin (c); and from 75 to 200 parts by mass of a non-aromatic softener (d), wherein the hydrogenated block copolymer (a) contains a hydrogenated block copolymer (a-1) obtained by hydrogenation, the hydrogenated block copolymer (a-1) comprising at least one polymer block A1 comprising mainly a vinyl aromatic hydrocarbon compound monomer unit, and at least one polymer block B1 comprising mainly a conjugated diene compound monomer unit, a weight-average molecular weight of the hydrogenated block copolymer (a-1) is from 100,000 to 550,000, and a content of all vinyl aromatic hydrocarbon compound monomer units in the hydrogenated block copolymer (a-1) is more than 20% by mass and 50% by mass or less.

[2]

The thermoplastic elastomer composition according to [1], wherein the hydrogenated block copolymer (a) comprises the hydrogenated block copolymer (a-1), a hydrogenated block copolymer (a-2) obtained by hydrogenation, the hydrogenated block copolymer (a-2) comprising at least one polymer block A2 comprising mainly a vinyl aromatic hydrocarbon compound monomer unit, and at least one polymer block B2 comprising mainly a conjugated diene compound monomer unit, a weight-average molecular weight of the hydrogenated block copolymer (a-2) is from 120,000 to 230,000, a content of all vinyl aromatic hydrocarbon compound monomer units in the hydrogenated block copolymer (a-2) is 7% by mass or more and 20% by mass or less, and a mass ratio of the hydrogenated block copolymer (a-1) to the hydrogenated block copolymer (a-2), (a-1)/(a-2), is from 70/30 to 95/5.

[3]

The thermoplastic elastomer composition according to [2], wherein in the hydrogenated block copolymer (a-2), a vinyl bond content before hydrogenation in the conjugated diene compound monomer unit is from 63% by mol to 95% by mol.

[4]

The thermoplastic elastomer composition according to [2] or [3], wherein the hydrogenated block copolymer (a-2) has at least two polymer blocks A2 comprising mainly a vinyl aromatic hydrocarbon compound monomer unit, and at least two polymer blocks B2 comprising mainly a conjugated diene compound monomer unit, at least one of the polymer blocks B2 is positioned at the end of the hydrogenated block copolymer (a-2), and a content of the polymer block B2 positioned at the end is from 0.5 to 9% by mass in the hydrogenated block copolymer (a-2)

[5]

The thermoplastic elastomer composition according to any one of [1] to [4], wherein in the hydrogenated block copolymer (a-1), a vinyl bond content before hydrogenation in the conjugated diene compound monomer unit is from 30% by mol to 60% by mol.

[6]

The thermoplastic elastomer composition according to any one of [1] to [5], wherein a reduced viscosity of the polyphenylene ether resin (c) is from 0.15 to 0.70 dL/g.

[7]

The thermoplastic elastomer composition according to any one of [1] to [6], wherein the non-aromatic softener (d) comprises a non-aromatic softener (d-1) having a kinematic viscosity of from 300 to 400 mm$^2$/sec at 40° C.

[8]

The thermoplastic elastomer composition according to any one of [1] to [7], wherein the non-aromatic softener (d) comprises a non-aromatic softener (d-2) having a kinematic viscosity of 100 mm$^2$/sec or less at 40° C.

[9]

The thermoplastic elastomer composition according to [8], wherein a mass ratio of the non-aromatic softener (d-1) to the non-aromatic softener (d-2), (d-1)/(d-2), is from 30/70 to 60/40, and a total content of the non-aromatic softener (d-1) and the non-aromatic softener (d-2) is from 100 to 200 parts by mass per 100 parts by mass of the hydrogenated block copolymer (a).

[10]

The thermoplastic elastomer composition according to any one of [1] to [9], wherein when a polymer block having the largest number-average molecular weight in the polymer block A1 is designated as polymer block A1', number-average molecular weight Mn(A1') of a block chain of the polymer block A1' is from 10,000 to 70,000, number-average molecular weight Mn(c) of the polyphenylene ether resin (c) is from 1,000 to 50,000, and Mn(A1')/Mn(c)=from 1.2 to 3.0.

[11]

The thermoplastic elastomer composition according to any one of [1] to [10], having a Shore A hardness of 55 or less, and a permanent elongation or distortion after 100% elongation of 5% or less.

[12]

The thermoplastic elastomer composition according to any one of [1] to [11], further comprising from 1 to 150 parts by mass of an inorganic filler (e) per 100 parts by mass of the hydrogenated block copolymer (a).

[13]

The thermoplastic elastomer composition according to [12], wherein the inorganic filler (e) is at least one member selected from the group consisting of calcium carbonate, silica, talc, zinc oxide, titanium oxide, and magnesium hydroxide.

[14]

The thermoplastic elastomer composition according to [12] or [13], wherein the inorganic filler (e) is surface-treated with at least one member selected from the group consisting of a fatty acid, a resin acid, a fat and oil, a surfactant, a silane coupling agent, a titanium coupling agent, a phosphoric acid coupling agent, and a carboxylic acid coupling agent.

[15]

The thermoplastic elastomer composition according to any one of [1] to [14], further comprising 1 part by mass or more and 30 parts by mass or less of an inorganic adsorbent (f) having a specific surface area according to a BET method of 50 m$^2$/g or more, per 100 parts by mass of the hydrogenated block copolymer (a).

[16]

A plug body comprising the thermoplastic elastomer composition according to any one of [1] to [15].

[17]

A plug body which is a molded article of the thermoplastic elastomer composition according to any one of [1] to [15], comprising:

100 parts by mass of a hydrogenated block copolymer (a);
from 10 to 50 parts by mass of a polypropylene resin (b);
from 5 to 100 parts by mass of a polyphenylene ether resin (c); and
from 75 to 200 parts by mass of a non-aromatic softener (d), wherein
a light transmittance is 0% after preparing a disk-shaped molded article of 20 mm in diameter and 4 mm in thickness from the plug body and then; heating the disk-shaped article at 121° C. for 10 minutes while the disk-shaped article is fitted into a jig or a lid body of a container of 20 mm in inside diameter and 3.5 mm in inside thickness and then; stucking a resin needle having a maximum diameter of 5 mm into the disk-shaped article and removing therefrom.

[18]

A container comprising a plug body according to [16] or [17].

Advantageous Effects of Invention

According to the present invention, a thermoplastic elastomer composition, a plug body and a container excellent in coring resistance and resealability are obtained.

DESCRIPTION OF EMBODIMENTS

Figure 1:
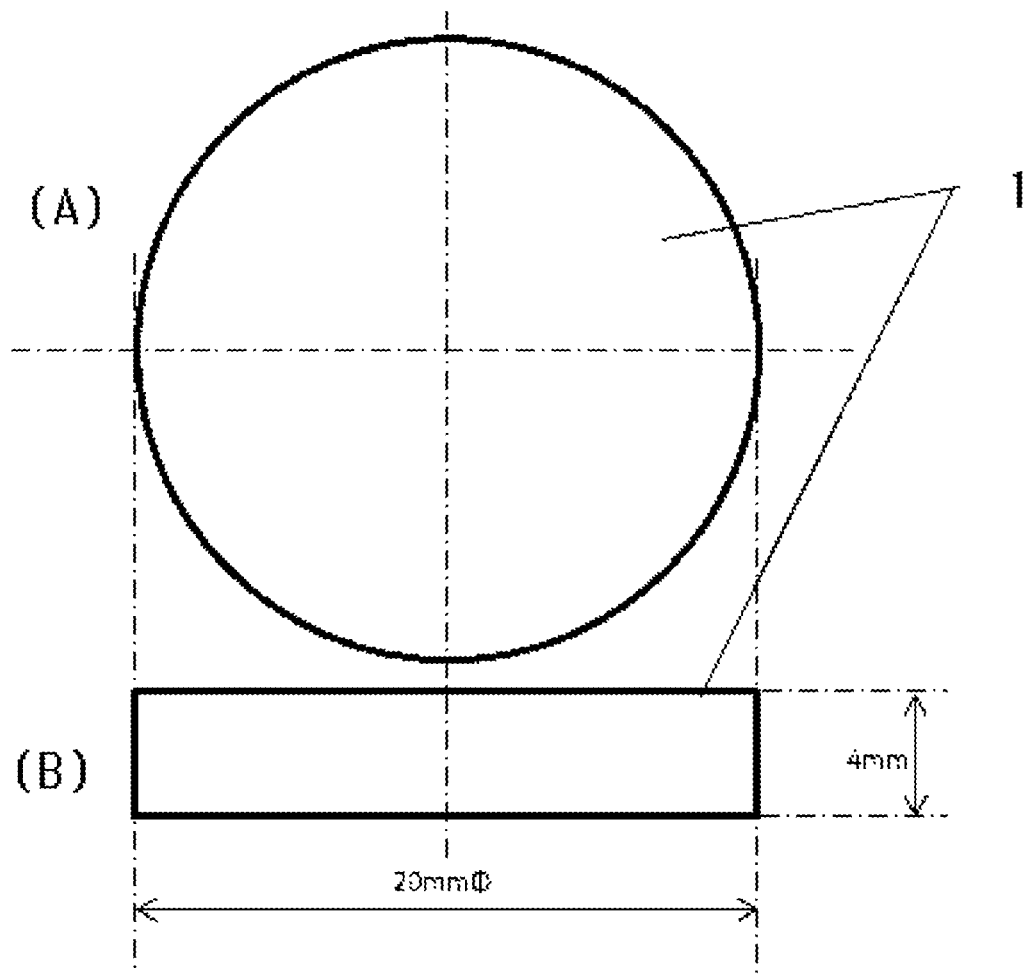
FIG. 1(A) shows a schematic top view of one example of a plug body.
FIG. 1(B) shows a schematic cross-sectional view of one example of the plug body.

Hereinafter, the mode for carrying out the present invention (hereinafter, referred to as the "present embodiment") will be described in detail.

The present embodiment described below is given for illustrating the present invention and does not limit the present invention to the contents described below. The present invention can be carried out through various changes or modifications without departing from the spirit of the present invention.

(Thermoplastic Elastomer Composition)

The thermoplastic elastomer composition of the present embodiment is a thermoplastic elastomer composition comprising:

100 parts by mass of a hydrogenated block copolymer (a);
from 10 to 50 parts by mass of a polypropylene resin (b);
from 5 to 100 parts by mass of a polyphenylene ether resin (c); and
from 75 to 200 parts by mass of a non-aromatic softener (d), wherein
the hydrogenated block copolymer (a) contains a hydrogenated block copolymer (a-1) obtained by hydrogenation, the hydrogenated block copolymer (a-1) comprising at least one polymer block A1 comprising mainly a vinyl aromatic hydrocarbon compound monomer unit, and at least one polymer block B1 comprising mainly a conjugated diene compound monomer unit, a weight-average molecular weight of the hydrogenated block copolymer (a-1) is from 100,000 to 550,000, and a content of all vinyl aromatic hydrocarbon compound monomer units in the hydrogenated block copolymer (a-1) is more than 20% by mass and 50% by mass or less.

The thermoplastic elastomer composition of the present embodiment has the configuration described above and is thereby excellent in coring resistance and resealability.

Hereinafter, each component will be described in detail.

(Hydrogenated Block Copolymer (a))

The hydrogenated block copolymer (a) contained in the thermoplastic elastomer of the present embodiment comprises a hydrogenated block copolymer (a-1) described below.

<Hydrogenated Block Copolymer (a-1)>

The hydrogenated block copolymer (a-1) is a hydrogenated block copolymer obtained by hydrogenating a block copolymer comprising at least one polymer block A1 comprising mainly a vinyl aromatic hydrocarbon compound monomer unit, and at least one polymer block B1 comprising mainly a conjugated diene compound monomer unit.

The polymer block A1 comprising mainly a vinyl aromatic hydrocarbon compound monomer unit means that the content of the vinyl aromatic hydrocarbon compound monomer unit in the polymer block A1 exceeds 50% by mass. The content of the vinyl aromatic hydrocarbon compound monomer unit is preferably 60% by mass or more, more preferably 70% by mass or more, further preferably 80% by mass or more, still further preferably 90% by mass or more, in view of mechanical strength and recovery properties related to resealability, i.e., the capability to reclose a pinhole after removal of a needle from a plug body.

Likewise, the polymer block B1 comprising mainly a conjugated diene compound monomer unit means that the content of the conjugated diene compound monomer unit in the polymer block B1 exceeds 50% by mass. The content of the conjugated diene compound monomer unit is preferably 60% by mass or more, more preferably 70% by mass or more, further preferably 80% by mass or more, still further preferably 90% by mass or more, in view of recovery properties related to resealability.

In the present embodiment, each monomer unit constituting a block copolymer is designated according to the designation of the monomer from which the monomer unit is derived. For example, the "vinyl aromatic hydrocarbon compound monomer unit" means a constitutional unit of a polymer resulting from the polymerization of a vinyl aromatic hydrocarbon compound serving as a monomer, and its structure is a molecular structure where two carbon atoms of an ethylene substituent group derived from a vinyl substituent group are binding sites.

Also, the "conjugated diene compound monomer unit" means a constitutional unit of a polymer resulting from the polymerization of a conjugated diene compound serving as a monomer, and its structure is a molecular structure where two carbon atoms of an olefin derived from the conjugated diene compound monomer are binding sites.

In the present embodiment, the monomer that can be used as the vinyl aromatic hydrocarbon compound monomer unit in the polymer block A1 refers to a compound having a vinyl group and an aromatic ring.

Examples of the vinyl aromatic hydrocarbon compound monomer include, but are not limited to, styrene, α-methylstyrene, p-methylstyrene, divinylbenzene, 1,1-diphenylethylene, N,N-dimethyl-p-aminoethylstyrene, and N,N-diethyl-p-aminoethylstyrene. Among them, styrene, α-methylstyrene, or divinylbenzene is suitably used in view of polymerizability. These vinyl aromatic hydrocarbon compound monomers may be used singly, or two or more thereof may be used in combination.

The monomer that can be used as the conjugated diene compound monomer unit in the polymer block B1 is a diolefin having one pair of conjugated double bonds (two double bonds bonded so as to be conjugated).

Examples of the conjugated diene compound monomer include, but are not limited to, 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Among them, 1,3-butadiene or 2-methyl-1,3-butadiene (isoprene) is suitably used in view of polymerizability. These conjugated diene compound monomers may be used singly or two or more thereof may be used in combination.

The hydrogenated block copolymer (a-1) has, for example, but not limited to, a structure as represented by the general formulas (1) to (7) given below. Alternatively, the hydrogenated block copolymer (a-1) may be a mixture comprising plural types of copolymers having a structure as represented by the general formulas (1) to (7) given below at an arbitrary ratio.

$$(A1\text{-}B1)_n \tag{1}$$

$$A1\text{-}(B1\text{-}A1)_n \tag{2}$$

$$B1\text{-}(A1\text{-}B1)_n \tag{3}$$

$$[(B1\text{-}A1)_n]_m\text{-}Z \tag{4}$$

$$[(A1\text{-}B1)_n]_m\text{-}Z \tag{5}$$

$$[(B1\text{-}A1)_n\text{-}B1]_m\text{-}Z \tag{6}$$

$$[(A1\text{-}B1)_n\text{-}A1]_m\text{-}Z \tag{7}$$

In the general formulas (1) to (7), A1 is a polymer block comprising mainly a vinyl aromatic hydrocarbon compound monomer unit, and B1 is a polymer block comprising mainly a conjugated diene compound monomer unit. The boundary between the polymer block A1 and the polymer block B1 is not necessarily required to be clearly defined.

n is an integer of 1 or more and is preferably an integer of from 1 to 5.

m is an integer of 2 or more and is preferably an integer of from 2 to 11, more preferably from 2 to 8.

Z represents a residue of a coupling agent. In this context, the coupling residue means a residue after coupling by a coupling agent for use in coupling a plurality of copolymers of conjugated diene compound monomer units and vinyl aromatic hydrocarbon compound monomer units between the polymer block A1 and the polymer block A1, between the polymer block B1 and the polymer block B1, or between the polymer block A1 and the polymer block B1. Examples of the coupling agent include, but are not limited to, dihalogen compounds and acid esters mentioned later.

In the general formulas (1) to (7), the vinyl aromatic hydrocarbon compound monomer units in the polymer block A1 and the polymer block B1 may be uniformly distributed or may be distributed in a tapered pattern.

When the polymer block A1 and the polymer block B1 form a copolymer block of vinyl aromatic hydrocarbon compound monomer units and conjugated diene compound monomer units, the vinyl aromatic hydrocarbon compound monomer units in the copolymer block may include a plurality of uniformly distributed moieties and/or a plurality of tapered distributed moieties. The copolymer block moiety may contain a plurality of moieties differing in vinyl aromatic hydrocarbon compound monomer unit content.

The weight-average molecular weight of the hydrogenated block copolymer (a-1) is from 100,000 to 550,000. The weight-average molecular weight is preferably 120,000 or more, more preferably 140,000 or more, in view of thermal deformation resistance. Furthermore, the weight-average molecular weight is preferably 500,000 or less, more preferably 450,000 or less, further preferably 400,000 or less, still further preferably 350,000 or less, even further preferably 300,000 or less.

The weight-average molecular weight is preferably from 120,000 to 350,000, more preferably from 140,000 to 300,000.

When the weight-average molecular weight of the hydrogenated block copolymer (a-1) is 100,000 or more, the thermoplastic elastomer composition of the present embodiment tends to have favorable recovery characteristics related to resealability. When the weight-average molecular weight of the hydrogenated block copolymer (a-1) is 550,000 or less, favorable fluidity and excellent molding processability are obtained in the thermoplastic elastomer composition.

The molecular weight distribution (Mw/Mn) of the hydrogenated block copolymer (a-1) is preferably from 1.01 to 8.0, more preferably from 1.01 to 6.0, further preferably from 1.01 to 5.0.

When the molecular weight distribution of the hydrogenated block copolymer (a-1) falls within the range described above, more favorable mechanical strength tends to be obtained.

The shape of the molecular weight distribution curve of the hydrogenated block copolymer (a-1) measured by gel permeation chromatography (GPC) is not particularly limited and may have a polymodal molecular weight distribution with two or more peaks or may have a monomodal molecular weight distribution with one peak.

The weight-average molecular weight (Mw) and molecular weight distribution [Mw/Mn; the ratio of the weight-average molecular weight (Mw) to the number-average molecular weight (Mn)] of the hydrogenated block copolymer (a-1) can be determined by a method described in Examples mentioned later on the basis of the molecular weight of a chromatogram peak in gel permeation chromatography (GPC) measurement using a calibration curve determined from the measurement of commercially available standard polystyrene (created by using the peak molecular weight of standard polystyrene).

In the hydrogenated block copolymer (a-1), when a polymer block having the largest number-average molecular weight in the polymer block A1 comprising mainly a vinyl aromatic hydrocarbon compound monomer unit is designated as polymer block A1', the number-average molecular weight Mn(A1') of a block chain of the polymer block A1' is preferably from 10,000 to 70,000, more preferably from 15,000 to 65,000, further preferably from 20,000 to 60,000, still further preferably from 25,000 to 55,000. When the number-average molecular weight Mn(A1') of a block chain of the polymer block A1' falls within the range described above, the compatibility of the hydrogenated block copolymer (a) comprising the hydrogenated block copolymer (a-1) with the polyphenylene ether resin (c) mentioned later tends to be more favorable, and the thermoplastic elastomer composition tends to have better recovery properties related to resealability.

The number-average molecular weight of a block chain of the polymer block A1' can be measured by GPC in the same manner as the method mentioned above using a polymer block component consisting of a vinyl aromatic hydrocarbon compound monomer unit (wherein a polymer component consisting of a vinyl aromatic monomer unit having an average degree of polymerization of approximately 30 or less is excluded) obtained according to a method of oxidatively degrading the hydrogenated block copolymer (a-1) with t-butyl hydroperoxide with osmium tetroxide as a catalyst (method described in I. M. KOLTHOFF, et al., J. Polym. Soi. 1, 429 (1946)).

The content of all vinyl aromatic hydrocarbon compound monomer units in the hydrogenated block copolymer (a-1) is more than 20% by mass and 50% by mass or less.

The content of all vinyl aromatic hydrocarbon compound monomer units is preferably 22% by mass or more, more preferably 24% by mass or more, further preferably 26% by mass or more, still further preferably 28% by mass or more, in view of mechanical properties and recovery properties related to resealability.

Furthermore, the content of all vinyl aromatic hydrocarbon compound monomer units is preferably 47% by mass or less, more preferably 44% by mass or less, further preferably 41% by mass or less, still further preferably 38% by mass or less.

The content of all vinyl aromatic hydrocarbon compound monomer units is more preferably from 26 to 44% by mass, further preferably from 26 to 41% by mass, still further preferably from 28 to 41% by mass, even further preferably from 28 to 38% by mass.

When the content of all vinyl aromatic hydrocarbon compound monomer units in the hydrogenated block copolymer (a-1) is more than 20% by mass, the strength of the thermoplastic elastomer composition of the present embodiment tends to be improved. When the content of all vinyl aromatic hydrocarbon compounds is 50% by mass or less, the flexibility of the thermoplastic elastomer composition of the present embodiment tends to be improved. The content of all vinyl aromatic hydrocarbon compound monomer units can be controlled to the numeric range described above by adjusting the amounts of monomers added in a polymerization step for the hydrogenated block copolymer (a-1), and can be calculated from absorption intensity at 262 nm by a method described in Examples mentioned later using an ultraviolet spectrophotometer.

The microstructure (ratios of cis, trans, and vinyl) of the polymer block B1 in the hydrogenated block copolymer (a-1) can be arbitrarily controlled by use of a polar compound or the like mentioned later.

The vinyl bond content before hydrogenation in the conjugated diene compound monomer unit in the hydrogenated block copolymer (a-1) is preferably from 30% by mol to 60% by mol, more preferably from 31 to 57% by mol, further preferably from 31 to 54% by mol, still further preferably from 32 to 51% by mol, even further preferably from 32 to 45% by mol or less.

When the vinyl bond content before hydrogenation in the conjugated diene compound monomer unit is 30% by mol or more, the compatibility of the hydrogenated block copolymer (a-1) with the polypropylene resin (b) mentioned later tends to be further improved. When the vinyl bond content before hydrogenation in the conjugated diene compound monomer unit is 60% by mol or less, strength tends to be further improved.

As mentioned above, in the present embodiment, the content of all vinyl aromatic hydrocarbon compound monomer units in the hydrogenated block copolymer (a-1) is more than 20% by mass and 50% by mass or less, and the vinyl bond content before hydrogenation in the conjugated diene compound monomer unit is preferably from 30% by mol to 60% by mol.

In the present embodiment, the vinyl bond content is the ratio of the total molar amount of pre-hydrogenated conjugated diene monomer units attached by 1,2-bonds and 3,4-bonds with respect to the total molar amount of those attached by 1,2-bonds, 3,4-bonds, and 1,4-bonds, for example, in butadiene.

After hydrogenation, the ratio of the total molar amount of conjugated diene monomer units attached by unhydrogenated 1,2-bonds, hydrogenated 1,2-bonds, unhydrogenated 3,4-bonds and hydrogenated 3,4-bonds to the total molar amount of those attached by unhydrogenated 1,2-bonds, hydrogenated 1,2-bonds, unhydrogenated 3,4-bonds, hydrogenated 3,4-bonds, unhydrogenated 1,4-bonds and hydrogenated 1,4-bonds is equal to the vinyl bond content of pre-hydrogenated conjugated diene monomer units. Thus, the vinyl bond content of pre-hydrogenated conjugated diene monomer units can be measured by nuclear magnetic resonance spectrometry (NMR) using the block copolymer after hydrogenation and can specifically measured by a method described in Examples mentioned later.

The degree of hydrogenation of aliphatic double bonds derived from the conjugated diene compound in the hydrogenated block copolymer (a-1) is preferably 50% or more, more preferably 60% or more, further preferably 70% or more. When the degree of hydrogenation is 50% or more, there is a tendency that reduction in mechanical properties ascribable to thermal deterioration (oxidative deterioration) can be more effectively suppressed. When the degree of hydrogenation is 70% or more, better weather resistance tends to be obtained. The upper limit value of the degree of hydrogenation is not particularly limited and is preferably 100% or less, more preferably 99% or less.

In the case of partially cross-linking the thermoplastic elastomer composition of the present embodiment using an organic peroxide (g) mentioned later, the degree of hydrogenation of aliphatic double bonds derived from the conjugated diene compound in the hydrogenated block copolymer (a-1) is preferably 50% or more, more preferably 60% or more, in view of heat resistance, and is preferably 90% or less, more preferably 85% or less, in view of processability and cross-linking reactivity.

The degree of hydrogenation of aromatic double bonds based on the vinyl aromatic hydrocarbon compound monomer unit in the hydrogenated block copolymer (a-1) is not particularly limited and is preferably 50% or less, more preferably 30% or less, further preferably 20% or less.

<Hydrogenated Block Copolymer (a-2)>

The hydrogenated block copolymer (a) contained in the thermoplastic elastomer composition of the present embodiment may comprise the hydrogenated block copolymer (a-1) and a hydrogenated block copolymer (a-2) different from the hydrogenated block copolymer (a-1).

The hydrogenated block copolymer (a-2) is a hydrogenated block copolymer obtained by hydrogenating a block copolymer comprising at least one polymer block A2 comprising mainly a vinyl aromatic hydrocarbon compound monomer unit, and at least one polymer block B2 comprising mainly a conjugated diene compound monomer unit, and has a weight-average molecular weight of from 120,000 to 230,000. The content of all vinyl aromatic hydrocarbon compound monomer units in the hydrogenated block copolymer (a-2) is 7% by mass or more and 20% by mass or less.

In the case of using the thermoplastic elastomer composition of the present embodiment as a plug body for the purpose of sticking a needle thereinto, the flexibility of the thermoplastic elastomer composition influences needlestick resistance. However, when flexibility is excessively improved in order to reduce needlestick resistance, a needle might fall off from the plug body during use, and the force of retaining a needle (needle retention properties) tends to be reduced.

Although the flexibility of the thermoplastic elastomer composition correlates with various factors, a smaller amount of the vinyl aromatic hydrocarbon compound, for example, a smaller amount of styrene, in the hydrogenated block copolymer, a larger amount of the component (a-2), a smaller amount of the polypropylene resin (b), the polyphenylene ether resin (c), an inorganic filler (e), or an inorganic adsorbent (f), or a larger amount of the non-aromatic softener (d) in the thermoplastic elastomer composition tends to improve the flexibility, i.e., softness, of the thermoplastic elastomer composition.

The hydrogenated block copolymer (a) is preferably a mixture comprising the hydrogenated block copolymer (a-1) and the hydrogenated block copolymer (a-2) in view of improvement in the balance between needlestick resistance and resealability. In this case, the mass ratio of the hydrogenated block copolymer (a-1) to the hydrogenated block copolymer (a-2), (a-1)/(a-2), is preferably from 70/30 to 95/5. When the mass ratio of the hydrogenated block copolymer (a-1) to the hydrogenated block copolymer (a-2) falls within the range described above, the balance between needlestick resistance and resealability can be improved. From a similar viewpoint, the mass ratio is more preferably from 75/25 to 95/5, further preferably from 80/20 to 95/5.

In the hydrogenated block copolymer (a-2), the polymer block A2 comprising mainly a vinyl aromatic hydrocarbon compound monomer unit means that the content of the vinyl aromatic hydrocarbon compound monomer unit in the polymer block A2 exceeds 50% by mass. The content of the vinyl aromatic hydrocarbon compound monomer unit is preferably 60% by mass or more, more preferably 70% by mass or more, further preferably 80% by mass or more, still further preferably 90% by mass or more.

Likewise, in the hydrogenated block copolymer (a-2), the polymer block B2 comprising mainly a conjugated diene compound monomer unit means that the content of the conjugated diene compound monomer unit in the polymer block B2 exceeds 50% by mass. The content of the conjugated diene compound monomer unit is preferably 60% by mass or more, more preferably 70% by mass or more, further preferably 80% by mass or more, still further preferably 90% by mass or more.

The monomer that can be used as the vinyl aromatic hydrocarbon compound monomer unit in the polymer block A2 refers to a compound having a vinyl group and an aromatic ring. Examples of the vinyl aromatic hydrocarbon compound monomer include, but are not limited to, styrene, α-methylstyrene, p-methylstyrene, divinylbenzene, 1,1-diphenylethylene, N,N-dimethyl-p-aminoethylstyrene, and N,N-diethyl-p-aminoethylstyrene. Among them, styrene, α-methylstyrene, or divinylbenzene is suitably used in view of polymerizability. These vinyl aromatic hydrocarbon compound monomers may be used singly, or two or more thereof may be used in combination.

The monomer that can be used as the conjugated diene compound monomer unit in the polymer block B2 is a diolefin having one pair of conjugated double bonds (two double bonds bonded so as to be conjugated). Examples of the conjugated diene compound monomer include, but are not limited to, 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Among them, 1,3-butadiene or 2-methyl-1,3-butadiene (isoprene) is suitably used in view of polymerizability. These conjugated diene compound monomers may be used singly, or two or more thereof may be used in combination.

The hydrogenated block copolymer (a-2) has, for example, but not limited to, a structure as represented by the general formulas (85) to (14) given below. Alternatively, the hydrogenated block copolymer (a-2) may be a mixture comprising plural types of structures as represented by the general formulas (8) to (14) given below at an arbitrary ratio.

$$(A2\text{-}B2)_n \tag{8}$$

$$A2\text{-}(B2\text{-}A2)_n \tag{9}$$

$$B2\text{-}(A2\text{-}B2)_n \tag{10}$$

$$[(B2\text{-}A2)_n]_m\text{-}Z \tag{11}$$

$$[(A2\text{-}B2)_n]_m\text{-}Z \tag{12}$$

$$[(B2\text{-}A2)_n\text{-}B2]_m\text{-}Z \tag{13}$$

$$[(A2\text{-}B2)_n\text{-}A2]_m\text{-}Z \tag{14}$$

In the general formulas (8) to (14), A2 is a polymer block comprising mainly a vinyl aromatic hydrocarbon compound monomer unit, and B2 is a polymer block comprising mainly a conjugated diene compound monomer unit. The boundary between the polymer block A2 and the polymer block B2 is not necessarily required to be clearly defined.

n is an integer of 1 or more and is preferably an integer of from 1 to 5.

m is an integer of 2 or more and is preferably an integer of from 2 to 11, more preferably from 2 to 8.

Z represents a residue of a coupling agent. In this context, the coupling residue means a residue after coupling by a coupling agent for use in coupling a plurality of copolymers of conjugated diene compound monomer units and vinyl aromatic hydrocarbon compound monomer units between the polymer block A2 and the polymer block A2, between the polymer block B2 and the polymer block B2, or between the polymer block A2 and the polymer block B2. Examples of the coupling agent include, but are not limited to, dihalogen compounds and acid esters mentioned later.

In the general formulas (8) to (14), the vinyl aromatic hydrocarbon compound monomer units in the polymer block A2 and the polymer block B2 may be uniformly distributed or may be distributed in a tapered pattern. When the polymer block A2 and the polymer block B2 form a copolymer block of vinyl aromatic hydrocarbon compound monomer units and conjugated diene compound monomer units, the vinyl aromatic hydrocarbon compound monomer units in the copolymer block may include a plurality of uniformly distributed moieties and/or a plurality of tapered distributed moieties. The copolymer block moiety may contain a plurality of moieties differing in vinyl aromatic hydrocarbon compound monomer unit content.

When the hydrogenated block copolymer (a-2) has at least two polymer blocks A2 described above and at least two polymer blocks B2 described above, at least one of the polymer blocks B2 is positioned at the end of the hydrogenated block copolymer (a-2), and the content of the polymer block B2 positioned at the end is preferably from 0.5 to 9% by mass, more preferably from 1 to 7% by mass, further preferably from 3 to 7% by mass, in the hydrogenated block copolymer (a-2).

When at least one of the polymer blocks B2 is positioned at the end of the hydrogenated block copolymer (a-2) and the content of the polymer block B2 positioned at the end is from 0.5 to 9% by mass in the hydrogenated block copolymer (a-2), the thermoplastic elastomer of the present embodiment tends to have better flexibility. The content of the polymer block B2 positioned at the end can be calculated by dividing the mass of conjugated diene polymerized at the end by the mass of all monomers used in the polymerization reaction.

In the hydrogenated block copolymer (a-2), a method of adjusting the timing of addition of monomers or the amounts of monomers added in a polymerization step for the hydrogenated block copolymer (a-2) is effective for positioning at least one of the polymer blocks B2 at the end and setting the content of the polymer block B2 positioned at the end to the numeric range described above.

The weight-average molecular weight of the hydrogenated block copolymer (a-2) is from 120,000 to 230,000.

When the weight-average molecular weight of the hydrogenated block copolymer (a-2) is 120,000 or more, the recovery properties of the thermoplastic elastomer composition of the present embodiment are improved. When the weight-average molecular weight of the hydrogenated block copolymer (a-2) is 230,000 or less, the rebound resilience of the thermoplastic elastomer is improved, and a sufficient effect of improving resealability and needlestick resistance is obtained in a plug body for medical containers containing the thermoplastic elastomer composition of the present embodiment. From a similar viewpoint, the weight-average molecular weight of the hydrogenated block copolymer (a-2) is preferably from 140,000 to 220,000, more preferably from 150,000 to 210,000, further preferably from 160,000 to 200,000.

The molecular weight distribution (Mw/Mn) of the hydrogenated block copolymer (a-2) is preferably from 1.01 to 8.0, more preferably from 1.01 to 6.0, further preferably from 1.01 to 5.0. When the molecular weight distribution falls within the range described above, the thermoplastic elastomer of the present embodiment tends to obtain more favorable recovery properties and mechanical strength. Mw and Mn of the hydrogenated block copolymer (a-2) can also be measured by GPC.

The shape of the molecular weight distribution curve of the hydrogenated block copolymer (a-2) is not particularly limited and may have a polymodal molecular weight distribution with two or more peaks or may have a monomodal molecular weight distribution with one peak.

The content of all vinyl aromatic hydrocarbon compound monomer units in the hydrogenated block copolymer (a-2) is from 7% by mass to 20% by mass, preferably from 9 to 18% by mass, more preferably from 11 to 16% by mass. When the content of all vinyl aromatic hydrocarbon compound monomer units in the hydrogenated block copolymer (a-2) is 7% by mass or more, the mechanical strength of the thermoplastic elastomer composition tends to be further improved. When the content of all vinyl aromatic hydrocarbon compounds is 20% by mass or less, the flexibility and recovery properties of the thermoplastic elastomer composition tend to be further improved, and resealability tends to be further improved.

The vinyl bond content before hydrogenation in the conjugated diene compound monomer unit in the hydrogenated block copolymer (a-2) is preferably from 63% by mol to 95% by mol, more preferably from 65% by mol to 90% by mol, further preferably from 67% by mol to 85% by mol.

When the vinyl bond content before hydrogenation in the conjugated diene compound monomer unit is 63% by mol or more, compatibility with the polypropylene resin (b) mentioned later tends to be improved, the flexibility and recovery properties of the thermoplastic elastomer of the present embodiment tend to be further improved, and resealability tends to be further improved. When the vinyl bond content before hydrogenation in the conjugated diene compound monomer unit is 95% by mol or less, the mechanical strength of the thermoplastic elastomer composition of the present embodiment tends to be further improved, and coring tends to be further improved.

From the viewpoint mentioned above, in the present embodiment, more preferably, the content of all vinyl aromatic hydrocarbon compound monomer units in the hydrogenated block copolymer (a-2) is from 7% by mass to 20% by mass, and the vinyl bond content before hydrogenation in the conjugated diene compound monomer unit is from 63% by mol to 95% by mol.

The degree of hydrogenation of aliphatic double bonds derived from the conjugated diene compound in the hydrogenated block copolymer (a-2) is preferably 80% or more, more preferably 90% or more. When the degree of hydrogenation is 80% or more, reduction in mechanical properties ascribable to thermal deterioration, i.e., oxidative deterioration, can be suppressed. Although there is no upper limit value of the degree of hydrogenation, the degree of hydrogenation is preferably 100% or less, more preferably 99% or less.

The degree of hydrogenation of aromatic double bonds based on the vinyl aromatic hydrocarbon compound monomer unit in the hydrogenated block copolymer (a-2) is not particularly limited and is preferably 50% or less, more preferably 30% or less, further preferably 20% or less.

Examples of the method for producing the hydrogenated block copolymer (a) include, but are not limited to, methods described in Japanese Patent Publication No. 36-19286, Japanese Patent Publication No. 43-17979, Japanese Patent Publication No. 46-32415, Japanese Patent Publication No. 49-36957, Japanese Patent Publication No. 48-2423, Japanese Patent Publication No. 48-4106, Japanese Patent Publication No. 51-49567, Japanese Patent Laid-Open No. 59-166518, etc.

The pre-hydrogenated copolymer comprising a conjugated diene compound monomer unit and a vinyl aromatic hydrocarbon compound monomer unit in the hydrogenated block copolymer (a) can be produced by, for example, but not limited to, a method of performing anion living polymerization using a polymerization initiator such as an organic alkali metal compound in a hydrocarbon solvent.

Examples of the hydrocarbon solvent include, but are not limited to: aliphatic hydrocarbons such as n-butane, isobutane, n-pentane, n-hexane, n-heptane, and n-octane; alicyclic hydrocarbons such as cyclohexane, cycloheptane, and methylcycloheptane; and aromatic hydrocarbons such as benzene, toluene, xylene, and ethylbenzene.

The polymerization initiator is not particularly limited as long as the polymerization initiator is an organic alkali metal compound generally known to have anion polymerization activity against conjugated diene compound monomers and vinyl aromatic hydrocarbon compound monomers. Examples thereof include aliphatic hydrocarbon alkali metal compounds having from 1 to 20 carbon atoms, aromatic hydrocarbon alkali metal compounds having from 1 to 20 carbon atoms, and organic amino alkali metal compounds having from 1 to 20 carbon atoms.

Examples of the alkali metal contained in the polymerization initiator include, but are not limited to, lithium, sodium, and potassium. One or two or more alkali metals may be contained in one molecule. Specific examples thereof include, but are not limited to, n-propyllithium, n-butyllithium, sec-butyllithium, tert-butyllithium, n-pentyllithium, n-hexyllithium, benzyllithium, phenyllithium, tolyllithium, a reaction product of diisopropenylbenzene and sec-butyllithium, and a reaction product of divinylbenzene, sec-butyllithium, and a small amount of 1,3-butadiene.

Alternatively, siloxy group-containing alkyllithiums such as 1-(t-butoxy)propyllithium disclosed in U.S. Pat. No. 5,708,092 and a lithium compound obtained by inserting one to several molecules of an isoprene monomer for improvement in solubility thereof, and 1-(t-butyldimethylsiloxy) hexyllithium disclosed in U.K. Patent No. 2,241,239, amino group-containing alkyllithiums disclosed in U.S. Pat. No. 5,527,753, and aminolithiums such as lithium diisopropylamide and lithium hexamethyldisilazide may be used.

In the copolymerization of the conjugated diene compound monomer and the vinyl aromatic hydrocarbon compound monomer with the organic alkali metal compound as a polymerization initiator, a tertiary amine compound, an ether compound, or a metal alcoholate compound can be added as an adjuster in order to adjust the vinyl bond (1,2-bond or 3,4-bond) content attributed to the conjugated diene compound monomer to be incorporated in the copolymer or to adjust the random copolymerizability of the conjugated diene compound monomer and the vinyl aromatic hydrocarbon compound monomer.

The adjusters may be used singly or two or more thereof may be used in combination.

A compound represented by the general formula R1R2R3N can be applied to the tertiary amine compound as the adjuster.

In this context, each of R1, R2, and R3 in the general formula represents a hydrocarbon group having from 1 to 20 carbon atoms or a hydrocarbon group having a tertiary amino group.

Examples of the tertiary amine compound include, but are not limited to, trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, and N,N'-dioctyl-p-phenylenediamine.

For example, a linear ether compound and a cyclic ether compound can be applied to the ether compound as the adjuster.

Examples of the linear ether compound include, but are not limited to, dimethyl ether, diethyl ether, diphenyl ether, dialkyl ether compounds of ethylene glycol such as ethylene glycol dimethyl ether, ethylene glycol diethyl ether, and ethylene glycol dibutyl ether, and dialkyl ether compounds of diethylene glycol such as diethylene glycol dimethyl ether, diethylene glycol diethyl ether, and diethylene glycol dibutyl ether.

Examples of the cyclic ether compound include, but are not limited to, tetrahydrofuran, dioxane, 2,5-dimethyloxolane, 2,2,5,5-tetramethyloxolane, 2,2-bis(2-oxolanyl)propane, and alkyl ethers of furfuryl alcohol.

Examples of the metal alcoholate compound as the adjuster include, but are not limited to, sodium-t-pentoxide, sodium-t-butoxide, potassium-t-pentoxide, and potassium-t-butoxide.

The method for copolymerizing the conjugated diene compound monomer and the vinyl aromatic hydrocarbon compound monomer with the organic alkali metal compound as a polymerization initiator is not particularly limited and may be batch polymerization, continuous polymerization, or a combination thereof. A batch polymerization method is preferred in view of adjusting the molecular weight distribution to a preferred proper range.

The polymerization temperature is not particularly limited and is usually from 0° C. to 180° C., preferably from 30° C. to 150° C. The time required for the polymerization differs depending on conditions and is usually within 48 hours, preferably from 0.1 to 10 hours.

It is preferred to perform the polymerization in an inert gas atmosphere such as a nitrogen gas atmosphere. The polymerization pressure is not particularly limited as long as the pressure can fall within a range sufficient for maintaining the monomers and a solvent in a liquid phase in the polymerization temperature range described above.

Coupling reaction may be further performed by adding a necessary amount of a di- or higher functional coupling agent at the completion of polymerization. The di- or higher functional coupling agent is not particularly limited, and any coupling agent known in the art can be used. Examples of the difunctional coupling agent include, but are not limited to: dihalogen compounds such as dimethyldichlorosilane and dimethyldibromosilane; and acid esters such as methyl benzoate, ethyl benzoate, phenyl benzoate, and phthalic acid esters.

Examples of the tri- or higher multifunctional coupling agents include, but are not limited to: tri- or higher hydric polyalcohols; polyvalent epoxy compounds such as epoxidized soybean oil and diglycidyl bisphenol A; silicon halide compounds represented by the general formula $R^1_{(4-n)}SiX_n$; and tin halide compounds.

In this context, in the general formula, $R^1$ represents a hydrocarbon group having from 1 to 20 carbon atoms, X represents halogen, and n represents an integer of 3 or 4.

Examples of the silicon halide compounds include, but are not limited to, methylsilyl trichloride, t-butylsilyl trichloride, silicon tetrachloride, and bromides thereof.

Examples of the tin halide compounds include, but are not limited to, polyvalent halogen compounds such as methyltin trichloride, t-butyltin trichloride, and tin tetrachloride. Alternatively, dimethyl carbonate, diethyl carbonate, or the like may be used.

The hydrogenation catalyst for use in the production of the hydrogenated block copolymer is not particularly limited, and a hydrogenation catalyst described in, for example, Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, or Japanese Patent Publication No. 2-9041 can be used.

Preferred examples of the hydrogenation catalyst include titanocene compounds and mixtures of the titanocene compounds with reducing organometallic compounds.

Examples of the titanocene compounds include, but are not particularly limited to, compounds described in Japanese Patent Laid-Open No. 8-109219. Specific examples thereof include compounds having at least one or more ligands having a substituted or unsubstituted cyclopentadienyl structure (e.g., bis(cyclopentadienyl)titanium dichloride and mono(pentamethylcyclopentadienyl)titanium trichloride), an indenyl structure, or a fluorenyl structure.

Examples of the reducing organometallic compounds include, but are not limited to, organic alkali metal compounds such as organolithium, organomagnesium compounds, organoaluminum compounds, organoboron compounds, and organozinc compounds.

The reaction temperature of the hydrogenation reaction is usually from 0 to 200° C., preferably from 30 to 150° C.

The pressure of hydrogen for use in the hydrogenation reaction is preferably from 0.1 to 15 MPa, more preferably from 0.2 to 10 MPa, further preferably from 0.3 to 5 MPa.

The reaction time of the hydrogenation reaction is usually 3 minutes to 10 hours, preferably 10 minutes to 5 hours.

The hydrogenation reaction can employ a batch process or a continuous process, or a combination thereof.

If necessary, catalyst residues may be removed from the reaction solution after the completion of hydrogenation reaction.

Examples of the method for separating the hydrogenated block copolymer from a solvent include, but are not limited to, a method which involves precipitating and recovering the hydrogenated block copolymer by the addition of a polar solvent, such as acetone or an alcohol, which serves as a poor solvent to the hydrogenated block copolymer, to the solution of the hydrogenated block copolymer, a method which involves adding the solution of the hydrogenated block copolymer into hot water with stirring and removing the solvent by steam stripping to recover the hydrogenated block copolymer, and a method which involves distilling off the solvent by directly heating the solution of the hydrogenated block copolymer.

An antioxidant may be added to the reaction solution for the production of the hydrogenated block copolymer (a).

Examples of the antioxidant include, but are not limited to, phenol antioxidants, phosphorus antioxidants, sulfur antioxidants, and amine antioxidants.

Specific examples thereof include 2,6-di-t-butyl-4-methylphenol, n-octadecyl-3-(4'-hydroxy-3',5'-di-t-butyl-phenyl) propionate, tetrakis-[methylene-3-(3',5'-di-t-butyl-4'-hydroxyphenyl)propionate]methane], tris-(3,5-di-t-butyl-4-hydroxybenzyl)isocyanurate, 4,4'-butylidene-bis-(3-methyl-6-t-butylphenol), 3,9-bis[2-{3-(3-t-butyl-4-hydroxy-5-methylphenyl)propionyloxy}-1,1-dimethylethyl]-2,4,8,10-tetraoxaspiro[5,5]undecane, triethylene glycol-bis[3-(3-t-butyl-5-methyl-4-hydroxyphenyl)propionate], 1,6-hexanediol-bis-[3-(3,5-di-t-butyl-4-hydroxyphenyl) propionate], 2,4-bis-(n-octylthio)-6-(4-hydroxy-3,5-di-t-butylanilino)1,3,5-triazine, pentaerythrityl-tetrakis[3-(3,5-di-t-butyl-4-hydroxyphenyl)propionate], 2,2-thio-diethylenebis[3-(3,5-di-t-butyl-4-hydroxyphenyl) propionate], N,N'-hexamethylenebis(3,5-di-t-butyl-4-hydroxy-hydrocinnamamide), 3,5-di-t-butyl-4-hydroxybenzylphosphonate-diethyl ester, 1,3,5-trimethyl-2,4,6-tris(3,5-di-t-butyl-4-hydroxybenzyl)benzene, a mixture of calcium bis(ethyl 3,5-di-t-butyl-4-hydroxybenzylphosphonate) and polyethylene wax (50%), octylated diphenylamine, 2,4-bis[(octylthio)methyl]-o-cresol, isooctyl-3-(3, 5-di-t-butyl-4-hydroxyphenyl)propionate, butyric acid, 3,3-bis(3-t-butyl-4-hydroxyphenyl)ethylene ester, 1,1,3-tris-(2-methyl-4-hydroxy-5-t-butylphenyl)butane, 1,3,5-tris(4-t-butyl-3-hydroxy-2,6-dimethylbenzyl)isocyanurate, 2-t-butyl-6-(3'-t-butyl-5'-methyl-2'-hydroxybenzyl)-4-methylphenyl-acrylate, and 2-[1-(2-hydroxy-3,5-di-t-pentylphenyl)-ethyl]-4,6-di-t-pentylphenyl acrylate.

(Polypropylene Resin (b))

The thermoplastic elastomer of the present embodiment contains a polypropylene resin (b).

Examples of the polypropylene resin (b) include, but are not limited to, propylene homopolymers, block copolymers and random copolymers of propylene with olefins other than propylene, preferably α-olefins having from 2 to 20 carbon atoms, and blends thereof.

Examples of the α-olefins having from 2 to 20 carbon atoms include, but are not limited to, ethylene, 1-butene, 1-hexene, 4-methyl-1-pentene, 1-octene, and 1-decene. An α-olefin having from 2 to 8 carbon atoms is preferred, and ethylene, 1-butene, 1-hexene, or 4-methyl-1-pentene is more preferred.

These polypropylene resins may be used singly or two or more thereof may be used in combination.

The melt flow rate (MFR) of the polypropylene resin (b) determined under conditions involving a temperature of 230° C. and a load of 2.16 kg is preferably from 0.1 to 50 g/10 min, more preferably from 0.5 to 45 g/10 min, further preferably from 1.0 to 40 g/10 min. When MFR falls within the range described above, molding processability tends to be further improved.

Examples of the method for producing the polypropylene resin (b) include, but are not limited to, a production method which involves polymerizing the monomers mentioned above using a Ziegler-Natta-type catalyst containing a titanium-containing solid transition metal component and an organometallic component in combination.

Examples of the transition metal component for use in the Ziegler-Natta-type catalyst include, but are not limited to, solid components containing titanium, magnesium and halogen as essential components and an electron-donating compound as an optional component, and titanium trichloride. Examples of the organometallic component include, but are not limited to, aluminum compounds.

Examples of the polymerization method for producing the polypropylene resin (b) include, but are not limited to, a slurry polymerization method, a vapor-phase polymerization method, a bulk polymerization method, a solution polymerization method, and a multi-stage polymerization method combining these methods.

In these polymerization methods, only propylene is polymerized in the case of obtaining a propylene homopolymer, and propylene and a monomer other than propylene are polymerized in the case of obtaining a copolymer.

In the thermoplastic elastomer composition of the present embodiment, the content of the polypropylene resin (b) is from 10 to 50 parts by mass, preferably from 13 to 50 parts by mass, more preferably from 15 to 45 parts by mass, per 100 parts by mass of the hydrogenated block copolymer (a).

When the content of the polypropylene resin (b) is 10 parts by mass or more, favorable fluidity is obtained in the thermoplastic elastomer composition of the present embodiment, and excellent molding processability and coring properties are obtained. When the content of the polypropylene resin (b) is 50 parts by mass or less, favorable rebound resilience and flexibility are obtained in the thermoplastic elastomer composition of the present embodiment, and excellent needlestick resistance and resealability are obtained.

(Polyphenylene Ether Resin (c))

The thermoplastic elastomer of the present embodiment contains a polyphenylene ether resin (c).

The polyphenylene ether resin (c) is preferably a homopolymer and/or a copolymer having a repeat structure unit represented by the following general formula (I):

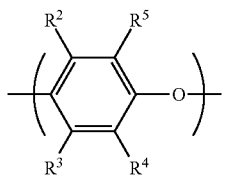
(I)

In the general formula (I), O represents an oxygen atom.

$R^2$ to $R^5$ each independently represent hydrogen, halogen, a primary or secondary C1 to C7 alkyl group, a phenyl group, a C1 to C7 haloalkyl group, a C1 to C7 aminoalkyl group, a C1 to C7 hydrocarbyloxy group, or a halohydrocarbyloxy group (wherein at least two carbon atoms separate the halogen atom from the oxygen atom).

The method for producing the polyphenylene ether resin (c) is not particularly limited, and a method known in the art can be used. Examples thereof include production methods described in U.S. Pat. Nos. 3,306,874, 3,306,875, 3,257,357, 3,257,358, Japanese Patent Laid-Open No. 50-51197, Japanese Patent Publication No. 52-17880, Japanese Patent Publication No. 63-152628, etc.

Examples of the polyphenylene ether resin (c) include, but are not limited to: homopolymers such as poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether); and polyphenylene ether copolymers such as copolymers of 2,6-dimethylphenol with other phenols (e.g., copolymers with 2,3,6-trimethylphenol and copolymers with 2-methyl-6-butylphenol as described in Japanese Patent Publication No. 52-17880).

Among them, poly(2,6-dimethyl-1,4-phenylene ether), a copolymer of 2,6-dimethylphenol and 2,3,6-trimethylphenol, or a mixture thereof is preferred in view of industrial productivity and heat resistance.

The polyphenylene ether resin (c) may be a modified polyphenylene ether resin obtained by complete or partial modification.

In this context, the modified polyphenylene ether resin refers to a polyphenylene ether resin modified with at least one modifying compound having at least one carbon-carbon double bond or triple bond, and at least one carboxylic acid group, acid anhydride group, amino group, hydroxy group or glycidyl group in a molecular structure.

Examples of the modifying compound having at least one carbon-carbon double bond, and carboxylic acid group or acid anhydride group in a molecular structure include, but are not limited to, maleic acid, fumaric acid, chloromaleic acid, cis-4-cyclohexene-1,2-dicarboxylic acid, and acid anhydrides thereof.

Among them, fumaric acid, maleic acid, or maleic anhydride is preferred, and fumaric acid or maleic anhydride is more preferred, in view of the compatibility of the polyphenylene ether resin (c) with the hydrogenated block copolymer (a).

A compound in which one or two of the two carboxyl groups of these unsaturated dicarboxylic acids are esters may be used.

Examples of the modifying compound having at least one carbon-carbon double bond, and glycidyl group in a molecular structure include, but are not limited to, allyl glycidyl ether, glycidyl acrylate, glycidyl methacrylate, and epoxidized natural fat and oil. Among them, glycidyl acrylate or glycidyl methacrylate is preferred.

Examples of the modifying compound having at least one carbon-carbon double bond, and hydroxy group in a molecular structure include, but are not limited to, unsaturated alcohols represented by the general formula $C_nH_{2n-3}OH$ (wherein n is a positive integer) and unsaturated alcohols represented by the general formula $C_nH_{2n-5}OH$ or $C_nH_{2n-7}OH$ (wherein n is a positive integer), such as allyl alcohol, 4-penten-1-ol, and 1,4-pentadien-3-ol.

These various modifying compounds may be used singly or two or more thereof may be used in combination.

The rate of addition of the modifying compound in the modified polyphenylene ether resin (c) is preferably from 0.01 to 5% by mass, more preferably from 0.1 to 3% by mass. An unreacted modifying compound and/or a polymer of the modifying compound may remain, albeit in an amount of less than 1% by mass, in the modified polyphenylene ether resin (c).

The reduced viscosity $\eta sp/C$ of the polyphenylene ether resin (c) (0.5 g/dL, chloroform solution, measurement at 30° C.) is preferably in the range of from 0.15 to 0.70 dL/g, more preferably in the range of from 0.20 to 0.60 dL/g, further preferably in the range of from 0.25 to 0.50 dL/g.

When the reduced viscosity of the polyphenylene ether resin (c) is 0.15 dL/g or higher, favorable recovery characteristics tend to be obtained in the thermoplastic elastomer composition of the present embodiment. When the reduced viscosity of the polyphenylene ether resin (c) is 0.70 dL/g or less, excellent processability tends to be obtained.

The reduced viscosity of the polyphenylene ether resin (c) can be controlled to the numeric range described above by adjusting the type of a catalyst, a polymerization time, and a polymerization temperature in the process of producing the polyphenylene ether resin (c).

In the present embodiment, two or more polyphenylene ether resins differing in reduced viscosity may be blended and used as the polyphenylene ether resin (c) as a whole. In this case, the reduced viscosity of the mixture after mixing of a plurality of polyphenylene ether resins is preferably in the range of from 0.15 to 0.70 dL/g, and the reduced viscosities of the individual polyphenylene ether resins may fall outside the range of from 0.15 to 0.70 dL/g.

The reduced viscosity of the polyphenylene ether resin (c) can be measured by a method described in Examples mentioned later.

The number-average molecular weight Mn of the polyphenylene ether resin (c) is preferably from 1,000 to 50,000, more preferably from 1,500 to 50,000, further preferably from 1,500 to 30,000. When the number-average molecular weight of the polyphenylene ether resin (c) falls within the range described above, the thermoplastic elastomer composition tends to have better recovery characteristics.

The ratio of the number-average molecular weight Mn(A1') of a block chain of the polymer block A1' having the largest number-average molecular weight in the polymer block A1 mentioned above to the number-average molecular weight Mn(c) of the polyphenylene ether resin (c), Mn(A1')/Mn(c), is preferably from 1.2 to 5.0, more preferably from 1.2 to 4.0, further preferably from 1.2 to 3.0.

When the ratio of the number-average molecular weight Mn(A1') of a block chain of the polymer block A1' to the number-average molecular weight Mn(c) of the polyphenylene ether resin (c) falls within the range described above, the compatibility of the polyphenylene ether resin (c) with the hydrogenated block copolymer (a) tends to be more favorable, retention properties for the non-aromatic softener (d) mentioned later also tend to be favorable, and the thermoplastic elastomer composition tends to have better fluid leakage resistance.

The number-average molecular weight of the polyphenylene ether resin (c) can be determined on the basis of the molecular weight of a chromatogram peak in GPC measurement using a calibration curve determined from the measurement of commercially available standard polystyrene (prepared by using the peak molecular weight of standard polystyrene), as in the hydrogenated block copolymer (a) mentioned above.

These polyphenylene ether resins (c) may be used singly or a polyphenylene ether resin (c) refined by blending with a resin such as a polystyrene resin or a polypropylene resin may be used for improving processability.

Examples of the polystyrene resin include, but are not limited to, general-purpose polystyrene (GPPS), high-impact polystyrene (HIPS) obtained by reinforcement with a rubber component, styrene-butadiene copolymers, hydrogenated styrene-butadiene copolymers other than the hydrogenated block copolymer (a) used in the present embodiment, styrene-maleic anhydride copolymers, styrene-acrylonitrile copolymers, styrene-acrylonitrile-butadiene copolymers, and styrene-methyl methacrylate copolymers. These copolymers may be random copolymers or may be block copolymers.

Examples of the polypropylene resin include, but are not limited to, block copolymers and random copolymers of propylene with olefins other than propylene, preferably α-olefins having from 2 to 20 carbon atoms, and blends thereof.

In the thermoplastic elastomer composition of the present embodiment, the content of the polyphenylene ether resin (c) is from 5 to 100 parts by mass, preferably from 10 to 90 parts by mass, more preferably from 20 to 85 parts by mass, further preferably from 30 to 85 parts by mass, per 100 parts by mass of the hydrogenated block copolymer (a).

When the content of the polyphenylene ether resin (c) is 5 parts by mass or more, sufficient recovery characteristics and rebound resilience are obtained. When the content of the polyphenylene ether resin (c) is 100 parts by mass or less, the molding processability of the thermoplastic elastomer composition tends to be favorable.

(Non-Aromatic Softener (d))

The thermoplastic elastomer composition of the present embodiment contains a non-aromatic softener (d).

The non-aromatic softener (d) is not particularly limited as long as the non-aromatic softener (d) does not exhibit aromaticity and is capable of softening the thermoplastic elastomer composition of the present embodiment. Examples thereof include paraffin oil, naphthene oil, paraffin wax, liquid paraffin, white mineral oil, and plant-derived softeners. Among them, paraffin oil, liquid paraffin, or white mineral oil is preferred in view of the low-temperature characteristics, leak-out resistance, and the like of a plug body for medical containers comprising the thermoplastic elastomer composition of the present embodiment.

The kinematic viscosity at 40° C. of the non-aromatic softener (d) is preferably 500 mm$^2$/sec or less. The lower limit value of the kinematic viscosity at 40° C. of the non-aromatic softener (d) is not particularly limited and is preferably 10 mm$^2$/sec or higher.

When the kinematic viscosity at 40° C. of the non-aromatic softener (d) is 500 mm$^2$/sec or less, the fluidity of the thermoplastic elastomer composition of the present embodiment tends to be further improved, and molding processability tends to be further improved.

The kinematic viscosity of the non-aromatic softener (d) can be measured using a glass capillary viscometer.

A non-aromatic softener (d) comprising a non-aromatic softener (d-1) having a kinematic viscosity at 40° C. in the range of from 300 to 400 mm$^2$/sec can be suitably used as the non-aromatic softener (d).

When the non-aromatic softener (d) comprises the non-aromatic softener (d-1) having a kinematic viscosity at 40° C. that falls within the range described above, the thermoplastic elastomer composition of the present embodiment tends to have favorable non-aromatic softener retention properties, i.e., oil retention properties, and the balance between recovery characteristics and rebound resilience tends to be improved.

A non-aromatic softener (d) comprising a non-aromatic softener (d-2) having a kinematic viscosity of 100 mm$^2$/sec or less at 40° C. can be suitably used as the non-aromatic softener (d).

When the non-aromatic softener (d) comprises the non-aromatic softener (d-2) having a kinematic viscosity of 100 mm$^2$/sec or less at 40° C., the thermoplastic elastomer composition tends to have better flexibility and molding processability while maintaining favorable oil retention properties.

Two or more non-aromatic softeners differing in kinematic viscosity at 40° C. may be combined as the non-aromatic softener (d).

For example, the non-aromatic softener (d-1) and the non-aromatic softener (d-2) can be used in combination.

The combination of the non-aromatic softener (d-1) and the non-aromatic softener (d-2) can improve non-aromatic softener retention properties and tends to further improve the balance among flexibility, recovery characteristics, rebound resilience, and molding processability.

In the case of using the non-aromatic softener (d-1) and the non-aromatic softener (d-2) in combination, the mass ratio of the non-aromatic softener (d-1) to the non-aromatic softener (d-2), (d-1)/(d-2), is preferably from 30/70 to 60/40, more preferably from 35/75 to 60/40, further preferably from 40/60 to 60/40.

(d-1)/(d-2) in the range of from 30/70 to 60/40 is preferred because the balance among flexibility, recovery characteristics, rebound resilience, and molding processability tends to be further improved.

In the thermoplastic elastomer composition of the present embodiment, the content of the non-aromatic softener (d) is from 75 to 200 parts by mass, preferably from 95 to 190 parts by mass, more preferably from 115 to 180 parts by mass, per 100 parts by mass of the hydrogenated block copolymer (a).

When the content of the non-aromatic softener (d) falls within the range described above, retention properties for the non-aromatic softener (d) can be further improved, and the thermoplastic elastomer composition tends to have better molding processability and recovery characteristics.

In the case of combining two or more non-aromatic softeners differing in kinematic viscosity at 40° C., the total content of the whole non-aromatic softener (d), for example, the total content of the non-aromatic softener (d-1) and the non-aromatic softener (d-2), is from 75 to 200 parts by mass, preferably from 95 to 190 parts by mass, more preferably from 115 to 180 parts by mass, per 100 parts by mass of the hydrogenated block copolymer (a).

When the total content of the whole non-aromatic softener (d) falls within the range described above, there is a tendency that the characteristics of both the two or more non-aromatic softeners combined can be favorably exerted.

In the present embodiment, further preferably, the non-aromatic softener (d) is a mixture of a non-aromatic softener (d-1) having a kinematic viscosity of from 300 to 400 mm$^2$/sec at 40° C., and a non-aromatic softener (d-2) having a kinematic viscosity of 100 mm$^2$/sec or less at 40° C., the mass ratio of the non-aromatic softener (d-1) to the non-aromatic softener (d-2), (d-1)/(d-2), is from 30/70 to 60/40, and the total content of the non-aromatic softener (d-1) and the non-aromatic softener (d-2) is from 100 to 200 parts by mass per 100 parts by mass of the hydrogenated block copolymer (a).

(Inorganic Filler (e))

The thermoplastic elastomer composition of the present embodiment preferably contains an inorganic filler (e) in view of needle retention properties.

Examples of the inorganic filler (e) include, but are not limited to, talc, calcium carbonate, calcium oxide, zinc carbonate, wollastonite, zeolite, wollastonite, silica, alumina, clay, titanium oxide, magnesium hydroxide, magnesium oxide, sodium silicate, calcium silicate, magnesium silicate, sodium aluminate, calcium aluminate, sodium aluminosilicate, zinc oxide, potassium titanate, hydrotalcite, barium sulfate, titanium black, and carbon black such as furnace black, thermal black, and acetylene black.

These inorganic fillers may be used singly, or two or more thereof may be used in combination. Among them, talc, calcium carbonate, silica, or clay is preferred, and talc or calcium carbonate is more preferred, in view of the resealability and the like of a plug body for medical containers comprising the thermoplastic elastomer composition of the present embodiment.

In the case of using the thermoplastic elastomer composition of the present embodiment as a material for a rubber plug for medical containers, it is assumed that the rubber plug is subjected to steam sterilization treatment at approximately from 110° C. to 121° C. in a state incorporated in a cap or a holder. In this respect, a sufficient swaging effect might not be obtained if the dimension of the rubber plug is changed by heating.

The present inventor has found that deterioration in the resealability after steam sterilization treatment of the rubber plug for medical containers can be prevented by adopting a surface-treated inorganic filler (e) as the inorganic filler (e).

Examples of the method for surface-treating the inorganic filler (e) include a method involving bringing a surface-treatment agent and/or a solution thereof into contact with the surface of the inorganic filler.

When the surface treatment agent is, for example, a fatty acid, a resin acid, a fat and oil, or a surfactant, the surface treatment is performed as dry treatment by mixing the surface treatment agent in a powder form with the inorganic filler, and melting and chemically reacting the mixture while crushing the mixture in a heated crusher (e.g., a ball mill and a roller mill) or mixer (e.g., a ribbon blender and a Henschel mixer).

In the case of using a non-water-soluble surface treatment agent having a high melting point, the surface treatment is performed by preparing an emulsion of the surface treatment agent or a solution of the surface treatment agent dissolved in an alcohol, and stirring and mixing the emulsion or the solution with the inorganic filler while injecting the emulsion or the solution into a crusher or a mixer, followed by drying.

The inorganic filler is surface-treated in wet treatment by adding the surface treatment agent to slurry at the time of synthesis of the inorganic filler, and stirring the mixture in a mixer or the like with heating. In the case of using a surface treatment agent having a high melting point, the surface treatment is performed by using an emulsion of the surface treatment agent, and similarly adding the emulsion at the time of synthesis of the inorganic filler, followed by stirring.

In the case of using a water-soluble coupling agent as the surface treatment agent, the surface treatment is usually performed by pH-adjusting a mixed solution of water and ethanol, then adding the coupling agent into the solution, and spraying the mixture into a heated high-speed stirring mixer (e.g., a Henschel mixer) containing the inorganic filler to cause chemical reaction with the surface of the inorganic filler. In the case of using a non-water-soluble coupling agent as the surface treatment agent, the inorganic filler is surface-treated by dissolving the coupling agent in acetone, an alcohol, or the like, and spraying the solution into a heated high-speed stirring mixer containing the inorganic filler in the same way as above.

The surface treatment agent is typically a fatty acid, a resin acid, a fat and oil, a surfactant, or a coupling agent (e.g., silane, titanium, phosphoric acid, and carboxylic acid coupling agents), but is not limited thereto as long as the surface treatment agent can act on the surface of the inorganic filler.

Examples of the fatty acid include, but are not limited to: saturated fatty acids such as caproic acid, caprylic acid, pelargonic acid, capric acid, lauric acid, myristic acid, palmitic acid, stearic acid, and behenic acid, their metal salts, and their modified products; and unsaturated fatty acids such as oleic acid, linoleic acid, erucic acid, eicosadienoic acid, docosadienoic acid, linolenic acid, eicosatetraenoic acid, tetracosapentaenoic acid, and docosahexaenoic acid, their metal salts, and their modified products.

Examples of the resin acid include, but are not limited to, rosins having main components such as abietic acid, neoabietic acid, palustric acid, pimaric acid, isopimaric acid, and dehydroabietic acid, and their derivatives.

Examples of the fat and oil include, but are not limited to, soybean oil, linseed oil, coconut oil, and safflower oil.

Examples of the surfactant include, but are not limited to: fatty acid-type anionic surfactants such as sodium stearate and potassium stearate; sulfuric acid ester-type anionic surfactants such as polyoxyethylene alkyl ether sulfuric acid ester, long-chain alcohol sulfuric acid ester, and their sodium salts and potassium salts; sulfonic acid-type anionic surfactants such as alkylbenzenesulfonic acid, alkylnaphthalenesulfonic acid, paraffin sulfonic acid, α-olefin sulfonic acid, alkylsulfosuccinic acid, and their sodium salts and potassium salts; and nonionic surfactants such as polyethylene glycol, polyvinyl alcohol and their derivatives.

Examples of the silane coupling agent include, but are not limited to: alkyl group-containing silane coupling agents such as dimethyldichlorosilane, trimethylchlorosilane, dimethyldimethoxysilane, trimethylmethoxysilane, dimethyldiethoxysilane, n-propyltrimethoxysilane, n-propyltriethoxysilane, hexyltrimethoxysilane, hexyltriethoxysilane, and polydimethylsiloxane; phenyl group-containing silane coupling agents such as phenyltrichlorosilane, phenyltrimethoxysilane, and phenyltriethoxysilane; vinyl group-containing silane coupling agents such as vinyltrimethoxysilane and vinyltriethoxysilane; styryl group-containing silane coupling agents such as p-styryltrimethoxysilane; epoxy group-containing silane coupling agents such as 3-glycidoxypropylmethyldimethoxysilane; methacryl group-containing silane coupling agents such as 3-methacryloxypropylmethyldimethoxysilane, and acryl group-containing silane coupling agents such as 3-acryloxypropylmethyldimethoxysilane; and amino group-containing silane coupling agents such as hexamethyldisilazane and N-2-(aminoethyl)-3-aminopropylmethyldimethoxysilane.

Examples of the titanium coupling agent include, but are not limited to, titanium isostearate, tetrastearyl titanate, tetraisopropyl titanate, isopropyl triisostearoyl titanate, titanium octylene glycolate compounds, titanium diethanol aminate, titanium aminoethyl aminoethanolate, bis(dioctylpyrophosphate) oxyacetate titanate, tris(dioctylpyrophosphate) ethylene titanate, isopropyl dioctylpyrophosphate titanate, isopropyl tris(dioctylpyrophosphate) titanate, isopropyl tris(dodecylbenzenesulfonyl) titanate, titanium tetra-normal butoxide, titanium tetra-2-ethylhexoxide, tetraoctyl bis(ditridecylphosphite) titanate, tetraisopropyl bis(dioctylphosphite) titanate, and tetra(2,2-diallyloxymethyl-1-butyl)bis(ditridecyl)phosphite titanate.

Examples of the phosphoric acid coupling agent include, but are not limited to: phosphoric acid triesters such as tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate, and xylenyl diphenyl phosphate; acidic phosphoric acid esters such as monobutyl acid phosphate, monopentyl acid phosphate, monohexyl acid phosphate, monoheptyl acid phosphate, monooctyl acid phosphate, mononoyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, and dioleyl acid phosphate; thiophosphoric acid esters such as tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyl diphenyl phosphorothionate, and xylenyl diphenyl phosphorothionate; chlorinated phosphoric acid esters such as tris-dichloropropyl phosphate, tris-chloroethyl phosphate, tris-chlorophenyl phosphate, and polyoxyalkylene-bis[di(chloroalkyl)]phosphate; and phosphorous acid esters such as dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite.

Examples of the carboxylic acid coupling agent include, but are not limited to, carboxylated polybutadiene and hydrogenated products thereof, carboxylated polyisoprene and hydrogenated products thereof, carboxylated polyolefin, carboxylated polystyrene, carboxylated styrene-butadiene copolymers and hydrogenated products thereof, and carboxylated nitrile rubber.

In the case of using the thermoplastic elastomer composition of the present embodiment as a material for a plug body for medical containers, among them, a fatty acid or a modified product thereof, or a silane coupling agent is preferred as the surface treatment agent in view of resealability after steam sterilization treatment. The silane coupling agent is more preferably a trimethylsilyl-based silane coupling agent or a dimethylsilyl-based silane coupling agent.

The combination with the inorganic filler is preferably calcium carbonate surface-treated with a fatty acid or a modified product thereof, or silica surface-treated with a silane coupling agent, more preferably silica surface-treated with a silane coupling agent, further preferably silica surface-treated with a trimethylsilyl-based silane coupling agent or a dimethylsilyl-based silane coupling agent, in view of resealability after steam sterilization treatment.

In the thermoplastic elastomer composition of the present embodiment, the total content of the inorganic filler (e) is preferably from 1 to 150 parts by mass, more preferably from 3 to 130 parts by mass, further preferably from 5 to 110 parts by mass, still further preferably from 10 to 100 parts by mass, even further preferably from 15 to 90 parts by mass, per 100 parts by mass of the hydrogenated block copolymer (a).

When the content of the inorganic filler (e) falls within the range described above, excellent needle retention properties tend to be obtained in a plug body for use in medical containers comprising the thermoplastic elastomer composition of the present embodiment.

The average primary particle size of the inorganic filler (e) is preferably from 0.01 µm to 5 µm, more preferably from 0.01 µm to 4 µm, further preferably from 0.01 µm to 3 µm.

When the average primary particle size of the inorganic filler (e) is 0.01 µm or more, an effect of improving the flexibility of the thermoplastic elastomer composition is obtained. When the average primary particle size of the inorganic filler (e) is 5 µm or less, an effect of improving uniform dispersibility in the thermoplastic elastomer composition is obtained.

(Inorganic Adsorbent (f))

The thermoplastic elastomer composition of the present embodiment may further contain an inorganic adsorbent (f) in view of improvement in odor.

The inorganic adsorbent (f) is preferably a porous inorganic compound in a powder form having a specific surface area of 50 m²/g or more according to a BET method. Examples thereof include, but are not limited to: zeolite, i.e., aluminosilicate having a main component consisting of $SiO_2$ and $Al_2O_3$, having a three-dimensional crystal structure, not a mere mixture thereof, as one compound, and having a complex skeleton represented by the formula (II) given below; complexes of $SiO_2$ and $Al_2O_3$ with other metal oxides or metal salts (having a three-dimensional crystal structure, not a mere mixture thereof, as one compound); porous silica such as silica gel and mesoporous silica; and porous ceramics such as active carbon, γ-alumina, θ-alumina, and nano-size titanium oxide.

Only one of these inorganic compounds may be used, or two or more thereof may be used in combination.

For a plug body for medical containers, among them, zeolite or a complex of $SiO_2$ and $Al_2O_3$ with any of other metal oxides or metal salts is preferred in view of improvement in odor.

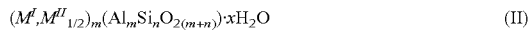
$$(M^I, M^{II}{}_{1/2})_m(Al_mSi_nO_{2(m+n)}) \cdot xH_2O \qquad (II)$$

wherein $M^I$ is a monovalent metal cation such as $Li^+$, $Na^+$, or $K^+$; $M^{II}$ is a divalent metal cation such as $Ca^{2+}$, $Mg^{2+}$, or $Ba^{2+}$; when a plurality of $M^I$ or $M^{II}$ moieties are present, the moieties are the same as or different from each other; and each of n and m is an integer of 2 or more with n≥m.

The specific surface area of the inorganic adsorbent (f) according to a BET method is preferably 50 $m^2/g$ or more, more preferably 100 $m^2/g$ or more, further preferably 200 $m^2/g$ or more.

In the case of adding the inorganic compound having this degree of the specific surface area, such as silica, as the inorganic filler (e) mentioned above, the inorganic filler (e) is capable of functioning as an adsorbent without separately adding the inorganic adsorbent (f).

In the case of requiring higher adsorption performance, it is preferred to further add an adsorbent having a much higher specific surface area, such as porous silica, as the inorganic adsorbent (f). The specific surface area of the porous silica as the inorganic adsorbent (f) is preferably 400 $m^2/g$ or more, more preferably 600 $m^2/g$ or more, further preferably 800 $m^2/g$ or more.

In the thermoplastic elastomer composition of the present embodiment, the content of the inorganic adsorbent (f) is preferably from 1 to 30 parts by mass, more preferably from 3 to 30 parts by mass, further preferably from 4 to 25 parts by mass, still further preferably from 5 to 20 parts by mass, per 100 parts by mass of the hydrogenated block copolymer (a).

When the compounded amount of the inorganic adsorbent (f) falls within the range described above, the thermoplastic elastomer composition tends to further improve the odor of the plug body of the present embodiment.

(Organic Peroxide (g))

The thermoplastic elastomer composition of the present embodiment may be partially cross-linked in the presence of an organic peroxide (g) in view of recovery characteristics.

Examples of the organic peroxide (g) include, but are not limited to, 2,5-dimethyl-2,5-di(t-butylperoxy)hexane, dicumyl peroxide, 2,5-dimethyl-2,5-di(benzoylperoxy)hexane, t-butyl peroxybenzoate, t-butyl cumyl peroxide, diisopropylbenzene hydroxy peroxide, 1,3-bis(t-butylperoxyisopropyl)benzene, benzoyl peroxide, 1,1-di(t-butylperoxy)-3,3,5-trimethylcyclohexane, t-butyl hydroperoxide, 1,1,3,3-tetramethylbutyl hydroperoxide, cumene hydroperoxide, di-t-butyl peroxide, 1,1-di-t-butylperoxy-cyclohexane, 2,5-dimethyl-2,5-di(t-butylperoxy) hexyne-3, n-butyl-4,4-bis(t-butylperoxy)valerate, t-butyl peroxyisobutyrate, t-butyl peroxy-2-ethylhexanoate, and t-butyl peroxyisopropylcarbonate.

These organic peroxides may be used singly or two or more of the organic peroxides may be used in combination.

The amount of the organic peroxide (g) used is preferably from 0.05 to 5 parts by mass, more preferably from 0.1 to 4 parts by mass, further preferably from 0.3 to 3 parts by mass, per 100 parts by mass of the hydrogenated block copolymer (a).

When the amount of the organic peroxide (g) used falls within the range described above, the thermoplastic elastomer composition tends to be excellent in recovery characteristics without reducing processability.

(Crosslinking Coagent (h))

In the case of partially cross-linking the thermoplastic elastomer composition of the present embodiment, a crosslinking coagent can be used, if necessary, for adjusting the degree of cross-linking.

Examples of the crosslinking coagent (h) include, but are not limited to, trimethylolpropane triacrylate, triallyl isocyanurate, triallyl cyanurate, triallyl formal, triallyl trimellitate, N,N'-m-phenylene bismaleimide, dipropargyl terephthalate, diallyl phthalate, tetraallyl terephthalamide, triallyl phosphate, divinylbenzene, ethylene dimethacrylate, diallyl phthalate, quinone dioxime, ethylene glycol dimethacrylate, polyfunctional methacrylate monomers, polyhydric alcohol methacrylate and acrylate, and unsaturated silane compounds (e.g., vinyltrimethoxysilane and vinyltriethoxysilane).

These crosslinking coagents (h) may be used singly, or two or more thereof can be used in combination, if necessary.

The amount of the crosslinking coagent (h) used is preferably from 0.1 to 10 parts by mass, more preferably from 0.2 to 8 parts by mass, further preferably from 0.5 to 7 parts by mass, per 100 parts by mass of the hydrogenated block copolymer (a).

(Other Components)

The thermoplastic elastomer composition of the present embodiment may further comprise other additives in addition to the components (a) to (h) mentioned above without impairing the object of the present embodiment.

Examples of such other additives include heat stabilizers, antioxidants, ultraviolet absorbers, antiaging agents, plasticizers, light stabilizers, crystal nucleating agents, impact modifiers, pigments, lubricants, antistatic agents, flame retardants, flame retardant aids, compatibilizing agents, and tackifiers.

Particularly, the addition of silicone oil as a lubricant improves slidability and is effective for reduction in needlestick resistance and improvement in coring.

Examples of the type of the silicone oil include general dimethylpolysiloxane and phenyl-methylpolysiloxane. Particularly, dimethylpolysiloxane is preferred.

The amount of the silicone oil added is preferably from 0.5 to 10 parts by mass, more preferably from 0.7 to 7 parts by mass, further preferably from 1.0 to 5 parts by mass, per 100 parts by mass of the hydrogenated block copolymer (a). The kinematic viscosity of the silicone oil is not particularly limited and is preferably from 10 to 10000 $mm^2/sec$, more preferably from 50 to 7000 $mm^2/sec$, further preferably from 100 to 5000 $mm^2/sec$.

These additives may be used singly, or two or more thereof may be used in combination.

(Characteristics of Thermoplastic Elastomer Composition)

The thermoplastic elastomer composition of the present embodiment preferably has a Shore A hardness of 55 or less and a permanent elongation or distortion after 100% elongation of 5% or less, more preferably a Shore A hardness of 55 or less, a compression set of 40% or less at 70° C., and a permanent elongation or distortion after 100% elongation of 5% or less, in view of flexibility, strain recovery properties, needle penetrability, and fluid leakage resistance.

When the Shore A hardness is 55 or less, the compression set at 70° C. is 40% or less, and the permanent elongation or distortion after 100% elongation is 5% or less, sufficient flexibility and strain recovery properties tend to be more reliably obtained, and needle penetrability and fluid leakage resistance tend to be also excellent.

From a similar viewpoint, more preferably, the Shore A hardness is 53 or less, the compression set at 70° C. is 37% or less, and the permanent elongation or distortion after 100% elongation is 4.7% or less. Further preferably, the Shore A hardness is 50 or less, the compression set at 70° C. is 35% or less, and the permanent elongation or distortion after 100% elongation is 4.5% or less.

Although there is no particular lower limit thereon, the Shore A hardness is preferably 20 or more, the compression set at 70° C. is preferably 0.01% or more, and the permanent elongation or distortion after 100% elongation is preferably 0.01% or more.

The Shore A hardness, the compression set at 70° C., and the permanent elongation or distortion after 100% elongation can be measured by methods described in Examples mentioned later.

In the thermoplastic elastomer of the present embodiment, the Shore A hardness, the compression set at 70° C., and the permanent elongation or distortion after 100% elongation can be controlled to the numeric ranges described above by adjusting the contents of the hydrogenated block copolymer (a), the polypropylene resin (b), the polyphenylene ether resin (c), and the non-aromatic softener (d), adjusting the content or structure (e.g., molecular weight) of the vinyl aromatic hydrocarbon compound monomer unit in the hydrogenated block copolymer (a), or adjusting the molecular weights, MFR, viscosities, etc. of the components (b) to (d).

(Method for Producing Thermoplastic Elastomer Composition)

The method for producing the thermoplastic elastomer composition of the present embodiment is not particularly limited, and a conventional method known in the art can be applied thereto.

Examples thereof include a melt kneading method using a general mixing machine such as a pressure kneader, a Banbury mixer, an internal mixer, Labo Plastomill, Mix Labo, a single-screw extruder, a twin-screw extruder, a co-kneader, or a multi-screw extruder, and a method which involves dissolving or dispersing each component, mixing the components, and removing a solvent by heating.

In the case of partially cross-linking the thermoplastic elastomer composition of the present embodiment with the organic peroxide (g) mentioned above, the complexion of the components (a) to (f) and the partial cross-linking with the organic peroxide (g) (and the crosslinking coagent (h) optionally added) may be performed at the same time, or the partial cross-linking may be performed by the addition of the organic peroxide (g) and optionally the crosslinking coagent (h) after the complexion of the component (a) to the component (f).

Alternatively, a portion of the component (a) to the component (f), the organic peroxide (g) and optionally the crosslinking coagent (h) may be mixed for cross-linking, followed by the mixing of the remaining components.

The partial cross-linking can be performed at a temperature that causes the degradation of the organic peroxide (g) used, generally, under temperature conditions of from 150 to 250° C.

In the case of performing the partial or complete complexion of the components (a) to (f) and the cross-linking with the organic peroxide (g) (and the crosslinking coagent (h) optionally added) at the same time, the complexion may be performed, for example, by using the melt kneading machine described above at a temperature that causes the degradation of the organic peroxide (g) used.

[Plug Body and Container]

The plug body of the present embodiment comprises the thermoplastic elastomer composition of the present embodiment.

The container of the present embodiment comprises the plug body of the present embodiment.

The plug body of the present embodiment is a molded article of the thermoplastic elastomer composition of the present embodiment comprising 100 parts by mass of a hydrogenated block copolymer (a), from 10 to 50 parts by mass of a polypropylene resin (b), from 5 to 100 parts by mass of a polyphenylene ether resin (c), and from 75 to 200 parts by mass of a non-aromatic softener (d), and preferably has the property of not transmitting light in a needlestick test under specific conditions.

The "needlestick test under specific conditions" is a test carried out as follows: a disk-shaped article of 20 mm in diameter and 4 mm in thickness is prepared from the plug body; the disk-shaped article is heated at 121° C. for 10 minutes while the disk-shaped article is fitted into a jig or a lid body of a container of 20 mm in inside diameter and 3.5 mm in inside thickness; a resin needle having a maximum diameter of 5 mm is stuck into the disk-shaped article and removed therefrom; and then it is examined whether or not the disk-shaped article transmits light.

The needlestick hole is closed within 30 seconds, preferably within 20 seconds, more preferably within 10 seconds, after removal of the needle. Therefore, the light transmission is observed from the point of time within 10 seconds to the point of time of a lapse of 30 seconds or longer after removal of the needle while the disk-shaped article is irradiated with light from the side opposite to the surface from which the needle is stuck. Light transmissivity can be visually observed. When a sample does not transmit light after a lapse of 30 seconds, the sample is determined to be non-light transmissive, i.e., to have a light transmittance of 0%.

The illuminance of the light for irradiation is not particularly limited as long as the needlestick hole is rendered visible. The illuminance of the light is preferably from 1 to 500 (lm), more preferably from 5 to 300 (lm), further preferably from 10 to 100 (lm), in view of the visibility of the hole.

The distance of the light irradiation is not particularly limited as long as the needlestick hole is rendered visible. The distance is preferably from 1 to 100 cm, more preferably from 2 to 50 cm, further preferably from 3 to 30 cm, from the surface on the front side (observation side) of the molded product in view of the visibility of the hole.

The "disk shaped article of 20 mm in diameter and 4 mm in thickness" as the shape of the plug body does not limit the shape of the plug body of the present embodiment and defines the conditions of the needlestick test.

When a plug body is a "disk-shaped article of 20 mm in diameter and 4 mm in thickness," the plug body can be subjected directly to the needlestick test. In the case where a plug body has a different shape from such a disk shaped article, the thermoplastic elastomer composition for forming the plug body is molded into a "disk shaped article of 20 mm in diameter and 4 mm in thickness" and then the disk shaped article is subjected to the needlestick test for light transmission.

The property of not leaking a fluid after needlestick is not directly related to the property of not transmitting light by the closure of the needlestick hole. However, as a result of conducting diligent studies, the present inventor has found that in the case of requiring the property of not leaking a fluid after needlestick, a plug body that does not transmit light in the test mentioned above is unlikely to leak a fluid.

For examining the fluid leakage of each plug body after molding, a test involving bringing the plug body into contact with a fluid has been essential. However, this finding enables the presence or absence of fluid leakage to be conveniently examined and is therefore a practical finding on very useful performance.

(Use)

The plug body of the present embodiment is preferably used in a medical airtight container or sealed container. In a typical application for the purpose of sticking an injection needle, a columnar plug body is fitted into a schematically cylindrical lid body or a predetermined jig and used integrally with the lid body or the jig.

Examples of the jig include, but are not limited to, predetermined frames, caps, housings, and encapsulants. Specific examples of the application include a cap for transfusion bags.

The columnar plug body may also be used alone. In this case, the plug body is fitted into the mouth of a glass bottle and functions as a sealable plug.

For the purpose of not sticking an injection needle, a disk-shaped plug body is fitted into the inner surface of a lid for a container that can be sealed with screws or the like, and thereby contributes to improvement in sealability.

The container of the present embodiment comprises the plug body of the present embodiment.

An airtight container or a sealed container is preferred as a medical container. Examples thereof include, but are not limited to, transfusion bags, peritoneal dialysis bags, transfusion bottles, transfusion soft bottles, glass vials, and plastic vials.

Examples of the shape of the plug body of the present embodiment include, but are not particularly limited to, truncated cone, columnar, and disk shapes. The diameter thereof is usually on the order of from 5 to 25 mm. The thickness of the plug body of the present embodiment, and specifically, the thickness thereof in the direction of insertion of an injection needle for the purpose of sticking the injection needle, is not particularly limited and is usually on the order of from 2 to 10 mm.

(Method for Producing Plug Body)

The plug body can be produced by, for example, but not particularly limited to, injection molding, compression molding, or punching from extrusion molding.

The plug body is preferably produced by injection molding in view of dimensional accuracy and surface roughness reproducibility.

EXAMPLES

Hereinafter, the present embodiment will be described in detail with reference to specific Examples and Comparative Examples. However, the present embodiment is not limited by Examples given below.

Evaluation methods and measurement methods for physical properties applied to Examples and Comparative Examples will be first described below.

[Method for Evaluating Hydrogenated Block Copolymer (a)]

((1) Weight-Average Molecular Weight, Number-Average Molecular Weight, and Molecular Weight Distribution)

The weight-average molecular weight (Mw), number-average molecular weight (Mn), and molecular weight distribution(Mw/Mn) of the hydrogenated block copolymer (a) were determined on the basis of the molecular weight of a chromatogram peak using a calibration curve determined from the measurement on commercially available standard polystyrene (created by using the peak molecular weight of standard polystyrene).

HLC-8320 ECOSEC for collection was used as measurement software, and HLC-8320 ECOSEC for analysis was used as analysis software.

(Measurement Conditions)
GPC: HLC-8320 GPC (manufactured by Tosoh Corp.)
Detector: RI
Detection sensitivity: 3 MV/min
Sampling pitch; 600 MSEC
Column: TSKGEL SUPERHZM-N (6 MMI. D×15 CM), 4 columns (manufactured by Tosoh Corp.)
Solvent: THF
Flow rate: 0.6 ML/min
Concentration: 0.5 MG/ML
Column temperature: 40° C.
Injection volume: 20 ML ((2) Number-Average Molecular Weight of Polymer Block A1' in Hydrogenated Block Copolymer (a-1))

The number-average molecular weight Mn of the polymer block A1' in the hydrogenated block copolymer (a-1) was determined in terms of a polystyrene by oxidatively degrading each of <hydrogenated block copolymers (1) to (12)> mentioned later with t-butyl hydroperoxide with osmium tetroxide as a catalyst in accordance with the method described in I. M. KOLTHOFF, et al., J. Polym. Soi. 1, 429 (1946), and measuring the number-average molecular weight of the resultant using GPC in the same method as the that described above in [(1) Weight-average molecular weight, number-average molecular weight, and molecular weight distribution].

((2') Content of Polystyrene Block in Hydrogenated Block Copolymer (a-1))

The content of a polystyrene block was determined by oxidatively degrading each of the hydrogenated block copolymers (1) to (12) with t-butyl hydroperoxide with osmium tetroxide as a catalyst, then precipitating the resultant in methanol for solid-liquid separation, analyzing the precipitates using an ultraviolet spectrophotometer (manufactured by Shimadzu Corp., UV-2450), and calculating the content of a polystyrene block using a calibration curve from the peak intensity of an absorption wavelength (262 nm) attributed to the vinyl aromatic compound component (styrene).

((3) Content of all Vinyl Aromatic Hydrocarbon Compound Monomer Units (Total Styrene Content))

A given amount of the hydrogenated block copolymer was dissolved in chloroform, and the solution was analyzed using an ultraviolet spectrophotometer (manufactured by Shimadzu Corp., UV-2450). The content of vinyl aromatic monomer units (styrene) was calculated using a calibration curve from the peak intensity of an absorption wavelength (262 NM) attributed to the vinyl aromatic compound component (styrene).

((4) Vinyl Bond Content)

The vinyl bond content of the conjugated diene monomer unit in the block copolymer was determined using a nuclear magnetic resonance apparatus (NMR) under conditions given below.

After the completion of all reactions (for the hydrogenated blockcopolymer, after the completion of hydrogenation reaction), methanol was added in a large amount to the reaction solution to precipitate and recover the block copolymer. Subsequently, the block copolymer was extracted with acetone, and the extract was vacuum-dried and used as a sample for 1H-NMR analysis. The 1H-NMR analysis conditions will be described below.

(Measurement Conditions)

Measurement equipment: JNM-LA400 (manufactured by JEOL Ltd.)

Solvent: deuterated chloroform
Sample concentration: 50 MG/ML
Observation frequency: 400 MHZ
Chemical shift reference: TMS (tetramethylsilane)
Pulse delay: 2.904 seconds
The number of scans: 64
Pulse width: 45°
Measurement temperature: 26° C.

The vinyl bond content was determined from the ratio of the total peak area of 1,2-bonds and 3,4-bonds to the total area of all peaks related to the conjugated diene monomer unit (1,2-bonds, 3,4-bonds, and 1,4-bonds) in the obtained peaks.

((5) Degree of Hydrogenation)

The degree of hydrogenation of double bonds in the conjugated diene monomer unit in the block copolymer was determined using a nuclear magnetic resonance apparatus (NMR) under the same conditions as in ((4) Vinyl bond content) described above.

The degree of hydrogenation was determined from the ratio of the total peak area of hydrogenated 1,2-bonds, hydrogenated 3,4-bonds and hydrogenated 1,4-bonds to the total area of all peaks related to double bonds in the conjugated diene monomer unit (1,2-bonds, 3,4-bonds, and 1,4-bonds) in the obtained peaks.

[Method for Evaluating Polyphenylene Ether Resin (c)]

((6) Reduced Viscosity of Polyphenylene Ether Resin (c))

A 0.5 g/dL solution of the polyphenylene ether resin (c) in chloroform was prepared, and the reduced viscosity (ηsp/c) [dL/g] at 30° C. thereof was determined using an Ubbelohde capillary viscometer.

((7) Number-Average Molecular Weight of Polyphenylene Ether Resin (c))

The number-average molecular weight was measured by GPC using HLC-8320 GPC (manufactured by Tosoh Corp.) under the same conditions as in (1) described above.

((8) Average Particle Size of Polyphenylene Ether Resin (c)))

The average particle size of the polyphenylene ether resin (c) was determined by dispersing the polyphenylene ether resin (c) in a 1-butanol solvent, analyzing the resultant three or more times using a laser diffraction-type particle size distribution analyzer (manufactured by Beckman Coulter, Inc., product name: LS-230), and, obtaining an arithmetic average of volume-average median diameters.

[Production of Thermoplastic Elastomer Composition]

Examples 1 to 29 and Comparative Examples 1 to 11

Pellets of each thermoplastic elastomer composition were obtained by melt kneading the blend in the ratio (parts by mass) shown below in Tables 5 to 8 using a twin-screw extruder ("TEX-30αII" manufactured by The Japan Steel Works, LTD., cylinder aperture: 30 mm) at a set temperature of 250° C.

Examples 30 to 52 and Comparative Examples 12 to 23

Pellets of each thermoplastic elastomer composition were obtained by melt kneading the blend in the ratio (parts by mass) shown below in Tables 9 to 11 using a twin-screw extruder ("TEX-30αII" manufactured by The Japan Steel Works, LTD., cylinder aperture: 30 mm) at a set temperature of 250° C.

Examples 53 to 59

Pellets of each thermoplastic elastomer composition were obtained by melt kneading the blend in the ratio (parts by mass) shown below in Table 12 using a twin-screw extruder ("TEX-30αII" manufactured by The Japan Steel Works, LTD., cylinder aperture: 30 mm) at a set temperature of 250° C.

Examples 60 to 82

Pellets of each thermoplastic elastomer composition were obtained by melt kneading the blend in the ratio (parts by mass) shown below in Tables 13 and 14 using a twin-screw extruder ("TEX-30αII" manufactured by The Japan Steel Works, LTD., cylinder aperture: 30 mm) at a set temperature of 250° C.

[Method for Evaluating Thermoplastic Elastomer Composition]

((9) Melt Flow Rate (MFR))

The melt flow rate (MFR) of the pellets of the thermoplastic elastomer composition obtained as mentioned above was measured in accordance with ASTM D 1238 under conditions of a temperature of 230° C. and a load of 2.16 kg.

[Preparation of Press Sheet]

The pellets of the thermoplastic elastomer composition obtained as mentioned above were preheated at 200° C. for 5 minutes under pressurization conditions of 0.5 kgf/cm$^2$ and pressed at 200° C. for 2 minutes under pressurization conditions of 100 kgf/cm$^2$ in a 50 t electric heat press manufactured by Toho Press Seisakusho K.K. using a mold (size: 110 mm×220 mm×2 mm in thickness) to prepare a press sheet of 2 mm in thickness.

The obtained press sheet was used to measure physical properties according to measurement methods described below.

[Method for Evaluating Press Sheet]

((10) Hardness)

The hardness was measured in accordance with JIS K 6253 using a type A durometer.

When a sample had a Shore A hardness of 55 or less, it was determined that the sample had sufficient flexibility.

((11) Tensile Stress, Tensile Stress, Tensile Breaking Elongation, and Tensile Breaking Elongation)

A tensile test was carried out as described below in accordance with JIS K 6251 at a crosshead speed of 500 mm/min using dumbbell No. 3.

Tensile stress (M300) . . . Stress at 300% elongation was measured.

Tensile breaking strength (Tb) . . . Stress upon breaking was measured.

Tensile breaking elongation (Eb) . . . Elongation upon breaking was measured.

((12) Dunlop Rebound Resilience)

The Dunlop rebound resilience was measured at 23° C. in accordance with BS 903 using a Dunlop rebound resilience tester.

When a sample had Dunlop rebound resilience of 40% or more, it was determined that the sample was highly resilient and practically favorable.

((13) Compression Set at 70° C.)

In accordance with the compression set test of JIS K 6301, the press sheet of 2 mm in thickness was punched into a round-shaped piece of 29 mm in diameter. The initial thickness of a stack of six pieces of such round sheets was measured at 23° C. Then, the stack was left in an oven of 70° C. for 22 hours in a 25% compressed state and then taken out therefrom. After the release from the compression, the stack was left at 23° C. for 30 minutes, and a residual strain rate was then determined. When a sample had a residual strain rate of 40% or less, it was determined that the sample had sufficient recovery force from deformation.

((14) Permanent Elongation or Distortion after 100% Elongation)

Measurement at 23° C. was performed in accordance with the permanent elongation test of JIS K 6301.

A JIS dumbbell No. 1 specimen was tensioned to 100% elongation under the conditions of an interval of 40 mm between marks and a width of 10 mm. The tension was kept for 10 minutes and then relaxed. After leaving for 10 minutes, a residual strain rate was determined.

When a specimen had a residual strain rate of 5% or less, it was determined that the specimen had sufficient recovery force from deformation.

[Production of Plug Body]

The pellets of the thermoplastic elastomer composition obtained in [Production of thermoplastic elastomer] described above were molded into columnar plug body 1 of 20 mm in diameter×4 mm in thickness using an injection molding machine FE120S18A (manufactured by Nissei Plastic Industrial Co., Ltd.).

FIG. 1(A) shows a schematic top view of the plug body 1, and FIG. 1(B) shows a schematic cross-sectional view of the plug body 1.

The injection molding conditions were as follows: resin temperature: 240° C., injection rate: 45 cm$^3$/sec, injection time: 10 seconds, mold temperature: 40° C., and cooling time: 40 seconds.

[Method for Evaluating Plug Body]

((15) Needlestick Resistance)

Figure 2:
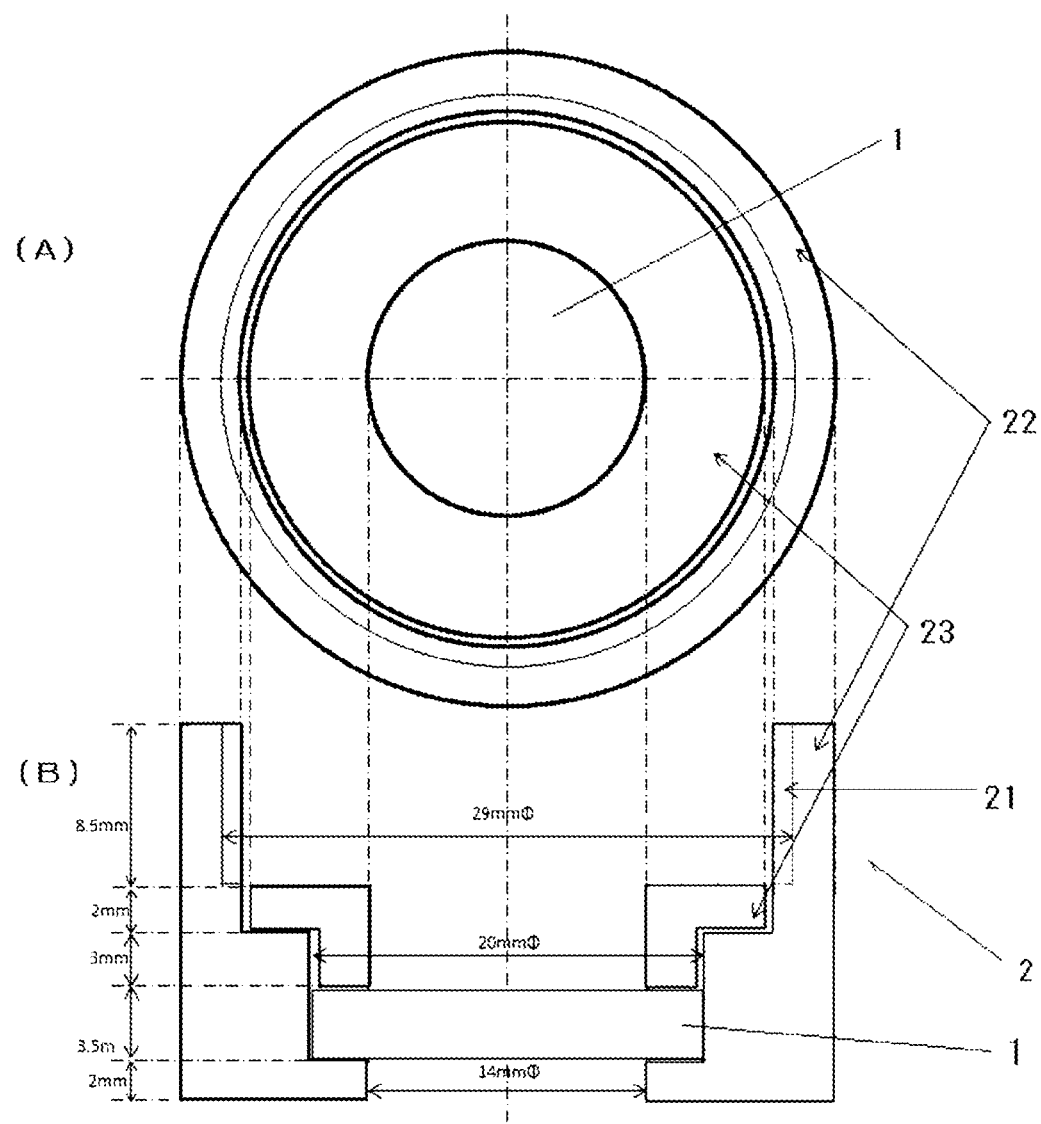
FIG. 2(A) shows a schematic top view of one example of a state where the plug body is attached to a jig.
FIG. 2(B) shows a schematic cross-sectional view of one example of the state where the plug body is attached to a jig.

The plug body 1 shown in FIG. 1 was fitted into a predetermined jig as shown in FIG. 2.

FIG. 2(A) shows a schematic top view of jig 2, and FIG. 2(B) shows a schematic cross-sectional view of the jig 2.

The jig 2 has tubular holder 22 attachable via screw pitch part 21 to the mouth of a predetermined container.

The plug body 1 was fitted into the end of the opening of the jig 2 and fastened using lock ring 23.

Next, the jig 2 with the plug body 1 fitted thereinto was attached to the mouth plug part of a PET bottle filled with 500 mL of water, and fastened.

The PET bottle was mounted to a tensile tester TG-5 kN (manufactured by Minebea Co., Ltd.) such that the plug body 1 was in an upward direction. A resin needle (plastic bottle needle) of 5 mm in diameter (maximum diameter at the base) was allowed to penetrate through the central part of the plug body 1 from the upper side thereof at a speed of 500 mm/min. The maximum load in this operation was measured.

When the maximum load was smaller, it was determined that the sample was more favorable with lower needlestick resistance.

The measurement was performed in quadruplicate, and a simple average therefrom was taken as a measurement value.

Assessment was made according to the following scale: A: 80 N or lower and B: higher than 80 N. It was determined that a sample given A was practically favorable.

((16) Needle Retention Properties)

After the measurement of ((15) Needlestick resistance) described above, the maximum load was measured when the needle that penetrated was removed at a speed of 500 mm/min.

When a sample had a larger maximum load, it was determined that the sample had more favorable needle retention properties.

The measurement was performed in quadruplicate, and a simple average therefrom was taken as a measurement value.

Assessment was made according to the following scale: A: 10 N or higher and B: lower than 10 N. It was determined that a sample given A was practically favorable.

((17) Coring Properties)

In the same manner as in ((15) Needlestick resistance) mentioned above, the plug body 1 of FIG. 1 was fitted into the jig 2 of FIG. 2, which was then attached to the mouth plug part of a PET bottle filled with 500 mL of water, and fastened.

A resin needle (plastic bottle needle) of 5 mm in diameter (maximum diameter at the base) was stuck into and removed from the central part of the plug body in the bottle five times. Then, the presence or absence of shaves of the plug body in the content water or on the needle surface was visually observed.

When a sample was free from shaves, it was determined that the sample had favorable coring properties.

The measurement was performed in quintuplicate, and assessment was made according to the following scale: A: shaves were absent in all the samples, and B: shaves were present in at least one of the samples. It was determined that a sample given A was practically favorable.

((18) Resealability)

In the same manner as in ((15) Needlestick resistance) mentioned above, the plug body 1 of FIG. 1 was fitted into the jig 2 of FIG. 2, which was then attached to the mouth plug part of a PET bottle filled with 500 mL of water, and fastened.

The bottle was inverted (the plug body was positioned on the lower side). A hole of 3 mm in diameter was opened at the bottom (upper side) of the bottle. A resin needle (plastic bottle needle) of 5 mm in diameter (maximum diameter at the base) was stuck, to a part with the maximum diameter of the needle, into the central part of the plug body 1.

(i) Resealability after 4 Hours

The resultant was left for 4 hours. The needle was removed, and the mass of water leaked from the needlestick mark was measured.

When the amount of leakage was smaller, it was determined that the sample had more favorable resealability.

The measurement was performed in octuplicate, and a simple average therefrom was taken as a measurement value.

Assessment was made according to the following scale: AA: no leakage, A: 0.5 g or less of leakage, and B: more than 0.5 g of leakage. It was determined that a sample given AA was excellent, and that a sample given A is practically favorable.

(ii) Resealability after 24 Hours

The resultant was left for 24 hours. The needle was removed, and the mass of water leaked from the needlestick mark was measured.

When the amount of leakage was smaller, it was determined that the sample had more favorable resealability.

The measurement was performed in octuplicate, and a simple average therefrom was taken as a measurement value.

Assessment was made according to the following scale: AA: 0.5 g or less of leakage, A: 3 g of less of leakage, and B: more than 3 g of leakage. It was determined that a sample given A was excellent, and that a sample given B was practically favorable.

((19) Resealability Before and after Steam Sterilization Treatment)

First, the plug body 1 shown in FIG. 1 was fitted into a predetermined jig as shown in FIG. 2.

Next, the resultant was fastened with another jig such that the lock ring 23 was in complete contact with the holder 22 with the plug body 1 fitted thereinto. Steam sterilization treatment was performed on the resultant at 121° C. for 20 minutes at a steam pressure of 0.104 MPa in an autoclave model SN500 manufactured by Yamato Scientific Co., Ltd.

Then, the resultant was cooled for 2 hours in the apparatus, taken out thereof, and further cooled at room temperature (23° C.) over 2 hours. Then, in the same manner as in ((15) Needlestick resistance) mentioned above, the jig 2 of FIG. 2 with the plug body 1 of FIG. 1 fitted thereinto was attached to the mouth plug part of a PET bottle filled with 500 mL of water, and fastened.

The bottle was inverted such that the plug body moiety was positioned on the lower side. In this respect, the height from the inner surface of the plug body to the surface of the fluid was 18.5 cmm.

A hole of 3 mm in diameter was opened at the bottom (upper side) of the bottle. A resin needle (plastic bottle needle) of 5 mm in diameter (maximum diameter at the base) was stuck, to a part with the maximum diameter of the needle, into the central part of the plug body 1.

The resultant was left for 4 hours. The needle was removed, and the mass of water leaked from the needlestick mark was measured.

When the amount of leakage was smaller, it was determined that the sample had more favorable resealability.

The measurement was performed in octuplicate, and a simple average therefrom was taken as a measurement value.

Resealability was evaluated before the sterilization treatment in the same manner as mentioned above.

Assessment was made according to the following scale: AA: 0.5 g or less of leakage, A: more than 0.5 g and 1.0 g or less of leakage, and B: more than 1.0 g of leakage. It was determined that a sample given AA was excellent, and that a sample given A was practically favorable.

((20) Odor Sensory Test)

100 g of the pellets of the thermoplastic elastomer composition was placed in a 500 mL pressure-tight glass bottle, which was then sealed, heated at 70° C. for 1 hour, and then left at room temperature for 48 hours.

Then, 10 panelists examined odor from the mouth of the glass bottle.

Assessment was made on the basis of an average of odor intensity indexes given below.

A: odor intensity index of less than 3 and B: odor intensity index of 3 or more. A sample given A was evaluated as being practically favorable.

<Odor Intensity Index>

0: no odor, 1: slightly perceivable odor, 2: weak, but perceivable odor, 2.5: intermediate between 2 and 3, 3: easily perceivable odor, 3.5: intermediate between 3 and 4, 4: strong odor, and 5: intense odor ((21) Light Transmission Test)

In the same manner as in ((15) Needlestick resistance) mentioned above, the plug body 1 of FIG. 1 was fitted into the jig 2 of FIG. 2, which was then attached to a cylindrical jig and fastened, the cylindrical jig having an outside diameter of 30 mm, an inside diameter of 20 mm, and a total length of 50 mm except for a screw pitch part, and a length of 15 mm in the screw pitch part appropriate for FIG. 2. After the fastening, the total length from the outer surface of the plug body to the end of the cylindrical jig on the opposite side was 58.5 mm.

In this state, the resultant was heat-treated in a gear oven of 121° C. for 20 minutes. The resultant was taken out thereof 20 minutes later, left at 23° C. in a 50 RH % thermostat for 2 hours, and cooled.

A resin needle (plastic bottle needle) of 5 mm in diameter (maximum diameter at the base) was stuck, to a part with the maximum diameter of the needle, into the outside central part of the plug body 1.

The resultant was left for 2 hours and irradiated with light having a lens surface diameter of 30 mm and an illuminance of 30 (lm) in tight contact with the end of the cylindrical jig on a side opposite to the plug body. In this respect, the distance from the surface of the plug body on the observation side was 58.5 cm.

The needle was removed from the plug body, and the time required for light leaked from the needlestick mark to disappear was visually measured.

The measurement was performed in octuplicate, and a simple average therefrom was taken as a measurement value.

Assessment was made according to the following scale: AA: light disappearance time within 10 seconds, A: light disappearance time longer than 10 seconds and within 30 seconds, and B: light disappearance time longer than 30 seconds. It was determined that a sample given AA is excellent, and that a sample given A was practically favorable.

Next, each component used will be described.

<Preparation of Hydrogenation Catalyst>

A hydrogenation catalyst used for preparing a hydrogenated block copolymer composition in Examples and Comparative Examples mentioned later was prepared according to the following method.

A reaction container equipped with a stirring apparatus was purged with nitrogen in advance and charged with 1 L of dried and purified cyclohexane.

Next, 100 mmol of bis(η5-cyclopentadienyl)titanium dichloride was added thereto.

While the contents were thoroughly stirred, a n-hexane solution containing 200 mmol of trimethylaluminum was added thereto. The mixture was reacted at room temperature for approximately 3 days to obtain a hydrogenation catalyst.

<Hydrogenated Block Copolymer (1)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 5 parts by mass of a 1,3-butadiene monomer. Then, 0.080 parts by mass of n-butyllithium per 100 parts by mass of all monomers, and 0.38 mol of tetramethylethylenediamine (hereinafter, referred to as TMEDA) per 1 mol of n-butyllithium were added thereto, followed by polymerization at 70° C. for 15 minutes.

Subsequently, a cyclohexane solution containing 18 parts by mass of a styrene monomer was added thereto and polymerized at 70° C. for 25 minutes. Further, a cyclohexane solution containing 60 parts by mass of a 1,3-butadiene monomer was added thereto and polymerized at 70° C. for 40 minutes.

Finally, a cyclohexane solution containing 17 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C.

After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (1).

The obtained hydrogenated block copolymer (1) had a total styrene content of 34.3% by mass, a polystyrene block content of 33.8% by mass, a vinyl bond content of 37.5% by mol before hydrogenation in the polybutadiene block, a weight-average molecular weight of 204,000 as the whole polymer, a number-average molecular weight of 34,000 as the polystyrene block A1' having the largest number-average molecular weight, and a molecular weight distribution of 1.35. The degree of hydrogenation of aliphatic double bonds derived from 1,3-butadiene was 99.8%.

<Hydrogenated Block Copolymer (2)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 18 parts by mass of a styrene monomer. Then, 0.080 parts by mass of n-butyllithium per 100 parts by mass of all monomers, and 0.38 mol of TMEDA per 1 mol of n-butyllithium were added thereto, followed by polymerization at 70° C. for 25 minutes.

Subsequently, a cyclohexane solution containing 65 parts by mass of a 1,3-butadiene monomer was added thereto and polymerized at 70° C. for 40 minutes. Finally, a cyclohexane solution containing 17 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (2).

The obtained hydrogenated block copolymer (2) had a total styrene content of 34.6% by mass, a polystyrene block content of 34.3% by mass, a vinyl bond content of 38.2% by mol before hydrogenation in the polybutadiene block, a weight-average molecular weight of 201,000 as the whole polymer, a number-average molecular weight of 34,000 as the polystyrene block A1' having the largest number-average molecular weight, and a molecular weight distribution of 1.29. The degree of hydrogenation of aliphatic double bonds derived from 1,3-butadiene was 99.7%.

<Hydrogenated Block Copolymer (3)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 16 parts by mass of a styrene monomer. Then, 0.067 parts by mass of n-butyllithium per 100 parts by mass of all monomers, and 0.48 mol of TMEDA per 1 mol of n-butyllithium were added thereto, followed by polymerization at 70° C. for 25 minutes.

Subsequently, a cyclohexane solution containing 69 parts by mass of a 1,3-butadiene monomer was added thereto and polymerized at 70° C. for 40 minutes. Finally, a cyclohexane solution containing 15 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (3).

The obtained hydrogenated block copolymer (3) had a total styrene content of 30.7% by mass, a polystyrene block content of 30.1% by mass, a vinyl bond content of 39.4% by mol before hydrogenation in the polybutadiene block, a weight-average molecular weight of 264,000 as the whole polymer, a number-average molecular weight of 39,000 as the polystyrene block A1' having the largest number-average molecular weight, and a molecular weight distribution of 1.31. The degree of hydrogenation of aliphatic double bonds derived from 1,3-butadiene was 99.4%.

<Hydrogenated Block Copolymer (4)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 16 parts by mass of a styrene monomer. Then, 0.067 parts by mass of n-butyllithium per 100 parts by mass of all monomers, and 0.45 mol of TMEDA per 1 mol of n-butyllithium were added thereto, followed by polymerization at 70° C. for 25 minutes.

Subsequently, a cyclohexane solution containing 69 parts by mass of a 1,3-butadiene monomer was added thereto and polymerized at 70° C. for 40 minutes. Finally, a cyclohexane solution containing 15 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 70 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (4).

The obtained hydrogenated block copolymer (4) had a total styrene content of 31.3% by mass, a polystyrene block content of 31.0% by mass, a vinyl bond content of 35.6% by mol before hydrogenation in the polybutadiene block, a weight-average molecular weight of 267,000 as the whole polymer, a number-average molecular weight of 40,000 as the polystyrene block A1' having the largest number-average molecular weight, and a molecular weight distribution of 1.28. The degree of hydrogenation of aliphatic double bonds derived from 1,3-butadiene was 76.3%.

<Hydrogenated Block Copolymer (5)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 16 parts by mass of a styrene monomer. Then, 0.066 parts by mass of n-butyllithium per 100 parts by mass of all monomers, and 0.45 mol of TMEDA per 1 mol of n-butyllithium were added thereto, followed by polymerization at 70° C. for 25 minutes.

Subsequently, a cyclohexane solution containing 69 parts by mass of a 1,3-butadiene monomer was added thereto and polymerized at 70° C. for 40 minutes. Finally, a cyclohexane solution containing 15 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 50 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (5).

The obtained hydrogenated block copolymer (5) had a total styrene content of 30.8% by mass, a polystyrene block content of 30.1% by mass, a vinyl bond content of 36.4% by mol before hydrogenation in the polybutadiene block, a weight-average molecular weight of 283,000 as the whole polymer, a number-average molecular weight of 42,000 as the polystyrene block A1' having the largest number-average molecular weight, and a molecular weight distribution of 1.26. The degree of hydrogenation of aliphatic double bonds derived from 1,3-butadiene was 56.1%.

<Hydrogenated Block Copolymer (6)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 16 parts by mass of a styrene monomer. Then, 0.044 parts by mass of n-butyllithium per 100 parts by mass of all monomers, and 0.50 mol of TMEDA per 1 mol of n-butyllithium were added thereto, followed by polymerization at 70° C. for 25 minutes.

Subsequently, a cyclohexane solution containing 70 parts by mass of a 1,3-butadiene monomer was added thereto and polymerized at 70° C. for 40 minutes. Finally, a cyclohexane solution containing 14 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (6).

The obtained hydrogenated block copolymer (6) had a total styrene content of 29.8% by mass, a polystyrene block content of 29.4% by mass, a vinyl bond content of 34.7% by mol before hydrogenation in the polybutadiene block, a weight-average molecular weight of 423,000 as the whole polymer, a number-average molecular weight of 61,000 as the polystyrene block A1' having the largest number-average molecular weight, and a molecular weight distribution of 1.34. The degree of hydrogenation of aliphatic double bonds derived from 1,3-butadiene was 99.1%.

<Hydrogenated Block Copolymer (7)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 13 parts by mass of a styrene monomer. Then, 0.067 parts by mass of n-butyllithium per 100 parts by mass of all monomers, and 0.35 mol of TMEDA per 1 mol of n-butyllithium were added thereto, followed by polymerization at 70° C. for 25 minutes.

Subsequently, a cyclohexane solution containing 75 parts by mass of a 1,3-butadiene monomer was added thereto and polymerized at 70° C. for 40 minutes. Finally, a cyclohexane solution containing 12 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (7).

The obtained hydrogenated block copolymer (7) had a total styrene content of 25.2% by mass, a polystyrene block content of 24.9% by mass, a vinyl bond content of 31.4% by mol before hydrogenation in the polybutadiene block, a weight-average molecular weight of 259,000 as the whole polymer, a number-average molecular weight of 30,000 as the polystyrene block A1' having the largest number-average molecular weight, and a molecular weight distribution of 1.31. The degree of hydrogenation of aliphatic double bonds derived from 1,3-butadiene was 99.8%.

<Hydrogenated Block Copolymer (8)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 22 parts by mass of a styrene monomer. Then, 0.115 parts by mass of n-butyllithium per 100 parts by mass of all monomers, and 0.55 mol of TMEDA per 1 mol of n-butyllithium were added thereto, followed by polymerization at 70° C. for 30 minutes.

Subsequently, a cyclohexane solution containing 58 parts by mass of a 1,3-butadiene monomer was added thereto and polymerized at 65° C. for 60 minutes. Finally, a cyclohexane solution containing 20 parts by mass of a styrene monomer was added thereto and polymerized at 70° C. for 30 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (8).

The obtained hydrogenated block copolymer (8) had a total styrene content of 42.4% by mass, a polystyrene block content of 42.1% by mass, a vinyl bond content of 58.6% by mol before hydrogenation in the polybutadiene block, a weight-average molecular weight of 122,000 as the whole polymer, a number-average molecular weight of 26,000 as the polystyrene block A1' having the largest number-average molecular weight, and a molecular weight distribution of 1.26. The degree of hydrogenation of aliphatic double bonds derived from 1,3-butadiene was 99.3%.

<Hydrogenated Block Copolymer (9)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 17 parts by mass of a styrene monomer. Then, 0.115 parts by mass of n-butyllithium per 100 parts by mass of all monomers, and 0.35 mol of TMEDA per 1 mol of n-butyllithium were added thereto, followed by polymerization at 70° C. for 25 minutes.

Subsequently, a cyclohexane solution containing 67 parts by mass of a 1,3-butadiene monomer was added thereto and polymerized at 70° C. for 40 minutes. Finally, a cyclohexane solution containing 16 parts by mass of a styrene monomer was added thereto and polymerized at 70° C. for 25 minutes.

Next, 0.2 mol of silicon tetrachloride per 1 mol of n-butyllithium was added thereto, followed by coupling reaction for 20 minutes. After the completion of reaction, 0.15 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (9).

The obtained hydrogenated block copolymer (9) had a total styrene content of 33.1% by mass, a polystyrene block content of 32.9% by mass, a vinyl bond content of 37.3% by mol before hydrogenation in the polybutadiene block, a weight-average molecular weight of 413000 as the whole polymer, a number-average molecular weight of 34000 as the polystyrene block A1' having the largest number-average molecular weight, and a molecular weight distribution of 1.35. The degree of hydrogenation of aliphatic double bonds derived from 1,3-butadiene was 99.5%.

<Hydrogenated Block Copolymer (10)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 16 parts by mass of a styrene monomer. Then, 0.142 parts by mass of n-butyllithium per 100 parts by mass of all monomers, and 0.24 mol of TMEDA per 1 mol of n-butyllithium were added thereto, followed by polymerization at 70° C. for 25 minutes.

Subsequently, a cyclohexane solution containing 70 parts by mass of a 1,3-butadiene monomer was added thereto and polymerized at 70° C. for 40 minutes. Finally, a cyclohexane solution containing 14 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (10).

The obtained hydrogenated block copolymer (10) had a total styrene content of 30.2% by mass, a polystyrene block content of 29.7% by mass, a vinyl bond content of 33.3% by mol before hydrogenation in the polybutadiene block, a weight-average molecular weight of 88,000 as the whole polymer, a number-average molecular weight of 22,000 as the polystyrene block A1' having the largest number-average molecular weight, and a molecular weight distribution of 1.27. The degree of hydrogenation of aliphatic double bonds derived from 1,3-butadiene was 99.7%.

<Hydrogenated Block Copolymer (11)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 9 parts by mass of a styrene monomer. Then, 0.078 parts by mass of n-butyllithium per 100 parts by mass of all monomers, and 0.25 mol of TMEDA w per 1 mol of n-butyllithium were added thereto, followed by polymerization at 70° C. for 20 minutes.

Subsequently, a cyclohexane solution containing 83 parts by mass of a 1,3-butadiene monomer was added thereto and polymerized at 70° C. for 50 minutes. Finally, a cyclohexane solution containing 8 parts by mass of a styrene monomer was added thereto and polymerized at 70° C. for 20 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (11).

The obtained hydrogenated block copolymer (11) had a total styrene content of 17.3% by mass, a polystyrene block content of 17.1% by mass, a vinyl bond content of 27.2% by mol before hydrogenation in the polybutadiene block, a weight-average molecular weight of 216,000 as the whole polymer, a number-average molecular weight of 17,000 as the polystyrene block A1' having the largest number-average molecular weight, and a molecular weight distribution of 1.23. The degree of hydrogenation of aliphatic double bonds derived from 1,3-butadiene was 99.8%.

<Hydrogenated Block Copolymer (12)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 28 parts by mass of a styrene monomer. Then, 0.078 parts by mass of n-butyllithium per 100 parts by mass of all monomers, and 0.8 mol of TMEDA per 1 mol of n-butyllithium were added thereto, followed by polymerization at 70° C. for 30 minutes.

Subsequently, a cyclohexane solution containing 45 parts by mass of a 1,3-butadiene monomer was added thereto and polymerized at 60° C. for 60 minutes. Finally, a cyclohexane solution containing 27 parts by mass of a styrene monomer was added thereto and polymerized at 70° C. for 30 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (12).

The obtained hydrogenated block copolymer (12) had a total styrene content of 55.3% by mass, a polystyrene block content of 55.1% by mass, a vinyl bond content of 66.8% by mol before hydrogenation in the polybutadiene block, a weight-average molecular weight of 208,000 as the whole polymer, a number-average molecular weight of 56,000 as the polystyrene block A1' having the largest number-average molecular weight, and a molecular weight distribution of 1.33. The degree of hydrogenation of aliphatic double bonds derived from 1,3-butadiene was 99.5%.

<Hydrogenated Block Copolymer (13)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 5 parts by mass of a 1,3-butadiene monomer. Then, 0.085 parts by mass of n-butyllithium per 100 parts by mass of all monomers, 1.5 mol of TMEDA per 1 mol of n-butyllithium, and 0.04 mol of sodium-t-pentoxide per 1 mol of n-butyllithium were added thereto, followed by polymerization at 60° C. for 20 minutes.

Subsequently, a cyclohexane solution containing 7 parts by mass of a styrene monomer was added thereto and polymerized at 70° C. for 20 minutes. Further, a cyclohexane solution containing 82 parts by mass of a 1,3-butadiene monomer was added thereto and polymerized at 60° C. for 1.5 hours.

Finally, a cyclohexane solution containing 6 parts by mass of a styrene monomer was added thereto and polymerized at 70° C. for 20 minutes. After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (13).

The obtained hydrogenated block copolymer (13) had a total styrene content of 13.4% by mass, a vinyl bond content of 76.4% by mol before hydrogenation in the polybutadiene block, a weight-average molecular weight of 183,000 as the whole polymer, and a molecular weight distribution of 1.35. The degree of hydrogenation of aliphatic double bonds derived from 1,3-butadiene was 99.6%.

<Hydrogenated Block Copolymer (14)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 7 parts by mass of a styrene monomer. Then, 0.085 parts by mass of n-butyllithium per 100 parts by mass of all monomers, 1.5 mol of TMEDA per 1 mol of n-butyllithium, and 0.04 mol of sodium-t-pentoxide per 1 mol of n-butyllithium were added thereto, followed by polymerization at 70° C. for 20 minutes.

Subsequently, a cyclohexane solution containing 87 parts by mass of a 1,3-butadiene monomer was added thereto and polymerized at 60° C. for 1.5 hours. Finally, a cyclohexane solution containing 6 parts by mass of a styrene monomer was added thereto and polymerized at 70° C. for 20 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (14).

The obtained hydrogenated block copolymer (14) had a total styrene content of 13.2% by mass, a vinyl bond content of 77.8% by mol before hydrogenation in the polybutadiene block, a weight-average molecular weight of 185,000 as the whole polymer, and a molecular weight distribution of 1.33. The degree of hydrogenation of aliphatic double bonds derived from 1,3-butadiene was 99.8%.

<Hydrogenated Block Copolymer (15)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 5 parts by mass of a styrene monomer. Then, 0.078 parts by mass of n-butyllithium per 100 parts by mass of all monomers, and 0.8 mol of TMEDA per 1 mol of n-butyllithium were added thereto, followed by polymerization at 70° C. for 20 minutes.

Subsequently, a cyclohexane solution containing 81 parts by mass of a 1,3-butadiene monomer was added thereto and polymerized at 60° C. for 1.5 hours. Finally, a cyclohexane solution containing 4 parts by mass of a styrene monomer was added thereto and polymerized at 70° C. for 20 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (15).

The obtained hydrogenated block copolymer (15) had a total styrene content of 8.8% by mass, a vinyl bond content of 65.1% by mol before hydrogenation in the polybutadiene block, a weight-average molecular weight of 203,000 as the whole polymer, and a molecular weight distribution of 1.28. The degree of hydrogenation of aliphatic double bonds derived from 1,3-butadiene was 99.8%.

<Hydrogenated Block Copolymer (16)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 10 parts by mass of a styrene monomer. Then, 0.098 parts by mass of n-butyllithium per 100 parts by mass of all monomers, 1.5 mol of TMEDA per 1 mol of n-butyllithium, and 0.04 mol of sodium-t-pentoxide per 1 mol of n-butyllithium were added thereto, followed by polymerization at 70° C. for 20 minutes.

Subsequently, a cyclohexane solution containing 81 parts by mass of a 1,3-butadiene monomer was added thereto and polymerized at 60° C. for 1.5 hours.

Finally, a cyclohexane solution containing 9 parts by mass of a styrene monomer was added thereto and polymerized at 70° C. for 20 minutes. After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (16).

The obtained hydrogenated block copolymer (16) had a total styrene content of 18.7% by mass, a vinyl bond content of 81.6% by mol before hydrogenation in the polybutadiene block, a weight-average molecular weight of 152,000 as the whole polymer, and a molecular weight distribution of 1.36. The degree of hydrogenation of aliphatic double bonds derived from 1,3-butadiene was 99.7%.

<Hydrogenated Block Copolymer (17)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 3.5 parts by mass of a styrene monomer. Then, 0.122 parts by mass of n-butyllithium per 100 parts by mass of all monomers, and 0.55 mol of TMEDA per 1 mol of n-butyllithium were added thereto, followed by polymerization at 70° C. for 15 minutes.

Subsequently, a cyclohexane solution containing 94 parts by mass of a 1,3-butadiene monomer was added thereto and polymerized at 70° C. for 60 minutes. Finally, a cyclohexane solution containing 2.5 parts by mass of a styrene monomer was added thereto and polymerized at 70° C. for 15 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (17).

The obtained hydrogenated block copolymer (17) had a total styrene content of 5.8% by mass, a vinyl bond content of 56.3% by mol before hydrogenation in the polybutadiene block, a weight-average molecular weight of 109,000 as the whole polymer, and a molecular weight distribution of 1.29. The degree of hydrogenation of aliphatic double bonds derived from 1,3-butadiene was 99.3%.

<Hydrogenated Block Copolymer (18)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 10 parts by mass of a styrene monomer. Then, 0.140 parts by mass of n-butyllithium per 100 parts by mass of all monomers, and 0.50 mol of TMEDA per 1 mol of n-butyllithium were added thereto, followed by polymerization at 70° C. for 25 minutes.

Subsequently, a cyclohexane solution containing 81 parts by mass of a 1,3-butadiene monomer was added thereto and polymerized at 70° C. for 50 minutes. Finally, a cyclohexane solution containing 9 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (18).

The obtained hydrogenated block copolymer (18) had a total styrene content of 18.6% by mass, a vinyl bond content of 52.1% by mol before hydrogenation in the polybutadiene block, a weight-average molecular weight of 93,000 as the whole polymer, and a molecular weight distribution of 1.24. The degree of hydrogenation of aliphatic double bonds derived from 1,3-butadiene was 99.8%.

<Hydrogenated Block Copolymer (19)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 13 parts by mass of a styrene monomer. Then, 0.066 parts by mass of n-butyllithium per 100 parts by mass of all monomers, 1.5 mol of TMEDA per 1 mol of n-butyllithium, and 0.04 mol of sodium-t-pentoxide per 1 mol of n-butyllithium were added thereto, followed by polymerization at 70° C. for 25 minutes.

Subsequently, a cyclohexane solution containing 75 parts by mass of a 1,3-butadiene monomer was added thereto and polymerized at 60° C. for 1.5 hours. Finally, a cyclohexane solution containing 12 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (19).

The obtained hydrogenated block copolymer (19) had a total styrene content of 20.1% by mass, a vinyl bond content of 76.2% by mol before hydrogenation in the polybutadiene block, a weight-average molecular weight of 263,000 as the whole polymer, and a molecular weight distribution of 1.38. The degree of hydrogenation of aliphatic double bonds derived from 1,3-butadiene was 99.4%.

<Hydrogenated Block Copolymer (20)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 10 parts by mass of a styrene monomer. Then, 0.098 parts by mass of n-butyllithium per 100 parts by mass of all monomers, and 0.50 mol of TMEDA per 1 mol of n-butyllithium were added thereto, followed by polymerization at 70° C. for 25 minutes.

Subsequently, a cyclohexane solution containing 81 parts by mass of a 1,3-butadiene monomer was added thereto and polymerized at 70° C. for 50 minutes. Finally, a cyclohexane solution containing 9 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (20).

The obtained hydrogenated block copolymer (20) had a total styrene content of 19.3% by mass, a vinyl bond content of 51.6% by mol before hydrogenation in the polybutadiene block, a weight-average molecular weight of 156,000 as the whole polymer, and a molecular weight distribution of 1.29. The degree of hydrogenation of aliphatic double bonds derived from 1,3-butadiene was 99.6%.

<Hydrogenated Block Copolymer (21)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 10 parts by mass of a styrene monomer. Then, 0.085 parts by mass of n-butyllithium per 100 parts by mass of all monomers, 1.8 mol of TMEDA per 1 mol of n-butyllithium, and 0.06 mol of sodium-t-pentoxide per 1 mol of n-butyllithium were added thereto, followed by polymerization at 70° C. for 20 minutes.

Subsequently, a cyclohexane solution containing 81 parts by mass of a 1,3-butadiene monomer was added thereto and polymerized at 55° C. for 1.5 hours.

Finally, a cyclohexane solution containing 9 parts by mass of a styrene monomer was added thereto and polymerized at 70° C. for 20 minutes. After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (21).

The obtained hydrogenated block copolymer (21) had a total styrene content of 18.9% by mass, a vinyl bond content of 89.3% by mol before hydrogenation in the polybutadiene block, a weight-average molecular weight of 188,000 as the whole polymer, and a molecular weight distribution of 1.39. The degree of hydrogenation of aliphatic double bonds derived from 1,3-butadiene was 99.5%.

<Hydrogenated Block Copolymer (22)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 5 parts by mass of a 1,3-butadiene monomer. Then, 0.105 parts by mass of n-butyllithium per 100 parts by mass of all monomers, and 0.7 mol of TMEDA per 1 mol of n-butyllithium were added thereto, followed by polymerization at 60° C. for 20 minutes.

Subsequently, a cyclohexane solution containing 7.5 parts by mass of a styrene monomer was added thereto and polymerized at 70° C. for 20 minutes. Further, a cyclohexane solution containing 81 parts by mass of a 1,3-butadiene monomer was added thereto and polymerized at 60° C. for 1.5 hours.

Finally, a cyclohexane solution containing 6.5 parts by mass of a styrene monomer was added thereto and polymerized at 70° C. for 20 minutes. After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (22).

The obtained hydrogenated block copolymer (22) had a total styrene content of 13.7% by mass, a vinyl bond content of 61.3% by mol before hydrogenation in the polybutadiene block, a weight-average molecular weight of 137,000 as the whole polymer, and a molecular weight distribution of 1.33. The degree of hydrogenation of aliphatic double bonds derived from 1,3-butadiene was 99.4%.

<Hydrogenated Block Copolymer (23)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 5 parts by mass of a 1,3-butadiene monomer. Then, 0.085 parts by mass of n-butyllithium per 100 parts by mass of all monomers, and 0.8 mol of TMEDA per 1 mol of n-butyllithium were added thereto, followed by polymerization at 60° C. for 20 minutes.

Subsequently, a cyclohexane solution containing 7.5 parts by mass of a styrene monomer was added thereto and polymerized at 70° C. for 20 minutes. Further, a cyclohexane solution containing 81 parts by mass of a 1,3-butadiene monomer was added thereto and polymerized at 60° C. for 1.5 hours.

Finally, a cyclohexane solution containing 6.5 parts by mass of a styrene monomer was added thereto and polymerized at 70° C. for 20 minutes. After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (23).

The obtained hydrogenated block copolymer (23) had a total styrene content of 13.5% by mass, a vinyl bond content of 64.8% by mol before hydrogenation in the polybutadiene block, a weight-average molecular weight of 187,000 as the whole polymer, and a molecular weight distribution of 1.29. The degree of hydrogenation of aliphatic double bonds derived from 1,3-butadiene was 99.6%.

<Hydrogenated Block Copolymer (24)>

A vessel-type reactor (internal capacity: 10 L) equipped with a stirring apparatus and a jacket was washed, dried, and purged with nitrogen to perform batch polymerization.

First, the reactor was charged with a cyclohexane solution containing 10 parts by mass of a styrene monomer. Then, 0.140 parts by mass of n-butyllithium per 100 parts by mass of all monomers, and 0.80 mol of TMEDA per 1 mol of n-butyllithium were added thereto, followed by polymerization at 70° C. for 25 minutes.

Subsequently, a cyclohexane solution containing 81 parts by mass of a 1,3-butadiene monomer was added thereto and polymerized at 60° C. for 50 minutes. Finally, a cyclohexane solution containing 9 parts by mass of a styrene monomer was added thereto and polymerized at 70° C. for 25 minutes.

After the completion of polymerization reaction, 0.95 mol of methanol per 1 mol of n-butyllithium was added thereto for the deactivation of the reaction catalyst to obtain a polymer.

Next, to the obtained polymer, 100 ppm (in terms of titanium) of the hydrogenation catalyst per 100 parts by mass of the polymer was added, followed by hydrogenation reaction at a hydrogen pressure of 0.8 MPa and a temperature of 85° C. After the completion of hydrogenation reaction, 0.3 parts by mass of octadecyl-3-(3,5-di-t-butyl-4-hydroxyphenyl)propionate per 100 parts by mass of the polymer were added thereto as a stabilizer to obtain a hydrogenated block copolymer (24).

The obtained hydrogenated block copolymer (24) had a total styrene content of 18.6% by mass, a vinyl bond content of 65.2% by mol before hydrogenation in the polybutadiene block, a weight-average molecular weight of 91,000 as the whole polymer, and a molecular weight distribution of 1.26. The degree of hydrogenation of aliphatic double bonds derived from 1,3-butadiene was 99.8%.

<Polypropylene Resin (b)>

The following commercially available product was used as the polypropylene resin (b).

Polypropylene resin (b): SunAllomer Ltd., PM801A, propylene homononamer, MFR (230° C., 2.16 kg): 13 g/10 min <Polyphenylene Ether Resin (c)>

The polyphenylene ether resin (c) was produced according to the following method.

On the basis of a method known in the art, polyphenylene ether was polymerized by the oxidative coupling polymerization of 2,6-dimethylphenol, and the polymer was purified to obtain a polyphenylene ether resin (c-1), (c-2), or (c-3).

The reduced viscosity (0.5 g/dL, chloroform solution, measurement at 30° C.), number-average molecular weight, and average particle size of the obtained polyphenylene ether resin (c) are shown below.

(c-1): reduced viscosity=0.45, number-average molecular weight=17,400, average particle size=290 μm (c-2): reduced viscosity=0.53, number-average molecular weight=20,100, average particle size=320 μm (c-3): reduced viscosity=0.31, number-average molecular weight=12,400, average particle size=310 μm <Non-Aromatic Softener (d)>

The following commercially available products were used as the non-aromatic softener (d).

Non-aromatic softener (d-1): Diana Process Oil PW380 manufactured by Idemitsu Kosan Co., Ltd., paraffin oil, weight-average molecular weight: 750, kinematic viscosity (40° C.)=380 mm$^2$/sec Non-aromatic softener (d-2): Diana Process Oil PW90 manufactured by Idemitsu Kosan Co., Ltd., paraffin oil, weight-average molecular weight: 530, kinematic viscosity (40° C.)=90.5 mm$^2$/sec Non-aromatic softener (d-3): Diana Process Oil PW32 manufactured by Idemitsu Kosan Co., Ltd., paraffin oil, weight-average molecular weight: 380, kinematic viscosity (40° C.)=30.8 mm$^2$/sec <Inorganic Filler (e)>

The following commercially available products were used as the inorganic filler (e).

Inorganic filler (e-1): Whiton SB Red manufactured by Shiraishi Calcium Kaisha, Ltd., average particle size: 1.8 μm, BET specific surface area: 1.2 m$^2$/g, calcium carbonate Inorganic filler (e-2): Micro Ace K-1 manufactured by Nippon Talc Co., Ltd., average particle size: 8 μm, BET specific surface area: 35 m$^2$/g, talc Inorganic filler (e-3): Lighton A manufactured by Shiraishi Calcium Kaisha, Ltd., average primary particle size: 1.8 μm, BET specific surface area: 3 m$^2$/g, modified fatty acid-surface-treated calcium carbonate Inorganic filler (e-4): Aerosil R972V manufactured by Nippon Aerosil Co., Ltd., average primary particle size: 16 nm, BET specific surface area: 110 m$^2$/g, dimethylsilyl-surface-treated silica <Inorganic Adsorbent (f)>

The following commercially available products were used as the inorganic adsorbent (f).

Inorganic adsorbent (f-1): Molecular Sieve USYZ2000 manufactured by Union Showa K.K., average particle size: 3 to 5 μm, BET specific surface area: 500 m²/g, synthetic zeolite (sodium aluminosilicate)

Inorganic adsorbent (f-2): Seventol OM-1 manufactured by Osaka Gas Chemicals Co., Ltd., average particle size: 2 to 2.5 μm, BET specific surface area≥200 m²/g, synthetic zeolite (sodium aluminosilicate)

<Silicone Oil>

The following commercially available product was used as the silicone oil.

Silicone oil: SH200.100Cs manufactured by Dow Corning Toray Co., Ltd., dimethylpolysiloxane, kinematic viscosity: 100 mm²/sec

TABLE 1

| (a-1) | (1) | (2) | (3) | (4) | (5) | (6) |
|---|---|---|---|---|---|---|
| Form | B-A-B-A | A-B-A | A-B-A | A-B-A | A-B-A | A-B-A |
| Total styrene content (% by mass) | 34.3 | 34.6 | 30.7 | 31.3 | 30.8 | 29.8 |
| Polystyrene block content (% by mass) | 33.8 | 34.3 | 30.1 | 31 | 30.1 | 29.4 |
| Vinyl bond content in polybutadiene block (% by mol) | 37.5 | 38.2 | 39.4 | 35.6 | 36.4 | 34.7 |
| Weight-average molecular weight (×10000) of hydrogenated block copolymer | 20.4 | 20.1 | 26.4 | 26.7 | 28.3 | 42.3 |
| Number-average molecular weight (×10000) of polystyrene block A1' | 3.4 | 3.4 | 3.9 | 4 | 4.2 | 6.1 |
| Molecular weight distribution (Mw/Mn) of hydrogenated block copolymer | 1.35 | 1.29 | 1.31 | 1.28 | 1.26 | 1.34 |
| Degree of hydrogenation (% by mol) | 99.8 | 99.7 | 99.4 | 76.3 | 56.1 | 99.1 |

TABLE 2

| (a-1) | (7) | (8) | (9) | (10) | (11) | (12) |
|---|---|---|---|---|---|---|
| Form | A-B-A | A-B-A | (A-B)4-X | A-B-A | A-B-A | A-B-A |
| Total styrene content (% by mass) | 25.2 | 42.3 | 33.1 | 30.2 | 17.3 | 55.3 |
| Polystyrene block content (% by mass) | 24.9 | 42.1 | 32.9 | 29.7 | 17.1 | 55.1 |
| Vinyl bond content in polybutadiene block (% by mol) | 31.4 | 58.6 | 37.3 | 33.3 | 27.2 | 66.8 |
| Weight-average molecular weight (×10000) of hydrogenated block copolymer | 25.9 | 12.2 | 41.3 | 8.8 | 21.6 | 20.8 |
| Number-average molecular weight (×10000) of polystyrene block A1' | 3 | 2.6 | 3.4 | 2.2 | 1.7 | 5.6 |
| Molecular weight distribution (Mw/Mn) of hydrogenated block copolymer | 1.31 | 1.26 | 1.35 | 1.27 | 1.23 | 1.33 |
| Degree of hydrogenation (% by mol) | 99.8 | 99.3 | 99.5 | 99.7 | 99.8 | 99.5 |

TABLE 3

| (a-2) | (13) | (14) | (15) | (16) | (17) | (18) |
|---|---|---|---|---|---|---|
| Form | B-A-B-A | A-B-A | A-B-A | A-B-A | A-B-A | A-B-A |
| Total styrene content (% by mass) | 13.4 | 13.2 | 8.8 | 18.7 | 5.8 | 18.6 |
| Polystyrene block content (% by mass) | — | — | — | — | — | — |
| Vinyl bond content in polybutadiene block (% by mol) | 76.4 | 77.8 | 65.1 | 81.6 | 56.3 | 52.1 |
| Weight-average molecular weight (×10000) of hydrogenated block copolymer | 18.3 | 18.5 | 20.3 | 15.2 | 10.9 | 9.3 |
| Number-average molecular weight (×10000) of polystyrene block A1' | — | — | — | — | — | — |
| Molecular weight distribution (Mw/Mn) of hydrogenated block copolymer | 1.35 | 1.33 | 1.28 | 1.36 | 1.29 | 1.24 |
| Degree of hydrogenation (% by mol) | 99.6 | 99.8 | 99.8 | 99.7 | 99.3 | 99.8 |

TABLE 4

| (a-2) | (19) | (20) | (21) | (22) | (23) | (24) |
|---|---|---|---|---|---|---|
| Form | A-B-A | A-B-A | B-A-B-A | B-A-B-A | B-A-B-A | A-B-A |
| Total styrene content (% by mass) | 25.4 | 19.3 | 18.9 | 13.7 | 13.5 | 18.8 |
| Polystyrene block content (% by mass) | — | — | — | — | — | — |
| Vinyl bond content in polybutadiene block (% by mol) | 76.2 | 51.6 | 89.3 | 61.3 | 64.8 | 65.2 |
| Weight-average molecular weight (×10000) of hydrogenated block copolymer | 26.3 | 15.6 | 18.8 | 13.7 | 18.7 | 9.1 |
| Number-average molecular weight (×10000) of polystyrene block A1' | — | — | — | — | — | — |
| Molecular weight distribution (Mw/Mn) of hydrogenated block copolymer | 1.38 | 1.29 | 1.39 | 1.33 | 1.29 | 1.26 |
| Degree of hydrogenation (% by mol) | 99.4 | 99.6 | 99.5 | 99.4 | 99.6 | 99.8 |

TABLE 5

|  |  | Example 1 | Example 2 | Example 3 | Example 4 | Example 5 |
|---|---|---|---|---|---|---|
| Hydrogenated block copolymer (a) | (a-1) No. | 1 | 1 | 1 | 1 | 1 |
|  | Compounded amount (parts by mass) | 100 | 90 | 85 | 90 | 90 |
|  | (a-2) No. |  | 13 | 13 | 22 | 23 |
|  | Compounded amountt (parts by mass) |  | 10 | 15 | 10 | 10 |
| Polypropylene resin (b) (parts by mass) |  | 19 | 19 | 19 | 19 | 19 |
| Polyphenylene ether resin (c-1) (parts by mass) |  | 55 | 55 | 55 | 55 | 55 |
| Softener (d) for non-aromatic rubber | (d-1) (parts by mass) | 55 | 55 | 55 | 55 | 55 |
|  | (d-2) (parts by mass) | 95 | 95 | 95 | 95 | 95 |
| MFR (230° C., 2.16 kg) [g/10 min] |  | 1.5 | 3.2 | 5.6 | 3.9 | 3 |
| Hardness [—] |  | 30 | 31 | 27 | 35 | 33 |
| M300 [MPa] |  | 2.4 | 2.3 | 20 | 2.7 | 2.6 |
| Tb [MPa] |  | 11.1 | 8.1 | 7.8 | 7.6 | 8.2 |
| Eb [%] |  | 610 | 540 | 520 | 560 | 550 |
| Dunlop rebound resilience [%] |  | 41 | 41 | 40 | 42 | 41 |
| Compression set at 70° C. [%] |  | 27 | 30 | 32 | 38 | 32 |
| Permanent elongation or distortion after 100% elongation [%] |  | 1.4 | 2.3 | 1.8 | 4.3 | 3.1 |
| Needlestick resistance (needle penetration power) [N] |  | 25 | 24 | 22 | 33 | 30 |
| Needle retention properties (needle retention power) [N] |  | 13 | 12 | 12 | 15 | 14 |
| Coring properties (shaves) |  | A | A | A | A | A |
| Resealability after 4 hr (amount of leakage) [g] |  | 0.08 | 0.06 | 0.03 | 0.13 | 0.08 |
| Resealability after 24 hr (amount of leakage) [g] |  | 1.88 | 0.51 | 0.33 | 1.77 | 0.91 |
| Light transmission test |  | A | A | A | A | A |

|  |  | Example 6 | Example 7 | Example 8 | Example 9 | Example 10 |
|---|---|---|---|---|---|---|
| Hydrogenated block copolymer (a) | (a-1) No. | 1 | 1 | 1 | 1 | 4 |
|  | Compounded amount (parts by mass) | 90 | 90 | 90 | 90 | 100 |
|  | (a-2) No. | 14 | 16 | 20 | 21 |  |
|  | Compounded amountt (parts by mass) | 10 | 10 | 10 | 10 |  |
| Polypropylene resin (b) (parts by mass) |  | 19 | 19 | 19 | 19 | 19 |
| Polyphenylene ether resin (c-1) (parts by mass) |  | 55 | 55 | 55 | 55 | 55 |
| Softener (d) for non-aromatic rubber | (d-1) (parts by mass) | 55 | 55 | 55 | 55 |  |
|  | (d-2) (parts by mass) | 95 | 95 | 95 | 95 | 140 |
| MFR (230° C., 2.16 kg) [g/10 min] |  | 2.6 | 4.2 | 2.5 | 5.1 | 0.5 |
| Hardness [—] |  | 32 | 33 | 35 | 32 | 34 |
| M300 [MPa] |  | 2.5 | 2.5 | 3.4 | 2.2 | 2.8 |
| Tb [MPa] |  | 9.8 | 9.9 | 10.6 | 9.1 | 7.8 |
| Eb [%] |  | 570 | 580 | 560 | 610 | 680 |
| Dunlop rebound resilience [%] |  | 42 | 43 | 46 | 44 | 46 |
| Compression set at 70° C. [%] |  | 29 | 31 | 33 | 32 | 22 |
| Permanent elongation or distortion after 100% elongation [%] |  | 1.9 | 2.1 | 3.6 | 1.8 | 2.5 |
| Needlestick resistance (needle penetration power) [N] |  | 25 | 24 | 37 | 22 | 28 |
| Needle retention properties (needle retention power) [N] |  | 13 | 14 | 16 | 13 | 17 |
| Coring properties (shaves) |  | A | A | A | A | A |
| Resealability after 4 hr (amount of leakage) [g] |  | 0.04 | 0.09 | 0.24 | 0.04 | 0.42 |
| Resealability after 24 hr (amount of leakage) [g] |  | 0.58 | 1.04 | 2.23 | 0.66 | 2.32 |
| Light transmission test |  | A | A | A | A | A |

TABLE 6

|  |  | Example 11 | Example 12 | Example 13 | Example 14 | Example 15 |
|---|---|---|---|---|---|---|
| Hydrogenated block copolymer (a) | (a-1) No. | 4 | 5 | 5 | 2 | 2 |
|  | Compounded amount (parts by mass) | 90 | 100 | 90 | 100 | 90 |
|  | (a-2) No. | 13 |  | 13 |  | 13 |
|  | Compounded amount (parts by mass) | 10 |  | 10 |  | 10 |
| Polypropylene resin (b) (parts by mass) |  | 19 | 19 | 19 | 22 | 22 |
| Polyphenylene ether resin (c-1) (parts by mass) |  | 55 | 55 | 55 | 55 | 55 |
| Softener (d) for non-aromatic rubber | (d-1) (parts by mass) |  |  |  |  |  |
|  | (d-2) (parts by mass) | 140 | 140 | 140 | 160 | 160 |
| MFR (230° C., 2.16 kg) [g/10 min] |  | 1.1 | 0.8 | 1.8 | 1.4 | 2.7 |
| Hardness [—] |  | 33 | 32 | 31 | 36 | 33 |
| M300 [MPa] |  | 2.1 | 2.5 | 1.9 | 2.4 | 2.2 |
| Tb [MPa] |  | 6.6 | 7.6 | 6.5 | 14.9 | 10.1 |
| Eb [%] |  | 630 | 690 | 650 | 730 | 610 |
| Dunlop rebound resilience [%] |  | 46 | 48 | 47 | 59 | 58 |
| Compression set at 70° C. [%] |  | 26 | 28 | 27 | 20 | 25 |

TABLE 6-continued

| | | | | | |
|---|---|---|---|---|---|
| Permanent elongation or distortion after 100% elongation [%] | 2.6 | 3.3 | 2.9 | 1.9 | 2.4 |
| Needlestick resistance (needle penetration power) [N] | 28 | 26 | 25 | 26 | 25 |
| Needle retention properties (needle retention power) [N] | 17 | 16 | 17 | 15 | 14 |
| Coring properties (shaves) | A | A | A | A | A |
| Resealability after 4 hr (amount of leakage) [g] | 0.34 | 0.47 | 0.39 | 0.24 | 0.12 |
| Resealability after 24 hr (amount of leakage) [g] | 1.02 | 2.44 | 1.16 | 2.02 | 0.98 |
| Light transmission test | A | A | A | A | A |

| | | Example 16 | Example 17 | Example 18 | Example 19 | Example 20 |
|---|---|---|---|---|---|---|
| Hydrogenated block copolymer (a) | (a-1) No. | 3 | 3 | 3 | 6 | 6 |
| | Compounded amount (parts by mass) | 100 | 90 | 90 | 100 | 90 |
| | (a-2) No. | | 13 | 24 | | 13 |
| | Compounded amount (parts by mass) | | 10 | 10 | | 10 |
| Polypropylene resin (b) (parts by mass) | | 22 | 22 | 22 | 22 | 22 |
| Polyphenylene ether resin (c-1) (parts by mass) | | 55 | 55 | 55 | 55 | 55 |
| Softener (d) for non-aromatic rubber | (d-1) (parts by mass) | | | | | |
| | (d-2) (parts by mass) | 160 | 160 | 160 | 160 | 160 |
| MFR (230° C., 2.16 kg [g/10 min] | | 0.8 | 1.9 | 2.9 | 0.1 | 0.4 |
| Hardness [—] | | 39 | 37 | 40 | 43 | 41 |
| M300 [MPa] | | 2.7 | 2.4 | 2.7 | 3.4 | 3.2 |
| Tb [MPa] | | 11.2 | 8.3 | 10.8 | 8.1 | 6.4 |
| Eb [%] | | 680 | 610 | 590 | 610 | 510 |
| Dunlop rebound resilience [%] | | 52 | 51 | 53 | 46 | 45 |
| Compression set at 70° C. [%] | | 23 | 28 | 33 | 25 | 30 |
| Permanent elongation or distortion after 100% elongation [%] | | 2.9 | 2.8 | 3.5 | 4.4 | 4.2 |
| Needlestick resistance (needle penetration power) [N] | | 29 | 28 | 32 | 33 | 32 |
| Needle retention properties (needle retention power) [N] | | 18 | 18 | 20 | 21 | 21 |
| Coring properties (shaves) | | A | A | A | A | A |
| Resealability after 4 hr (amount of leakage) [g] | | 0.31 | 0.21 | 0.41 | 0.18 | 0.12 |
| Resealability after 24 hr (amount of leakage) [g] | | 2.12 | 1.09 | 1.43 | 0.93 | 0.51 |
| Light transmission test | | A | A | A | A | A |

TABLE 7

| | | Example 21 | Example 22 | Example 23 | Example 24 | Example 25 |
|---|---|---|---|---|---|---|
| Hydrogenated block copolymer (a) | (a-1) No. | 6 | 7 | 7 | 7 | 8 |
| | Compounded amount (parts by mass) | 80 | 100 | 90 | 90 | 100 |
| | (a-2) No. | 13 | | 16 | 20 | |
| | Compounded amount (parts by mass) | 20 | | 10 | 10 | |
| Polypropylene resin (b) (parts by mass) | | 22 | 22 | 22 | 22 | 22 |
| Polyphenylene ether resin (c-1) (parts by mass) | | 55 | 55 | 55 | 55 | 55 |
| Softener (d) for non-aromatic rubber | (d-1) (parts by mass) | | | | | |
| | (d-2) (parts by mass) | 160 | 140 | 140 | 140 | 180 |
| MFR (230° C., 2.16 kg) [g/10 min] | | 1.2 | 1.1 | 2.2 | 0.8 | 5.6 |
| Hardness [—] | | 39 | 39 | 38 | 40 | 42 |
| M300 [MPa] | | 3 | 2.2 | 2 | 2.4 | 2.9 |
| Tb [MPa] | | 6.1 | 6.4 | 5.8 | 6.7 | 7.1 |
| Eb [%] | | 520 | 780 | 710 | 680 | 730 |
| Dunlop rebound resilience [%] | | 45 | 53 | 50 | 52 | 44 |
| Compression set at 70° C. [%] | | 34 | 28 | 33 | 34 | 26 |
| Permanent elongation or distortion after 100% elongation [%] | | 3.8 | 2.4 | 2.9 | 3.7 | 3.9 |
| Needlestick resistance (needle penetration power) [N] | | 31 | 22 | 21 | 34 | 41 |
| Needle retention properties (needle retention power) [N] | | 20 | 11 | 11 | 21 | 28 |
| Coring properties (shaves) | | A | A | A | A | A |
| Resealability after 4 hr (amount of leakage) [g] | | 0.09 | 0.37 | 0.31 | 0.37 | 0.45 |
| Resealability after 24 hr (amount of leakage) [g] | | 0.37 | 2.01 | 1.09 | 1.19 | 2.41 |
| Light transmission test | | A | A | A | A | A |

| | | Example 26 | Example 27 | Example 28 | Example 29 |
|---|---|---|---|---|---|
| Hydrogenated block copolymer (a) | (a-1) No. | 8 | 9 | 9 | 1 |
| | Compounded amount (parts by mass) | 90 | 100 | 90 | 90 |
| | (a-2) No. | 15 | | 13 | 17 |
| | Compounded amount (parts by mass) | 10 | | 10 | 10 |
| Polypropylene resin (b) (parts by mass) | | 22 | 22 | 22 | 19 |
| Polyphenylene ether resin (c-1) (parts by mass) | | 55 | 55 | 55 | 55 |
| Softener (d) for non-aromatic rubber | (d-1) (parts by mass) | | | | 55 |
| | (d-2) (parts by mass) | 180 | 160 | 160 | 95 |
| MFR (230° C., 2.16 kg) [g/10 min] | | 5.9 | 0.3 | 1 | 4.3 |
| Hardness [—] | | 38 | 44 | 38 | 30 |
| M300 [MPa] | | 2.1 | 3.6 | 3 | 2.1 |
| Tb [MPa] | | 5.9 | 10.7 | 8.1 | 7.8 |
| Eb [%] | | 690 | 550 | 530 | 570 |

TABLE 7-continued

|  | | | | |
|---|---|---|---|---|
| Dunlop rebound resilience [%] | 43 | 50 | 50 | 41 |
| Compression set at 70° C. [%] | 28 | 20 | 24 | 39 |
| Permanent elongation or distortion after 100% elongation [%] | 3.2 | 3.3 | 2.9 | 4.7 |
| Needlestick resistance (needle penetration power) [N] | 39 | 36 | 35 | 22 |
| Needle retention properties (needle retention power) [N] | 26 | 24 | 22 | 11 |
| Coring properties (shaves) | A | A | A | A |
| Resealability after 4 hr (amount of leakage) [g] | 0.29 | 0.08 | 0.06 | 0.47 |
| Resealability after 24 hr (amount of leakage) [g] | 1.08 | 0.78 | 0.41 | 2.91 |
| Light transmission test | A | A | A | A |

TABLE 8

| | | Comparative Example 1 | Comparative Example 2 | Comparative Example 3 | Comparative Example 4 | Comparative Example 5 | Comparative Example 6 |
|---|---|---|---|---|---|---|---|
| Hydrogenated block copolymer (a) | (a-1) No. | 10 | 10 | 10 | 10 | 10 | 11 |
| | Compounded amount (parts by mass) | 100 | 90 | 90 | 90 | 90 | 100 |
| | (a-2) No. | | 13 | 17 | 18 | 19 | |
| | Compounded amount (parts by mass) | | 10 | 10 | 10 | 10 | |
| Polypropylene resin (b) (parts by mass) | | 19 | 19 | 19 | 19 | 19 | 19 |
| Polyphenylene ether resin (c-1) (parts by mass) | | 55 | 55 | 55 | 55 | 55 | 55 |
| Softener (d) for non-aromatic rubber | (d-1) (parts by mass) | 55 | 55 | 55 | 55 | 55 | 55 |
| | (d-2) (parts by mass) | 95 | 95 | 95 | 95 | 95 | 95 |
| MFR (230° C., 2.16 kg) [g/10 min] | | 7.9 | 6.7 | 11.2 | 12.4 | 4.8 | 3.1 |
| Hardness [—] | | 28 | 29 | 28 | 30 | 32 | 24 |
| M300 [MPa] | | 2 | 1.8 | 1.2 | 2.3 | 2.2 | 0.8 |
| Tb [MPa] | | 7.4 | 6.6 | 5.8 | 6.9 | 7.1 | 6.5 |
| Eb [%] | | 570 | 520 | 540 | 560 | 580 | 730 |
| Dunlop rebound resilience [%] | | 42 | 42 | 43 | 44 | 41 | 37 |
| Compression set at 70° C. [%] | | 68 | 71 | 78 | 74 | 65 | 51 |
| Permanent elongation or distortion after 100% elongation [%] | | 6.4 | 5.5 | 6.3 | 5.9 | 5.3 | 5.7 |
| Needlestick resistance (needle penetration power) [N] | | 23 | 22 | 21 | 23 | 24 | 18 |
| Needle retention properties (needle retention power) [N] | | 10 | 12 | 10 | 11 | 13 | 8 |
| Coring properties (shaves) | | A | A | B | A | A | B |
| Resealability after 4 hr (amount of leakage) [g] | | 24.9 | 12.1 | 14.5 | 21.3 | 7.6 | 36.1 |
| Light transmission test | | B | B | B | B | B | B |

| | | Comparative Example 7 | Comparative Example 8 | Comparative Example 9 | Comparative Example 10 | Comparative Example 11 |
|---|---|---|---|---|---|---|
| Hydrogenated block copolymer (a) | (a-1) No. | 11 | 12 | 12 | 12 | 12 |
| | Compounded amount (parts by mass) | 90 | 100 | 90 | 100 | 90 |
| | (a-2) No. | 18 | | 18 | | 13 |
| | Compounded amount (parts by mass) | 10 | | 10 | | 10 |
| Polypropylene resin (b) (parts by mass) | | 19 | 19 | 19 | 19 | 19 |
| Polyphenylene ether resin (c-1) (parts by mass) | | 55 | 55 | 55 | 55 | 55 |
| Softener (d) for non-aromatic rubber | (d-1) (parts by mass) | 55 | 55 | 55 | 55 | 55 |
| | (d-2) (parts by mass) | 95 | 95 | 95 | 95 | 95 |
| MFR (230° C., 2.16 kg) [g/10 min] | | 4.4 | 1.1 | 2.8 | 1.1 | 2.8 |
| Hardness [—] | | 24 | 57 | 55 | 57 | 55 |
| M300 [MPa] | | 0.7 | 4.8 | 4.2 | 4.8 | 4.2 |
| Tb [MPa] | | 6.6 | 18.1 | 17.2 | 18.1 | 17.2 |
| Eb [%] | | 680 | 650 | 610 | 650 | 610 |
| Dunlop rebound resilience [%] | | 38 | 37 | 39 | 37 | 39 |
| Compression set at 70° C. [%] | | 50 | 44 | 45 | 44 | 45 |
| Permanent elongation or distortion after 100% elongation [%] | | 6.1 | 7.9 | 7.2 | 7.9 | 7.2 |
| Needlestick resistance (needle penetration power) [N] | | 21 | 42 | 41 | 42 | 41 |
| Needle retention properties (needle retention power) [N] | | 11 | 18 | 17 | 18 | 17 |

TABLE 8-continued

|  |  |  |  |  |  |
|---|---|---|---|---|---|
| Coring properties (shaves) | B | A | A | A | A |
| Resealability after 4 hr (amount of leakage) [g] | 20.8 | 52.5 | 39.9 | 52.5 | 39.9 |
| Light transmission test | B | B | B | B | B |

TABLE 9

|  |  | Example 30 | Example 31 | Example 32 | Example 33 | Example 34 | Example 35 |
|---|---|---|---|---|---|---|---|
| Hydrogenated block copolymer (a) | (a-1) No. | 1 | 1 | 1 | 1 | 1 | 1 |
|  | Compounded amount (parts by mass) | 100 | 100 | 100 | 100 | 100 | 100 |
|  | (a-2) No. |  |  |  |  |  |  |
|  | Compounded amount (parts by mass) |  |  |  |  |  |  |
| Polypropylene resin (b) (parts by mass) |  | 22 | 22 | 22 | 22 | 22 | 22 |
| Polyphenylene ether resin (c) | (c-1) (parts by mass) | 55 | 55 | 55 | 55 | 55 |  |
|  | (c-2) (parts by mass) |  |  |  |  |  | 55 |
|  | (c-3) (parts by mass) |  |  |  |  |  |  |
| Softener (d) for non-aromatic rubber | (d-1) (parts by mass) | 130 | 55 | 55 |  | 55 | 55 |
|  | (d-2) (parts by mass) |  | 75 |  | 130 | 95 | 95 |
|  | (d-3) (parts by mass) |  |  | 75 |  |  |  |
| Inorganic filler (e) | (e-1) (parts by mass) |  |  |  |  |  |  |
|  | (e-2) (parts by mass) |  |  |  |  |  |  |
| MFR (230° C., 2.16 kg) [g/10 min] |  | 0.5 | 0.7 | 1.3 | 1.2 | 0.7 | 0.3 |
| Hardness [—] |  | 36 | 35 | 34 | 34 | 30 | 32 |
| M300 [MPa] |  | 3.5 | 3.4 | 3.2 | 3.1 | 2.1 | 2.6 |
| Tb [MPa] |  | 13.6 | 13 | 11.9 | 11.2 | 12.1 | 13.4 |
| Eb [%] |  | 620 | 590 | 570 | 610 | 650 | 630 |
| Dunlop rebound resilience [%] |  | 45 | 43 | 42 | 42 | 43 | 45 |
| Compression set at 70° C. [%] |  | 22 | 24 | 27 | 28 | 25 | 22 |
| Permanent elongation or distortion after 100% elongation [%] |  | 2.2 | 2.4 | 2.8 | 2.9 | 2.5 | 2.1 |
| Needlestick resistance (needle penetration power) [N] |  | 40 | 36 | 30 | 29 | 25 | 26 |
| Needle retention properties (needle retention power) [N] |  | 18 | 16 | 15 | 15 | 12 | 14 |
| Coring properties (shaves) |  | A | A | A | A | A | A |
| Resealability after 4 hr (amount of leakage) [g] |  | 0.05 | 0.06 | 0.1 | 0.14 | 0.09 | 0.07 |
| Light transmission test |  | A | A | A | A | A | A |

|  |  | Example 36 | Example 37 | Example 38 | Example 39 | Example 40 |
|---|---|---|---|---|---|---|
| Hydrogenated block copolymer (a) | (a-1) No. | 1 | 1 | 1 | 1 | 1 |
|  | Compounded amount (parts by mass) | 100 | 100 | 100 | 100 | 90 |
|  | (a-2) No. |  |  |  |  | 13 |
|  | Compounded amount (parts by mass) |  |  |  |  | 10 |
| Polypropylene resin (b) (parts by mass) |  | 22 | 22 | 22 | 22 | 22 |
| Polyphenylene ether resin (c) | (c-1) (parts by mass) |  | 55 | 55 | 55 | 55 |
|  | (c-2) (parts by mass) |  |  |  |  |  |
|  | (c-3) (parts by mass) | 55 |  |  |  |  |
| Softener (d) for non-aromatic rubber | (d-1) (parts by mass) | 55 | 55 | 55 | 55 | 55 |
|  | (d-2) (parts by mass) | 95 | 95 | 95 | 95 | 75 |
|  | (d-3) (parts by mass) |  |  |  |  |  |
| Inorganic filler (e) | (e-1) (parts by mass) |  | 30 | 90 |  | 60 |
|  | (e-2) (parts by mass) |  |  |  | 60 |  |
| MFR (230° C., 2.16 kg) [g/10 min] |  | 1.8 | 0.7 | 0.8 | 0.9 | 1 |
| Hardness [—] |  | 28 | 33 | 36 | 35 | 36 |
| M300 [MPa] |  | 1.7 | 2.6 | 2.2 | 2 | 2.5 |
| Tb [MPa] |  | 11.8 | 10.9 | 8.8 | 8.5 | 10.5 |
| Eb [%] |  | 660 | 620 | 630 | 590 | 600 |
| Dunlop rebound resilience [%] |  | 43 | 43 | 42 | 44 | 41 |
| Compression set at 70° C. [%] |  | 29 | 24 | 23 | 22 | 28 |
| Permanent elongation or distortion after 100% elongation [%] |  | 3.2 | 2.8 | 3.4 | 2.8 | 3.1 |
| Needlestick resistance (needle penetration power) [N] |  | 24 | 27 | 46 | 45 | 33 |
| Needle retention properties (needle retention power) [N] |  | 12 | 16 | 25 | 23 | 12 |
| Coring properties (shaves) |  | A | A | A | A | A |
| Resealability after 4 hr (amount of leakage) [g] |  | 0.28 | 0.07 | 0.01 | 0.02 | 0 |
| Light transmission test |  | A | A | AA | AA | A |

TABLE 10

|  |  | Example 41 | Example 42 | Example 43 | Example 44 | Example 45 | Example 46 |
|---|---|---|---|---|---|---|---|
| Hydrogenated block copolymer (a) | (a-1) No. | 1 | 1 | 1 | 1 | 4 | 4 |
|  | Compounded amount (parts by mass) | 90 | 100 | 90 | 100 | 100 | 100 |
|  | (a-2) No. | 13 |  | 13 |  |  |  |
|  | Compounded amount (parts by mass) | 10 |  | 10 |  |  |  |
| Polypropylene resin (b) (parts by mass) |  | 22 | 19 | 19 | 12 | 22 | 22 |
| Polyphenylene ether resin (c) | (c-1) (parts by mass) | 55 | 80 | 80 | 35 | 55 | 55 |
|  | (c-2) (parts by mass) |  |  |  |  |  |  |
|  | (c-3) (parts by mass) |  |  |  |  |  |  |
| Softener (d) for non-aromatic rubber | (d-1) (parts by mass) | 55 | 55 | 55 | 55 |  |  |
|  | (d-2) (parts by mass) | 95 | 95 | 95 | 25 | 130 | 150 |
|  | (d-3) (parts by mass) |  |  |  |  |  |  |
| Inorganic filler (e) | (e-1) (parts by mass) | 90 |  |  |  |  | 90 |
|  | (e-2) (parts by mass) |  |  |  |  |  |  |
| MFR (230° C., 2.16 kg) [g/10 min] |  | 1.3 | 1.3 | 2.1 | 0.1 | 1.5 | 0.7 |
| Hardness [—] |  | 37 | 29 | 30 | 43 | 38 | 41 |
| M300 [MPa] |  | 1.9 | 3.8 | 3.6 | 3.9 | 3.5 | 3.1 |
| Tb [MPa] |  | 7.8 | 9.8 | 8.6 | 14.4 | 7.9 | 6 |
| Eb [%] |  | 650 | 590 | 500 | 760 | 570 | 590 |
| Dunlop rebound resilience [%] |  | 41 | 42 | 40 | 55 | 44 | 44 |
| Compression set at 70° C. [%] |  | 26 | 20 | 25 | 29 | 22 | 20 |
| Permanent elongation or distortion after 100% elongation [%] |  | 3.6 | 1 | 1.3 | 1.5 | 2.5 | 3.2 |
| Needlestick resistance (needle penetration power) [N] |  | 44 | 28 | 28 | 43 | 31 | 38 |
| Needle retention properties (needle retention power) [N] |  | 22 | 15 | 15 | 21 | 16 | 19 |
| Coring properties (shaves) |  | A | A | A | A | A | A |
| Resealability after 4 hr (amount of leakage) [g] |  | 0 | 0 | 0 | 0.33 | 0.34 | 0.18 |
| Light transmission test |  | AA | A | A | A | A | AA |
|  |  | Example 47 | Example 48 | Example 49 | Example 50 | Example 51 | Example 52 |
| Hydrogenated block copolymer (a) | (a-1) No. | 4 | 7 | 7 | 7 | 7 | 1 |
|  | Compounded amount (parts by mass) | 100 | 100 | 100 | 100 | 100 | 100 |
|  | (a-2) No. |  |  |  |  |  |  |
|  | Compounded amount (parts by mass) |  |  |  |  |  |  |
| Polypropylene resin (b) (parts by mass) |  | 36 | 15 | 19 | 22 | 22 | 22 |
| Polyphenylene ether resin (c) | (c-1) (parts by mass) | 65 | 7 | 35 | 55 | 55 | 55 |
|  | (c-2) (parts by mass) |  |  |  |  |  |  |
|  | (c-3) (parts by mass) |  |  |  |  |  |  |
| Softener (d) for non-aromatic rubber | (d-1) (parts by mass) |  |  |  |  |  | 55 |
|  | (d-2) (parts by mass) | 180 | 170 | 140 | 150 | 160 | 95 |
|  | (d-3) (parts by mass) |  |  |  |  |  |  |
| Inorganic filler (e) | (e-1) (parts by mass) | 140 |  |  |  | 90 | 160 |
|  | (e-2) (parts by mass) |  |  |  |  |  |  |
| MFR (230° C., 2.16 kg) [g/10 min] |  | 1.3 | 1.1 | 0.1 | 0.2 | 0.1 | 1.4 |
| Hardness [—] |  | 48 | 30 | 39 | 40 | 41 | 44 |
| M300 [MPa] |  | 3.6 | 9 | 2.4 | 2.3 | 2.8 | 2.6 |
| Tb [MPa] |  | 6.3 | 88 | 8.5 | 7.3 | 6.5 | 5.2 |
| Eb [%] |  | 630 | 980 | 720 | 690 | 610 | 480 |
| Dunlop rebound resilience [%] |  | 41 | 52 | 51 | 48 | 41 | 42 |
| Compression set at 70° C. [%] |  | 27 | 34 | 25 | 29 | 22 | 31 |
| Permanent elongation or distortion after 100% elongation [%] |  | 4.4 | 2.9 | 4.2 | 4 | 4.1 | 3.8 |
| Needlestick resistance (needle penetration power) [N] |  | 48 | 23 | 38 | 39 | 48 | 43 |
| Needle retention properties (needle retention power) [N] |  | 25 | 12 | 16 | 16 | 26 | 22 |
| Coring properties (shaves) |  | A | A | A | A | A | A |
| Resealability after 4 hr (amount of leakage) [g] |  | 0.38 | 0.45 | 0.39 | 0.34 | 0.15 | 0.01 |
| Light transmission test |  | AA | A | A | A | AA | AA |

TABLE 11

| | | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 | Comparative Example 21 | Comparative Example 22 | Comparative Example 23 |
|---|---|---|---|---|---|---|---|---|---|---|---|---|---|
| Hydrogenated block copolymer (a) | (a-1) No. | 10 | 10 | 10 | 10 | 1 | 1 | 1 | 1 | 1 | 1 | 1 | 1 |
| | Compounded amount (parts by mass) | 100 | 90 | 100 | 90 | 100 | 100 | 90 | 100 | 100 | 100 | 90 | 100 |
| | (a-2) No. | | 18 | | 18 | | | 13 | | | | 13 | |
| | Compounded amount (parts by mass) | | 10 | | 10 | | | 10 | | | | 10 | |
| Polypropylene resin (b) (parts by mass) | | 19 | 19 | 19 | 19 | 8 | | | | | | | |
| Polyphenylene ether resin (c) | (c-1) (parts by mass) | 55 | 55 | 55 | 55 | 55 | 55 | 55 | 22 | 22 | 22 | 22 | 22 |
| | (c-2) (parts by mass) | | | | | | 55 | 55 | 0 | 110 | 55 | 55 | 55 |
| | (c-3) (parts by mass) | | | | | | | | | | | | |
| Softener (d) for non-aromatic rubber | (d-1) (parts by mass) | 55 | 55 | 55 | 55 | 55 | 55 | 55 | 55 | 55 | 20 | 20 | 110 |
| | (d-2) (parts by mass) | 95 | 95 | 95 | 95 | 95 | 75 | 75 | 75 | 75 | 20 | 20 | 110 |
| | (d-3) (parts by mass) | | | | | | | | | | | | |
| Inorganic filler (e) | (e-1) (parts by mass) | | | 90 | 90 | | | | | | | | |
| | (e-2) (parts by mass) | | | | | | | | | | | | |
| MFR (230° C., 2.16 kg) [g/10 min] | | 2.1 | 4.9 | 2.8 | 5.6 | 0.7 | 3.1 | 5.3 | 1.9 | No flow | No flow | No flow | 4.9 |
| Hardness [—] | | 25 | 26 | 31 | 33 | 20 | 63 | 61 | 30 | 51 | 87 | 88 | 22 |
| M300 [MPa] | | 1.7 | 1.8 | 1.9 | 2.2 | 1.1 | 6.3 | 5.1 | 2.2 | 3.8 | 7.4 | 7.1 | 0.8 |
| Tb [MPa] | | 5.8 | 5.3 | 5.1 | 4.8 | 5.2 | 16.3 | 14.8 | 10.5 | 14.1 | 18.1 | 13.9 | 5.1 |
| Eb [%] | | 720 | 680 | 660 | 630 | 760 | 810 | 760 | 680 | 550 | 790 | 720 | 830 |
| Dunlop rebound resilience [%] | | 46 | 48 | 48 | 50 | 47 | 39 | 42 | 44 | 38 | 35 | 38 | 36 |
| Compression set at 70° C. [%] | | 39 | 43 | 37 | 39 | 41 | 47 | 46 | 37 | 24 | 44 | 46 | 41 |
| Permanent elongation or distortion after 100% elongation [%] | | 5.3 | 5.1 | 5.5 | 5.4 | 2.3 | 6.4 | 5.5 | 5.2 | 5.1 | 11.2 | 9.7 | 5.1 |
| Needlestick resistance (needle penetration power) [N] | | 20 | 21 | 37 | 36 | 16 | 88 | 81 | 28 | 81 | 92 | 91 | 15 |
| Needle retention properties (needle retention power) [N] | | 8 | 9 | 15 | 13 | 7 | 38 | 29 | 11 | 36 | 41 | 39 | 6 |
| Coring properties (shaves) | | A | A | A | B | B | A | A | A | B | A | A | B |
| Resealability after 4 hr (amount of leakage) [g] | | 1.56 | 1.12 | 0.76 | 0.55 | 0.31 | 19.8 | 15.1 | 27.9 | 0.71 | 48.9 | 40.4 | 3.1 |
| Light transmission test | | B | B | B | B | B | B | B | B | B | B | B | B |

TABLE 12

|  |  | Example 53 | Example 54 | Example 55 | Example 56 | Example 57 | Example 58 | Example 59 |
|---|---|---|---|---|---|---|---|---|
| Hydrogenated block copolymer (a) | (a-1) No. | 1 | 1 | 1 | 1 | 1 | 1 | 1 |
|  | Compounded amount (parts by mass) | 100 | 100 | 90 | 100 | 100 | 90 | 100 |
|  | (a-2) No. |  |  | 13 |  |  | 13 |  |
|  | Compounded amount (parts by mass) |  |  | 10 |  |  | 10 |  |
| Polypropylene resin (b) (parts by mass) |  | 22 | 22 | 22 | 22 | 22 | 22 | 22 |
| Polyphenylene ether resin (c-1) (parts by mass) |  | 55 | 55 | 55 | 55 | 55 | 55 | 55 |
| Softener (d) for non-aromatic rubber | (d-1) (parts by mass) | 55 | 55 | 55 | 55 | 55 | 55 | 55 |
|  | (d-2) (parts by mass) | 95 | 95 | 95 | 95 | 95 | 95 | 95 |
| Inorganic filler (e) | (e-1) (parts by mass) |  |  |  | 90 |  |  | 90 |
| Inorganic adsorbent (f) | (f-1) (parts by mass) | 8 |  |  |  |  |  |  |
|  | (f-2) (parts by mass) |  | 8 | 8 | 8 |  |  |  |
| Odor sensory test (odor intensity index, average) |  | 2.1 | 1.8 | 1.9 | 1.6 | 4.3 | 4.4 | 4.1 |

TABLE 13

|  |  | Example 60 | Example 61 | Example 62 | Example 63 | Example 64 | Example 65 |
|---|---|---|---|---|---|---|---|
| Hydrogenated block copolymer (a) | (a-1) No. | 1 | 1 | 1 | 1 | 1 | 1 |
|  | Compounded amount (parts by mass) | 100 | 100 | 90 | 100 | 90 | 100 |
|  | (a-2) No. |  |  | 13 |  | 13 |  |
|  | Compounded amount (parts by mass) |  |  | 10 |  | 10 |  |
| Polypropylene resin (b) (parts by mass) |  | 22 | 22 | 22 | 22 | 22 | 22 |
| Polyphenylene ether resin (c) | (c-1) (parts by mass) | 55 | 55 | 55 | 55 | 55 | 55 |
| Softener (d) for non-aromatic rubber | (d-1) (parts by mass) | 55 | 55 | 55 | 55 | 55 | 55 |
|  | (d-2) (parts by mass) | 95 | 95 | 95 | 95 | 95 | 115 |
| Inorganic filler (e) | (e-1) (parts by mass) | 90 |  |  |  |  |  |
|  | (e-3) (parts by mass) |  | 90 | 90 | 75 | 75 |  |
|  | (e-4) (parts by mass) |  |  |  |  |  | 30 |
| Silicone oil |  |  |  |  |  |  |  |
| MFR (230° C., 2.16 kg) [g/10 min] |  | 0.8 | 0.5 | 0.9 | 1.3 | 1.9 | 2.1 |
| Hardness [—] |  | 36 | 38 | 36 | 38 | 36 | 43 |
| M300 [MPa] |  | 2.2 | 2.6 | 2.3 | 2.4 | 2.2 | 3.4 |
| Tb [MPa] |  | 8.8 | 9.2 | 8.7 | 8.1 | 7.8 | 9.8 |
| Eb [%] |  | 630 | 590 | 580 | 630 | 610 | 610 |
| Dunlop rebound resilience [%] |  | 42 | 44 | 43 | 42 | 42 | 41 |
| Compression set at 70° C. [%] |  | 23 | 25 | 26 | 24 | 25 | 30 |
| Permanent elongation or distortion after 100% elongation [%] |  | 3.4 | 3.3 | 3.2 | 3.3 | 3.1 | 3.8 |
| Needlestick resistance (needle penetration power) [N] |  | 46 | 49 | 48 | 44 | 42 | 54 |
| Needle retention properties (needle retention power) [N] |  | 24 | 26 | 29 | 24 | 26 | 32 |
| Coring properties (shaves) |  | A | A | A | A | A | A |
| Resealability before steam sterilization treatment (amount of leakage) [g] |  | 0.01 | 0 | 0 | 0.03 | 0.01 | 0 |
| Resealability after steam sterilization treatment (amount of leakage) [g] |  | 0.73 | 0.18 | 0.09 | 0.44 | 0.31 | 0.11 |
| Light transmission test |  | AA | AA | AA | AA | AA | AA |

|  |  | Example 66 | Example 67 | Example 68 | Example 69 | Example 70 |
|---|---|---|---|---|---|---|
| Hydrogenated block copolymer (a) | (a-1) No. | 1 | 1 | 1 | 1 | 1 |
|  | Compounded amount (parts by mass) | 90 | 100 | 90 | 100 | 100 |
|  | (a-2) No. | 13 |  | 13 |  |  |
|  | Compounded amount (parts by mass) | 10 |  | 10 |  |  |
| Polypropylene resin (b) (parts by mass) |  | 22 | 22 | 22 | 22 | 22 |
| Polyphenylene ether resin (c) | (c-1) (parts by mass) | 55 | 55 | 55 | 45 | 45 |
| Softener (d) for non-aromatic rubber | (d-1) (parts by mass) | 55 | 55 | 55 | 55 | 55 |
|  | (d-2) (parts by mass) | 115 | 95 | 95 | 95 | 115 |
| Inorganic filler (e) | (e-1) (parts by mass) |  |  |  |  |  |
|  | (e-3) (parts by mass) |  |  |  |  | 30 |
|  | (e-4) (parts by mass) | 30 | 30 | 30 | 25 | 15 |
| Silicone oil |  |  |  |  |  |  |
| MFR (230° C., 2.16 kg) [g/10 min] |  | 2.6 | 0.8 | 1.2 | 1.2 | 2.5 |
| Hardness [—] |  | 41 | 44 | 42 | 41 | 35 |
| M300 [MPa] |  | 3.1 | 3.7 | 3.4 | 3.4 | 2.4 |
| Tb [MPa] |  | 9.2 | 11.2 | 10.6 | 12.8 | 8.8 |
| Eb [%] |  | 600 | 580 | 560 | 660 | 600 |

TABLE 13-continued

|  | | | | | |
|---|---|---|---|---|---|
| Dunlop rebound resilience [%] | 41 | 43 | 42 | 45 | 41 |
| Compression set at 70° C. [%] | 32 | 31 | 32 | 28 | 25 |
| Permanent elongation or distortion after 100% elongation [%] | 3.6 | 3.6 | 3.3 | 4.3 | 3.8 |
| Needlestick resistance (needle penetration power) [N] | 51 | 56 | 53 | 53 | 46 |
| Needle retention properties (needle retention power) [N] | 33 | 33 | 35 | 32 | 29 |
| Coring properties (shaves) | A | A | A | A | A |
| Resealability before steam sterilization treatment (amount of leakage) [g] | 0 | 0 | 0 | 0 | 0.02 |
| Resealability after steam sterilization treatment (amount of leakage) [g] | 0.08 | 0.09 | 0.07 | 0.18 | 0.38 |
| Light transmission test | AA | AA | AA | AA | AA |

TABLE 14

| | | Example 71 | Example 72 | Example 73 | Example 74 | Example 75 | Example 76 |
|---|---|---|---|---|---|---|---|
| Hydrogenated block copolymer (a) | (a-1) No. | 1 | 3 | 3 | 4 | 4 | 4 |
| | Compounded amount t (parts by mass) | 90 | 100 | 90 | 100 | 100 | 90 |
| | (a-2) No. | 13 | | 13 | | | 13 |
| | Compounded amount (parts by mass) | 10 | | 10 | | | 10 |
| Polypropylene resin (b) (parts by mass) | | 22 | 22 | 22 | 22 | 22 | 22 |
| Polyphenylene ether resin (c) | (c-1) (parts by mass) | 45 | 55 | 55 | 55 | 55 | 55 |
| Softener (d) for non-aromatic rubber | (d-1) (parts by mass) | 55 | 55 | 55 | 55 | 55 | 55 |
| | (d-2) (parts by mass) | 95 | 95 | 95 | 95 | 95 | 95 |
| Inorganic filler (e) | (e-1) (parts by mass) | | | | | | |
| | (e-3) (parts by mass) | | | | | | |
| | (e-4) (parts by mass) | 25 | 25 | 25 | 30 | 30 | 30 |
| Silicone oil | | | | | | 3 | |
| MFR (230° C., 2.16 kg) [g/10 min] | | 1.7 | 0.4 | 0.6 | 0.6 | 0.8 | 0.9 |
| Hardness [—] | | 40 | 42 | 41 | 47 | 45 | 44 |
| M300 [MPa] | | 3.2 | 3.1 | 2.8 | 4.4 | 3.8 | 4.1 |
| Tb [MPa] | | 11.3 | 12.2 | 11.1 | 12.1 | 11.6 | 11.3 |
| Eb [%] | | 600 | 650 | 630 | 620 | 640 | 600 |
| Dunlop rebound resilience [%] | | 44 | 43 | 42 | 43 | 44 | 42 |
| Compression set at 70° C. [%] | | 31 | 28 | 30 | 30 | 32 | 32 |
| Permanent elongation or distortion after 100% elongation [%] | | 4 | 4.5 | 4.2 | 4.6 | 4.4 | 4.4 |
| Needlestick resistance (needle penetration power) [N] | | 51 | 51 | 47 | 59 | 55 | 56 |
| Needle retention properties (needle retention power) [N] | | 34 | 32 | 33 | 39 | 38 | 40 |
| Coring properties (shaves) | | A | A | A | A | A | A |
| Resealability before steam sterilization treatment (amount of leakage) [g] | | 0 | 0 | 0 | 0 | 0 | 0 |
| Resealability after steam sterilization treatment (amount of leakage) [g] | | 0.1 | 0.26 | 0.13 | 0.11 | 0.18 | 0.08 |
| Light transmission test | | AA | AA | AA | AA | AA | AA |

| | | Example 77 | Example 78 | Example 79 | Example 80 | Example 81 | Example 82 |
|---|---|---|---|---|---|---|---|
| Hydrogenated block copolymer (a) | (a-1) No. | 4 | 6 | 6 | 6 | 9 | 9 |
| | Compounded amount t (parts by mass) | 100 | 100 | 90 | 90 | 100 | 90 |
| | (a-2) No. | | | 13 | 23 | | 13 |
| | Compounded amount (parts by mass) | | | 10 | 10 | | 10 |
| Polypropylene resin (b) (parts by mass) | | 35 | 22 | 22 | 22 | 22 | 22 |
| Polyphenylene ether resin (c) | (c-1) (parts by mass) | 15 | 55 | 55 | 55 | 55 | 55 |
| Softener (d) for non-aromatic rubber | (d-1) (parts by mass) | 55 | | | | | |
| | (d-2) (parts by mass) | 115 | 170 | 170 | 170 | 170 | 170 |
| Inorganic filler (e) | (e-1) (parts by mass) | | | | | | |
| | (e-3) (parts by mass) | | | | | | |
| | (e-4) (parts by mass) | 25 | 25 | 25 | 25 | 25 | 25 |
| Silicone oil | | | | | | | |
| MFR (230° C., 2.16 kg) [g/10 min] | | 3.5 | 0.2 | 0.4 | 0.3 | 0.5 | 1.1 |
| Hardness [—] | | 43 | 43 | 41 | 42 | 42 | 41 |
| M300 [MPa] | | 2.8 | 2.9 | 2.6 | 2.8 | 3.1 | 2.8 |
| Tb [MPa] | | 9.8 | 11.2 | 10.7 | 10.9 | 12.1 | 11.3 |
| Eb [%] | | 780 | 670 | 650 | 660 | 590 | 550 |
| Dunlop rebound resilience [%] | | 44 | 42 | 41 | 42 | 48 | 45 |
| Compression set at 70° C. [%] | | 35 | 27 | 29 | 28 | 24 | 25 |
| Permanent elongation or distortion after 100% elongation [%] | | 4.9 | 4.8 | 4.6 | 4.7 | 4.1 | 3.7 |
| Needlestick resistance (needle penetration power) [N] | | 46 | 49 | 45 | 47 | 53 | 49 |
| Needle retention properties (needle retention power) [N] | | 29 | 31 | 32 | 31 | 34 | 35 |
| Coring properties (shaves) | | A | A | A | A | A | A |

TABLE 14-continued

| Resealability before steam sterilization treatment (amount of leakage) [g] | 0.09 | 0.01 | 0 | 0.01 | 0 | 0 |
| --- | --- | --- | --- | --- | --- | --- |
| Resealability after steam sterilization treatment (amount of leakage) [g] | 0.67 | 0.34 | 0.18 | 0.25 | 0.22 | 0.11 |
| Light transmission test | AA | AA | AA | AA | AA | AA |

The present application is based on Japanese Patent Application No. 2017-010648 filed with the Japan Patent Office on Jan. 24, 2017, the contents of which are incorporated herein by reference.

INDUSTRIAL APPLICABILITY

The thermoplastic elastomer composition of the present invention, and a plug body for medical containers containing the same are excellent in the balance among needlestick resistance, resealability, coring resistance, and the like. The thermoplastic elastomer composition and the plug body of the present invention are also superior in processability, moldability, and hygiene to vulcanized rubbers and therefore have industrial applicability as a plug body for various medical containers such as transfusion bags.

REFERENCE SIGNS LIST

1: Plug body
2: Jig
21: Screw pitch part
22: Holder
23: Lock ring

The invention claimed is:

1. A plug body for medical containers comprising a thermoplastic elastomer composition comprising:
   100 parts by mass of a hydrogenated block copolymer (a);
   from 10 to 50 parts by mass of a polypropylene resin (b);
   from 5 to 100 parts by mass of a polyphenylene ether resin (c);
   from 75 to 200 parts by mass of a non-aromatic softener from at least one selected from the group consisting of paraffin oil, liquid paraffin and white mineral oil (d), and
   from 1 to 150 parts by mass of an inorganic filler (e) selected from the group consisting of calcium carbonate, silica and talc,
   wherein
   the hydrogenated block copolymer (a) contains a hydrogenated block copolymer (a-1) obtained by hydrogenation, the hydrogenated block copolymer (a-1) comprising at least one polymer block A1 comprising a styrene monomer unit, and at least one polymer block B1 comprising conjugated diene compound monomer unit,
   a weight-average molecular weight of the hydrogenated block copolymer (a-1) is from 100,000 to 550,000, and
   a content of all styrene monomer units in the hydrogenated block copolymer (a-1) is more than 20% by mass and 50% by mass or less; and
   the inorganic filler (e) is surface-treated with at least one member selected from the group consisting of a fatty acid and, a silane coupling agent.

2. The thermoplastic elastomer composition according to claim 1, wherein
   the hydrogenated block copolymer (a) comprises
   the hydrogenated block copolymer (a-1),
   a hydrogenated block copolymer (a-2) obtained by hydrogenation, the hydrogenated block copolymer (a-2) comprising at least one polymer block A2 comprising mainly a styrene monomer unit, and at least one polymer block B2 comprising a conjugated diene compound monomer unit,
   a weight-average molecular weight of the hydrogenated block copolymer (a-2) is from 120,000 to 230,000,
   a content of all styrene monomer units in the hydrogenated block copolymer (a-2) is 7% by mass or more and 20% by mass or less, and
   a mass ratio of the hydrogenated block copolymer (a-1) to the hydrogenated block copolymer (a-2), (a-1)/(a-2), is from 70/30 to 95/5.

3. The thermoplastic elastomer composition according to claim 2, wherein in the hydrogenated block copolymer (a-2), a vinyl bond content before hydrogenation in the conjugated diene compound monomer unit is from 63% by mol to 95% by mol.

4. The thermoplastic elastomer composition according to claim 2, wherein
   the hydrogenated block copolymer (a-2) has at least two polymer blocks A2 comprising mainly a styrene monomer unit, and at least two polymer blocks B2 comprising a conjugated diene compound monomer unit,
   at least one of the polymer blocks B2 is positioned at the end of the hydrogenated block copolymer (a-2), and a content of the polymer block B2 positioned at the end is from 0.5 to 9% by mass in the hydrogenated block copolymer (a-2).

5. The thermoplastic elastomer composition according to claim 1, wherein in the hydrogenated block copolymer (a-1), a vinyl bond content before hydrogenation in the conjugated diene compound monomer unit is from 30% by mol to 60% by mol.

6. The thermoplastic elastomer composition according to claim 1, wherein a reduced viscosity of the polyphenylene ether resin (c) is from 0.15 to 0.70 dL/g.

7. The thermoplastic elastomer composition according to claim 1, wherein the non-aromatic softener (d) comprises a non-aromatic softener (d-1) having a kinematic viscosity of from 300 to 400 mm$^2$/sec at 40° C.

8. The thermoplastic elastomer composition according to claim 1, wherein the non-aromatic softener (d) comprises a non-aromatic softener (d-2) having a kinematic viscosity of 100 mm$^2$/sec or less at 40° C.

9. The thermoplastic elastomer composition according to claim 8, wherein
   a mass ratio of the non-aromatic softener (d-1) to the non-aromatic softener (d-2), (d-1)/(d-2), is from 30/70 to 60/40, and
   a total content of the non-aromatic softener (d-1) and the non-aromatic softener (d-2) is from 100 to 200 parts by mass per 100 parts by mass of the hydrogenated block copolymer (a).

10. The thermoplastic elastomer composition according to claim 1, wherein when a polymer block having the largest number-average molecular weight in the polymer block A1 is designated as polymer block A1', number-average molecular weight Mn(A1') of a block chain of the polymer block A1' is from 10,000 to 70,000, number-average molecular weight Mn(c) of the polyphenylene ether resin (c) is from 1,000 to 50,000, and Mn(A1')/Mn(c)=from 1.2 to 3.0.

11. The thermoplastic elastomer composition according to claim 1, having a Shore A hardness is 55 or less, and a permanent elongation or distortion after 100% elongation of 5% or less.

12. The thermoplastic elastomer composition according to claim 1, further comprising 1 part by mass or more and 30 parts by mass or less of an inorganic adsorbent (f) having a specific surface area according to a BET method of 50 m$^2$/g or more, per 100 parts by mass of the hydrogenated block copolymer (a).

13. A plug body which is a molded article of a thermoplastic elastomer composition according to claim 1, comprising:

100 parts by mass of a hydrogenated block copolymer (a);

from 10 to 50 parts by mass of a polypropylene resin (b);

from 5 to 100 parts by mass of a polyphenylene ether resin (c); and from 75 to 200 parts by mass of a non-aromatic softener from at least one selected from the group consisting of paraffin oil, liquid paraffin and white mineral oil (d), wherein a light transmittance is 0% after preparing a disk-shaped article of 20 mm in diameter and 4 mm in thickness from the plug body and then; heating the disk-shaped article at 121° C. for 10 minutes while the disk-shaped article is fitted into a jig or a lid body of a container of 20 mm in inside diameter and 3.5 mm in inside thickness and then; inserting a resin needle having a maximum diameter of 5 mm into the disk-shaped article and removing therefrom.

14. A container comprising a plug body according to claim 1.

15. The plug body for medical containers according to claim 1, wherein the fatty acid is selected from the group consisting of caproic acid, caprylic acid, pelargonic acid, capric acid, lauric acid, myristic acid, palmitic acid, stearic acid, behenic acid, oleic acid, linoleic acid, erucic acid, eicosadienoic acid, docosadienoic acid, linolenic acid, eicosatetraenoic acid, tetracosapentaenoic acid, docosahexaenoic acid, metal salts thereof, and modified products thereof.

16. The plug body for medical containers according to claim 1, wherein the silane coupling agent is selected from the group consisting of dimethyldichlorosilane, trimethylchlorosilane, dimethyldimethoxysilane, trimethylmethoxysilane, dimethyldiethoxysilane, n-propyltrimethoxysilane, n-propyltriethoxysilane, hexyltrimethoxysilane, hexyltriethoxysilane, phenyltrichlorosilane, phenyltrimethoxysilane, phenyltriethoxysilane; vinyltrimethoxysilane, vinyltriethoxysilane; p-styryltrimethoxysilane, 3-glycidoxypropylmethyldimethoxysilane, 3-methacryloxypropylmethyldimethoxysilane, 3-acryloxypropylmethyldimethoxysilane, hexamethyldisilazane and N-2-(aminoethyl)-3-aminopropylmethyldimethoxysilane.

* * * * *